(12) United States Patent
Vandenberg et al.

(10) Patent No.: US 11,111,679 B2
(45) Date of Patent: Sep. 7, 2021

(54) HIDDEN FASTENER UNIT AND RELATED METHOD OF USE

(71) Applicant: National Nail Corp., Grand Rapids, MI (US)

(72) Inventors: Roger A. Vandenberg, Hudsonville, MI (US); Todd E. A. Schwartzkopf, Hudsonville, MI (US)

(73) Assignee: National Nail Corp., Grand Rapids, MI (US)

( * ) Notice: Subject to any disclaimer, the term of this patent is extended or adjusted under 35 U.S.C. 154(b) by 0 days.

(21) Appl. No.: 16/537,128

(22) Filed: Aug. 9, 2019

(65) Prior Publication Data

US 2019/0360214 A1   Nov. 28, 2019

Related U.S. Application Data

(63) Continuation of application No. 16/011,213, filed on Jun. 18, 2018, now Pat. No. 10,378,218, which is a
(Continued)

(51) Int. Cl.
*F16B 5/02* (2006.01)
*E04F 15/02* (2006.01)
(Continued)

(52) U.S. Cl.
CPC ...... *E04F 15/02044* (2013.01); *F16B 5/0004* (2013.01); *F16B 5/008* (2013.01); *E04B 1/003* (2013.01); *E04F 2015/02122* (2013.01)

(58) Field of Classification Search
CPC ...... F16B 5/002; F16B 5/0056; F16B 5/0064; F16B 5/0088; F16B 5/02; F16B 5/0621;
(Continued)

(56) References Cited

U.S. PATENT DOCUMENTS

| X186463 | 1/1877 | Dickinson |
|---|---|---|
| X876399 | 1/1908 | Robinson |

(Continued)

FOREIGN PATENT DOCUMENTS

| DE | 202014004575 | 8/2014 |
|---|---|---|
| DE | 202018003385 | 10/2018 |

(Continued)

OTHER PUBLICATIONS

DeckLock Limited Universal Decking Spacers, downloaded from http://www.hellotrade.com/decklock/universal-decking-spacers.html (viewed Jun. 8, 2017).
(Continued)

*Primary Examiner* — Michael P Ferguson
(74) *Attorney, Agent, or Firm* — Warner Norcross + Judd LLP

(57) ABSTRACT

A fastener unit and related method for securing a board to a support is provided. The fastener unit includes a spacer block, a grip element extending from the spacer block and configured to fit in and engage a groove of the board, and one or more board engagement elements extending from a portion of the spacer block. The board engagement elements can clamp the board, between an upper and/or lower surface of the board and a groove of the board, thereby securing the spacer block in a position adjacent the groove to establish a gap between the board and another board. Related methods of use also are provided.

14 Claims, 48 Drawing Sheets

Related U.S. Application Data continuation-in-part of application No. 29/648,131, filed on May 18, 2018, now Pat. No. Des. 850,897, and a continuation-in-part of application No. 29/649,771, filed on Jun. 1, 2018, now Pat. No. Des. 853,829.

(60) Provisional application No. 62/674,247, filed on May 21, 2018, provisional application No. 62/635,745, filed on Feb. 27, 2018, provisional application No. 62/545,709, filed on Aug. 15, 2017.

(51) Int. Cl.
*F16B 5/00* (2006.01)
*E04B 1/00* (2006.01)

(58) Field of Classification Search
CPC .. F16B 5/0635; E04B 5/023; E04F 15/02044; E04F 15/02183; E04F 2015/02105; E04F 2015/02122; E04F 2201/0517
See application file for complete search history.

(56) References Cited

U.S. PATENT DOCUMENTS

| | | | |
|---|---|---|---|
| 1,714,738 A | 5/1929 | Smith | |
| 1,879,459 A | 9/1932 | Pelton | |
| 1,888,611 A | 11/1932 | Wolfson | |
| 2,065,525 A | 12/1936 | Hamilton | |
| 2,066,813 A | 1/1937 | Williams | |
| 2,116,737 A | 5/1938 | Urbain | |
| 2,129,975 A | 9/1938 | Urbain | |
| 2,129,976 A | 9/1938 | Urbain et al. | |
| 2,325,766 A | 8/1943 | Gisondi | |
| 2,338,870 A | 1/1944 | Praeger | |
| 2,620,705 A | 12/1952 | Podvinecz et al. | |
| 3,020,602 A | 2/1962 | Siering | |
| 3,237,360 A | 3/1966 | Mills | |
| 3,267,630 A | 8/1966 | Olmholt | |
| 3,284,117 A | 11/1966 | Meehan | |
| 3,331,180 A | 7/1967 | Vissing et al. | |
| 3,439,464 A | 4/1969 | Omholt | |
| 3,553,919 A | 1/1971 | Omholt | |
| 3,577,694 A | 5/1971 | Omholt | |
| 3,619,963 A | 11/1971 | Omholt | |
| 3,713,264 A | 1/1973 | Morgan, Jr. | |
| 3,760,547 A | 9/1973 | Brenneman | |
| 4,023,831 A | 5/1977 | Thompson | |
| 4,117,644 A | 10/1978 | Weinar | |
| 4,125,006 A | 11/1978 | Lewis | |
| 4,125,972 A | 11/1978 | Pate | |
| 4,154,172 A | 5/1979 | Curtis, Jr. | |
| 4,170,430 A | 10/1979 | Mrotzek | |
| 4,266,914 A | 3/1981 | Seipos | |
| 4,281,494 A | 8/1981 | Weinar | |
| 4,296,580 A | 10/1981 | Weinar | |
| 4,333,286 A | 6/1982 | Weinar | |
| 4,435,935 A | 3/1984 | Larrea | |
| 4,448,007 A | 5/1984 | Adams | |
| 4,467,579 A | 8/1984 | Weinar | |
| 4,497,148 A * | 2/1985 | Lopez | E04B 1/617 52/126.3 |
| 4,498,272 A | 2/1985 | Adams | |
| 4,616,462 A | 10/1986 | Abendroth | |
| 4,701,066 A | 10/1987 | Beam et al. | |
| 4,703,601 A | 11/1987 | Abendroth | |
| 4,776,144 A | 10/1988 | Pardo | |
| 4,831,808 A | 5/1989 | Wynar | |
| 4,844,651 A | 7/1989 | Partridge | |
| 4,925,141 A | 5/1990 | Classen | |
| 5,184,497 A | 2/1993 | Hanlon et al. | |
| 5,271,670 A | 12/1993 | Grabher | |
| 5,394,667 A | 3/1995 | Nystrom | |
| 5,660,016 A | 8/1997 | Erwin et al. | |
| 5,842,319 A | 12/1998 | Ravetto | |
| 5,997,209 A | 12/1999 | Sachs | |
| 6,036,398 A | 3/2000 | Theodorou | |
| D427,050 S | 6/2000 | Bryan | |
| 6,230,385 B1 | 5/2001 | Nelson | |
| D450,568 S | 11/2001 | Sachs | |
| 6,314,699 B1 | 11/2001 | West | |
| 6,416,269 B1 | 7/2002 | Martel et al. | |
| 6,418,681 B1 | 7/2002 | Dunks | |
| 6,418,693 B2 | 7/2002 | Ballard | |
| 6,470,641 B1 | 10/2002 | Faure | |
| 6,484,467 B2 | 11/2002 | Crout | |
| 6,490,838 B2 | 12/2002 | Summerford | |
| 6,594,961 B2 | 7/2003 | Leines | |
| 6,647,638 B1 | 11/2003 | Doyal | |
| 6,651,398 B2 | 11/2003 | Gregori | |
| 6,651,400 B1 | 11/2003 | Murphy | |
| 6,675,545 B2 | 1/2004 | Chen et al. | |
| 6,711,864 B2 | 3/2004 | Erwin | |
| 6,763,643 B1 | 7/2004 | Martensson | |
| 6,871,467 B2 | 3/2005 | Hafner | |
| 6,986,934 B2 | 1/2006 | Chen et al. | |
| 6,993,875 B2 | 2/2006 | Rudduck | |
| 7,052,200 B2 | 5/2006 | Harris | |
| 7,073,303 B2 | 7/2006 | Baker | |
| 7,168,213 B2 | 1/2007 | Rudduck et al. | |
| D547,169 S | 7/2007 | Harris | |
| 7,398,623 B2 | 7/2008 | Martel et al. | |
| 7,444,792 B2 * | 11/2008 | Matson | E04D 12/00 24/336 |
| 7,533,500 B2 | 5/2009 | Morton et al. | |
| 7,546,717 B2 | 6/2009 | Juan Puerta | |
| 7,578,105 B2 | 8/2009 | Eberle, III | |
| 7,600,353 B2 | 10/2009 | Hafner | |
| 7,721,503 B2 | 5/2010 | Pervan et al. | |
| 7,779,765 B2 | 8/2010 | Donnell, Jr. et al. | |
| 7,805,902 B2 | 10/2010 | Martel | |
| 7,841,145 B2 | 11/2010 | Pervan et al. | |
| 7,841,150 B2 | 11/2010 | Pervan | |
| 7,908,816 B2 | 3/2011 | Grafenauer et al. | |
| 7,980,041 B2 | 7/2011 | Pervan et al. | |
| 8,042,311 B2 | 10/2011 | Pervan et al. | |
| 8,079,196 B2 | 12/2011 | Pervan | |
| D664,836 S * | 8/2012 | Kikuchi | D8/382 |
| 8,245,478 B2 | 8/2012 | Bergelin et al. | |
| 8,336,272 B2 | 12/2012 | Prager et al. | |
| 8,359,805 B2 | 1/2013 | Pervan et al. | |
| 8,382,414 B2 | 2/2013 | Vandenberg | |
| 8,387,327 B2 | 3/2013 | Pervan | |
| 8,499,521 B2 | 8/2013 | Pervan et al. | |
| 8,511,031 B2 | 8/2013 | Bergelin et al. | |
| 8,544,230 B2 | 10/2013 | Pervan | |
| 8,627,862 B2 | 1/2014 | Pervan et al. | |
| 8,650,826 B2 | 2/2014 | Pervan et al. | |
| 8,677,714 B2 | 3/2014 | Pervan | |
| 8,713,886 B2 | 5/2014 | Pervan et al. | |
| 8,733,065 B2 | 5/2014 | Pervan | |
| 8,763,341 B2 | 7/2014 | Pervan | |
| 8,769,905 B2 | 7/2014 | Pervan et al. | |
| 8,826,622 B2 | 9/2014 | Cappelle et al. | |
| 8,887,468 B2 | 11/2014 | Hakansson et al. | |
| 8,925,274 B2 | 1/2015 | Darko et al. | |
| 8,991,055 B2 | 3/2015 | Cappelle | |
| 9,145,691 B2 | 9/2015 | Cappelle | |
| 9,212,493 B2 | 12/2015 | Cappelle et al. | |
| 9,216,541 B2 | 12/2015 | Boo et al. | |
| 9,222,267 B2 | 12/2015 | Bergelin et al. | |
| 9,238,917 B2 | 1/2016 | Pervan et al. | |
| 9,260,870 B2 | 2/2016 | Vermeulen et al. | |
| 9,347,469 B2 | 5/2016 | Pervan et al. | |
| 9,347,470 B2 | 5/2016 | Maertens et al. | |
| 9,366,036 B2 | 6/2016 | Pervan | |
| 9,388,584 B2 | 7/2016 | Pervan et al. | |
| 9,428,919 B2 | 8/2016 | Pervan et al. | |
| 9,458,634 B2 | 10/2016 | Derelov | |
| 9,476,208 B2 | 10/2016 | Vermeulen et al. | |
| 9,531,319 B2 | 12/2016 | Braunstein et al. | |
| 9,822,809 B2 | 11/2017 | Shadwell et al. | |
| 9,874,032 B1 | 1/2018 | Chen | |
| 9,976,312 B2 | 5/2018 | Boschian | |
| 10,113,306 B2 | 10/2018 | Brigham et al. | |

(56) References Cited

U.S. PATENT DOCUMENTS

| | | |
|---|---|---|
| 10,214,896 B2 | 2/2019 | Tebo |
| 2003/0019174 A1 | 1/2003 | Bolduc |
| 2003/0101673 A1 | 6/2003 | West et al. |
| 2003/0121226 A1 | 7/2003 | Bolduc |
| 2003/0154662 A1 | 8/2003 | Bruchu et al. |
| 2004/0045244 A1 | 3/2004 | Hafner |
| 2004/0168382 A1 | 9/2004 | Rudduck et al. |
| 2004/0237460 A1 | 12/2004 | Green |
| 2005/0003160 A1 | 1/2005 | Chen et al. |
| 2005/0257473 A1 | 11/2005 | Shaw et al. |
| 2006/0179757 A1 | 8/2006 | Schulner |
| 2006/0283122 A1 | 12/2006 | Burgess et al. |
| 2007/0196624 A1 | 8/2007 | Chen et al. |
| 2007/0289249 A1 | 12/2007 | Martel |
| 2008/0240886 A1 | 10/2008 | Martel et al. |
| 2008/0279654 A1 | 11/2008 | Deschamps |
| 2009/0108719 A1 | 4/2009 | Lilly |
| 2009/0173032 A1 | 7/2009 | Prager et al. |
| 2009/0193741 A1 | 8/2009 | Cappelle |
| 2009/0217495 A1 | 9/2009 | Tipps et al. |
| 2009/0249730 A1 | 10/2009 | Vibiano |
| 2010/0050556 A1 | 3/2010 | Burns |
| 2010/0107524 A1 | 5/2010 | Moss |
| 2010/0257806 A1 | 10/2010 | Snell et al. |
| 2010/0260962 A1 | 10/2010 | Chen et al. |
| 2010/0319290 A1 | 12/2010 | Pervan et al. |
| 2011/0167744 A1 | 7/2011 | Whispell et al. |
| 2011/0225922 A1 | 9/2011 | Pervan et al. |
| 2012/0255158 A1 | 10/2012 | Kawasaki |
| 2013/0025230 A1 | 1/2013 | Turner |
| 2013/0287484 A1 | 10/2013 | Phillips |
| 2013/0340377 A1 | 12/2013 | Shadwell |
| 2014/0290173 A1 | 10/2014 | Hamberger |
| 2014/0305064 A1 | 10/2014 | Baker et al. |
| 2015/0211558 A1 | 7/2015 | Garrison |
| 2015/0275951 A1 | 10/2015 | Shadwell et al. |
| 2017/0037643 A1 | 2/2017 | Mitchell |
| 2017/0114536 A1 | 4/2017 | Tebo |
| 2017/0138063 A1 | 5/2017 | Boschian |
| 2017/0314278 A1 | 11/2017 | Lee et al. |
| 2017/0321434 A1 | 11/2017 | Shadwell et al. |
| 2017/0362815 A1 | 12/2017 | Brigham et al. |
| 2018/0010627 A1 | 1/2018 | Shadwell |
| 2018/0238060 A1 | 8/2018 | Doupe et al. |

FOREIGN PATENT DOCUMENTS

| | | | | |
|---|---|---|---|---|
| EP | 0482363 | | 4/1992 | |
| EP | 1187993 | | 3/2002 | |
| EP | 2995744 | | 3/2016 | |
| EP | 3150083 | | 4/2017 | |
| EP | 2 228 504 | * | 5/2017 | ............. E04F 15/02 |
| FR | 2968366 | | 6/2012 | |
| WO | 1997017505 | | 5/1997 | |
| WO | 1997042420 | | 11/1997 | |
| WO | 1999067541 | | 12/1999 | |
| WO | 2015196108 | | 12/2015 | |

OTHER PUBLICATIONS

Deck Spacers, downloaded from http://www.contractortalk.com/f50/spacers-cleats-simpson-worth-anything-82833/ (viewed Jun. 8, 2017).
Spacer clip, discovered 2017.

* cited by examiner

HIDDEN FASTENER UNIT AND RELATED METHOD OF USE

BACKGROUND OF THE INVENTION

The present invention relates to a fastener unit configured to fasten workpieces, such as boards, to support structures, such as joists, and more particularly to a fastener unit that engages a groove in the side of a board to secure the board to a support structure.

There are a variety of structures, such as decks, platforms and flooring, that include horizontal floors supported by an underlying support structure. The structures typically include boards that are placed side-by-side one another. The boards typically are arranged to extend cross support structures, such as joists, disposed under the boards at an angle, sometimes at a right angle. The boards usually are fastened to the joists using fasteners, such as nails or screws. The nails or screws can frequently become discolored over time, or can work themselves loose from the board and project upward from the board surface. Not only are these results aesthetically displeasing, they can present safety hazards.

Some manufacturers have developed hidden fastener systems that fit loosely within grooves of adjacent boards. These hidden fasteners typically include a biscuit-shaped upper plate having two horizontal flanges that fit into the grooves defined by the sides of adjacent deck boards, a single center hole through which a fastener extends to secure to the underlying joist, and a base that extends downward from the upper plate to an underlying joist. While the horizontal flanges can engage the grooves, these elements typically do not engage those grooves forcibly enough to tack the boards to the underlying joist and prevent them from moving during expansion and contraction under changing temperatures. These systems typically also require a user to manually hold the plate in alignment with one or more grooves of the boards as the fastener is advanced, which can be cumbersome. Depending on the height of the base and the distance of the groove from the board lower surface, sometimes these items can be mismatched so that the flanges do not fit well in or align with the grooves. In addition, the flanges are of a fixed thickness so that if that thickness is mismatched relative to a groove, the plate cannot fit in the groove, let alone secure the board to the underlying joist. Further, where a support structure includes a double or triple joist, with two or more joists positioned immediately adjacent one another, the foregoing fastener systems might not be properly sized to conceal those joists or fit within the associated confined spaces.

Accordingly, there remains room for improvement in the field of fastener units that are configured to secure grooved boards to underlying support structures.

SUMMARY OF THE INVENTION

A fastener unit and related method to secure a board to a support is provided. The fastener unit includes a spacer block, a grip element extending from the spacer block and configured to fit in and engage a groove of the board, and at least one board engagement element extending from the spacer block, configured to secure the spacer block adjacent the groove to establish a gap between the board and another board.

In one embodiment, the board engagement element can be a resilient compression element that is vertically compressible so that portions of it can be compressed from an open mode to a compressed mode. In the compressed mode, the board engagement element is sized and dimensioned smaller than a width of the groove so that the element can fit within the groove. After placement in the groove, the portions can expand within the groove to forcibly engage the groove, thereby securing the resilient compression element and the joined spacer block adjacent the groove and a side surface of the board.

In a further embodiment, the board engagement element is a resilient compression element that extends laterally from the spacer body, and in the same direction as a portion of the grip element. Optionally, the grip element and resilient compression element can extend rearwardly, from a rearward face of the spacer body, an equal amount or distance. Further optionally, the resilient compression element can include a front edge that does not extend forwardly, from a forward face of the spacer body, while the grip element can extend forwardly another distance from the forward face of the spacer body.

In another embodiment, the spacer body is of a thickness extending from a forward face and a rearward face. The thickness can be optionally less than 0.200 inches, further optionally less than 0.250 inches, and even further optionally less than 0.500 inches to provide a corresponding gap between adjacent boards.

In still another embodiment, the resilient compression element includes first and second portions, optionally in the form of wings, plates, rounded sections, ellipsoids, polygonal elements, and the like, any of which can be referred to as wings herein, that function similar to resilient springs. These portions can be pinched toward one another, to convert the resilient compression element from an open mode to a compressed mode. In the compressed mode, the portions can be located in the groove of the board, which optionally can be ⅛ inch to ⅜ inch wide or other dimensions depending on the application. When the portions are released, they can forcibly engage the groove to hold the fastener unit centered in the groove.

In even another embodiment, the board engagement element can be joined with the spacer body at a fracturable joint. This fracturable joint can include a zone of weakness, such as a thinned region, a region with perforations or holes, an area with a brittle material, or some other weakening portion so that a user can manually break off the element from the spacer body and fit the fastener unit in a particular location, for example, a confined space, or so that the element or other parts of the fastener unit can otherwise break off, fall off, fragment, become destroyed separate, dissociate from, become removed from or otherwise move away from other components, for example, upon advancement of a fastener or other action taken on the fastener unit.

In yet another embodiment, the grip element can be in the form of a channel. Optionally, the channel can be a c-channel that is turned upside down so that its opening faces downward. Associated protrusions of the channel can be configured to engage a lower interior surface of the board groove and effectively bite into that surface when the fastener is tightened down, to pull the grip element and its protrusions into that surface. In turn, this provides enhanced securement of the board to the underlying support structure, such as a joist.

In a further embodiment, the fastener unit can be equipped with an additional resilient compression element, projecting from the spacer body on opposite lateral sides of the spacer body. The first and second resilient compression elements can cooperate to forcibly hold the spacer body and fastener unit in place adjacent the groove during installation of the fastener. In turn, because the unit is self-supported, a user can use both hands to manipulate a tool, such as a power drill, to install the fastener. Also, because the unit is self-supported, a user can place multiple fastener units, place an adjacent board, and later come back to fasten down one or more boards with the fastener units.

In still a further embodiment, the spacer body defines a fastener hole that can include an upper portion and a lower portion. These upper and lower portions can have different diameters or dimensions to accommodate different screw types. In some cases the lower portion can include a diameter that is less than a diameter of the upper portion so that the tip of the screw can fit within the lower portion, while threads above that tip can fit within the upper portion. Optionally, the screw can be partially threaded into engagement with the spacer body, and in particular the interior surfaces of a first fastener hole defined by the spacer body.

In still yet a further embodiment, the grip element can be constructed from a first material, such as a metal and/or composite, while the spacer body, resilient compression element and other features can be constructed from a polymeric material. The polymeric material can be overmolded to the grip element to secure the grip element thereto, with the grip element at least partially entrapped in the spacer body.

In even a further embodiment, a fastener unit can include a spacer body defining a first fastener hole having first and second different internal dimensions, a threaded fastener supported by the spacer body within the first fastener hole, a grip element joined with the spacer body and configured to fit within and engage a groove of a board, and first and second joist legs extending downward from the spacer body and configured to straddle and clampingly engage sides of an underlying joist.

In yet a further embodiment, the fastener unit can be constructed so that one or more joist legs are joined with the spacer body at a fracturable joint so that the leg can be selectively manually removed, depending on the placement of the fastener unit relative to one or more joists or within other confining spaces.

In still yet a further embodiment, the fastener unit can include a spacer block and a grip element disposed transversely relative to the spacer block, extending from forward and rearward surfaces of the spacer block. A first joist leg can extend from a first lateral side of the spacer block and a second joist leg can extend from a second lateral side of the spacer block. The first and second joist legs extend outwardly and downwardly from the spacer block. One or both of the joist legs includes a stabilizer bar extending from the joist leg a predetermined distance. The stabilizer bar can be mounted below the spacer block and selectively positioned so that it can engage a bottom surface and/or side surface of a board, below a groove of the board, placed adjacent the fastener unit. In combination, the stabilizer bar, joist legs and/or the spacer body can engage one or more boards, adjacent which the spacer unit is placed, in multiple locations to thereby provide multiple points of contact with the spacer unit and those boards, and thereby stabilize the fastener unit in a particular orientation, optionally holding the fastener associated with the spacer unit in an upright, vertical orientation, ready for engagement by a tool.

In even a further embodiment, the fastener unit can include a spacer block and a grip element disposed transversely relative to the spacer block, extending from forward and rearward surfaces of the spacer block. A first joist leg can extend from a first lateral side of the spacer block and a second joist leg can extend from a second lateral side of the spacer block. The first and second joist legs extend outwardly and downwardly from the spacer block. The grip element can include one or more pressure distribution feet at opposing ends of the grip element. When a fastener of the unit is tightened down, such a pressure distribution foot can ensure most of the force is distributed at one or more of the opposing ends of the grip element, rather than near the spacer body. With certain types of grooved boards having a chamfer under the groove along a board bottom surface, this force distribution, deep within the groove, can impair or prevent tipping of the board caused by the tightening down of the fastener unit.

In yet another embodiment, the fastener unit can include a spacer block and a grip element disposed transversely relative to the spacer block, extending from forward and rearward surfaces of the spacer block. A first joist leg can extend from a first lateral side of the spacer block and a second joist leg can extend from a second lateral side of the spacer block. The first and second joist legs extend outwardly and downwardly from the spacer block. The spacer block can be a timing spacer block that is of a predetermined height set so that the spacer block engages an underlying joist or other support, optionally while a fastener of the unit is being tightened down to draw the fastener unit toward the joist or other support. With this timing spacer block, the fastener unit does not engage the grip element against the interior surfaces of the groove in such a way so as to pull the groove downward with too much force, which may cause tipping of the board in some circumstances.

In another embodiment, the fastener unit can include a spacer block configured to at least partially receive a fastener, the spacer block having a thickness corresponding to a preselected gap between a first board and a second adjacent board, the spacer block defining a recess; a grip element disposed in the recess and projecting beyond the thickness of the spacer block, the grip element configured to at least partially receive the fastener, the grip element configured to engage a first groove defined by the first board, the grip element having at least one downwardly facing projection, the grip element having a grip upper surface; and a board engagement element configured to engage a portion of the first board, distal from the first groove, to secure the spacer block adjacent a first side surface of the first board before a fastener is advanced relative to the spacer block and the grip element.

In still another embodiment, the board engagement element is operable in a clamping mode in which the board engagement element engages an upper surface of the first board, distal from the groove. Simultaneously, the grip upper surface can engage a groove upper wall so as to secure the fastener unit adjacent the first side surface of the board.

In yet another embodiment, the first board engagement element includes a resilient arm projecting away from a first platform and downward. The resilient arm can engage the upper surface and exert a clamping force on the board in cooperation with the grip element.

In even another embodiment, the board engagement element can include a first platform. One or more legs can extend downwardly from the first platform. These legs can each extend adjacent the spacer block and can each be configured to hold the first platform at a preselected distance from the grip element.

In even still another embodiment, the spacer block can define a first leg track adjacent the first side surface of the spacer block and a second leg track adjacent the second side surface of the spacer block. One leg can frictionally engage the first leg track to hold the first platform at the preselected distance from the grip element, and another leg can frictionally engages the second leg track to hold the first platform at the preselected distance from the grip element. The first and second legs can be biased toward one another to exert the friction on the spacer body.

In even yet another embodiment, the first and second legs can be movable, for example, slidable, relative to the first and second track respectively to adjust the preselected distance, and thereby operate the board engagement element in a clamping mode in which the portion of the first board is clamped between the first platform and the grip element.

In a further embodiment, the fastener unit can include a fastener extending through the spacer block and the grip element. The fastener can include threads on a shaft. The board engagement element can be a rotatable wheel mounted on the shaft. For example, the element can include a first platform and can be rotatably threaded on the shaft. The board engagement element can be operable in a clamping mode in which the first platform is rotatable about the shaft toward the grip element to thereby clamp the portion of a board between the first platform and the grip element, thereby securing the fastener unit adjacent a side surface of that board.

In still a further embodiment, the board engagement element can be operable in a clamping mode in which the board engagement element engages a lower surface of the first board, distal from the groove. Simultaneously, the downwardly facing projection can engage a groove lower wall so as to secure the fastener unit adjacent the first side surface of the board.

In yet a further embodiment, the board engagement element can be joined with the spacer block via first and second spring legs extending downward from a first platform, below the grip element. The board engagement element can be a plate disposed below the spacer block. The plate can be configured to engage a lower surface of the board, while the grip element engages the groove, to secure the spacer block adjacent the first side surface of the first board.

In even a further embodiment, the plate can be pulled away from the grip element so the board engagement element is in an expanded mode while the fastener unit is installed on the board, with the grip element in the groove and the plate below the groove. The plate can be released, in which case the legs bias the plate back toward the grip element so the board engagement element and fastener unit in general convert to a clamping mode to clamp the part of the board between the groove and the lower surface between the grip element and the plate.

In another, further embodiment, the board engagement element can include a first leg that extends downward from the spacer body to a first leg end. A first foot can extend from the first leg end and generally parallel to the grip element. The first foot can engage the lower surface of the board while the grip element engages the groove so the first foot and grip element cooperate to urge the spacer block and the fastener toward the first side surface of the first board, thereby securing the spacer block adjacent the first side surface of the first board.

In still another, further embodiment, the board engagement element can be joined with the spacer block such that the board engagement element can be selectively disassociated from the spacer block. As used herein, when a component is disassociated from another component, such as the spacer block, other elements or the fastener unit, that component or pieces thereof can break off, fall off, fragment, become destroyed, separate, dissociate from, become removed from or otherwise move away from the other component, the spacer block or the fastener unit.

In yet another, further embodiment, the dissociated component or pieces of it can fall, project, or otherwise move away from the grip element and spacer body upon sufficient advancement of the fastener. The component or pieces can be constructed from biodegradable material, such as fibers, cellulose, wood, starch, amylose, UV unstable polymers, and the like. When subjected to moisture, water, heat, UV rays or the like, the component or pieces can break down and disintegrate or turn from solid to liquid or a gel. In turn, the fastener units can be used without the disassociated parts having to be picked up or retrieved by a user because they simply biodegrade in the environment.

In still another, further embodiment, the disassociated component or pieces can be colored brightly so they can be easily perceived by a user and picked up or retrieved, then dispensed of properly.

The current embodiments of the fastener unit and related methods of use provide benefits in hidden fasteners that previously have been unachievable. For example, where the fastener unit includes a multi-dimensional fastener hole defined by the spacer body, the spacer body can be configured to hold a fastener therein, yet not split or become damaged when the fastener is advanced through the spacer body. Where the fastener includes one or more fracturable joints between the spacer body and one or more of the board engagement elements, those elements can be easily removed and discarded from the unit to fit a particular joist combination or confined space, or can become disassociated from the remainder of the fastener unit after performing a particular function, such as clamping or securing the fastener unit to a board. Where the unit includes the board engagement element, such as a resilient compression element, that element can secure and hold the fastener unit in place adjacent the groove, without the need for additional hands to hold the unit. This can enable a user to place multiple fastener units along a board groove, install another board adjacent those units, and then come back and secure all the fastener units so that the boards are held in a fixed manner relative to the underlying support structure. Where the grip element is included having one or more downward protrusions or cleats, those elements can forcibly engage the groove to prevent the board from creeping or moving during expansion and contraction thereof during and under different temperatures. Where the spacer body is of diminished thickness, the entire fastener unit can be well concealed between adjacent boards, yet provide firm securement of those boards to underlying support structure, and provide a gap large enough to accommodate a fastener head passing between the boards. Where the board engagement element cooperates with a grip element, the fastener unit can be secured adjacent a side surface of a board, engaging either the upper surface of the board or the lower surface of the board in a clamping mode of the fastener unit and board engagement element. Further, where the board engagement element is able to be disassociated from the spacer body and remainder of the fastener unit, that component can be used to temporarily hold the fastener unit in ways, locations and orientations previously unattainable.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENTS

Figure 1:
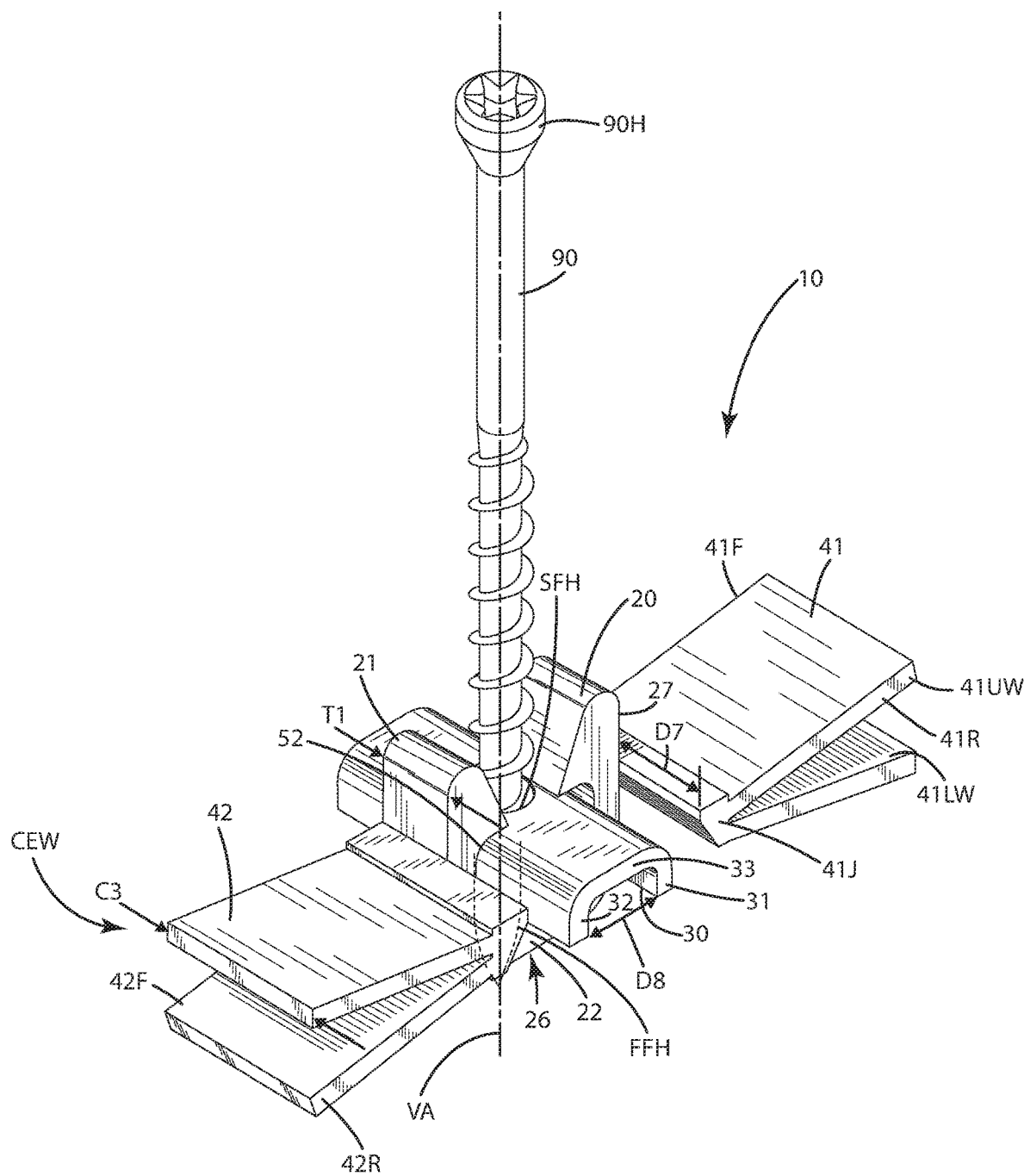
FIG. 1 is a perspective view of a current embodiment of the fastener unit with a fastener associated with the unit.

A current embodiment of the fastener unit is illustrated in FIGS. 1-7, and generally designated 10. The fastener unit 10 can generally include a spacer body 20, a grip element 30 protruding forwardly and rearwardly from the spacer block, also referred to as a spacer body herein, and one or more board engagement elements, such as a first resilient compression element 41 and a second resilient compression element 42. These compression elements can be joined with the spacer body optionally via respective fracturable joints 48 and 49. A fastener 90 can be at least partially disposed through the spacer body 20 and/or the grip element 30 when the unit is in an uninstalled state as shown in FIG. 1.

The current embodiments of the fastener unit 10 are well suited for a variety of building and construction projects, such as commercial, residential and other construction projects. The fastener units, however, can be modified for use in other applications, such as automotive, marine, industrial and/or consumer products. As described herein, the fastener units can be used in the application of grooved boards or lap boards that are fastened to an underlying support structure. The boards can be constructed from wood, plastic, composites, metal, ceramic, tile, masonry or other materials depending on the application.

Figure 2:
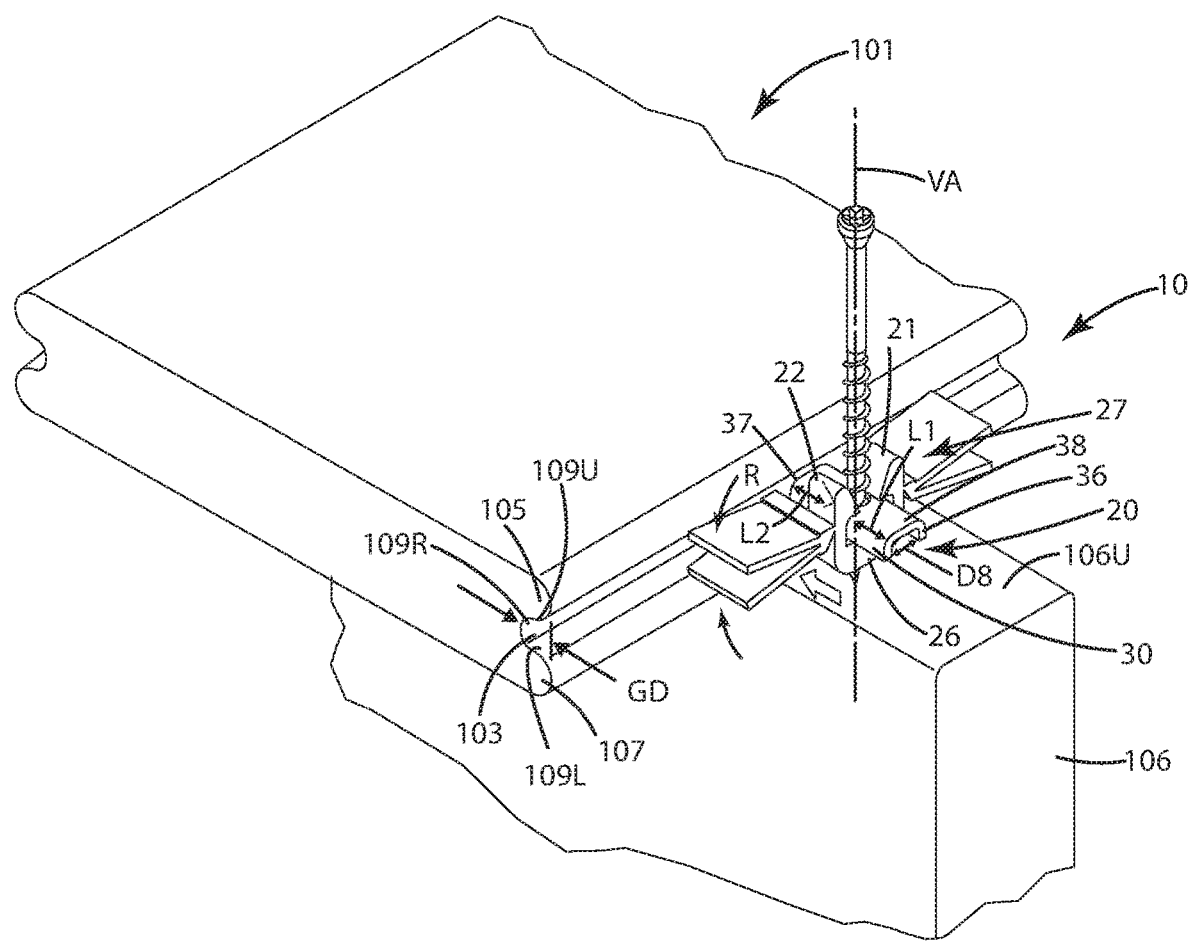
FIG. 2 is another perspective view of the fastener unit about to be installed in a first groove of a first board.
Figure 6:
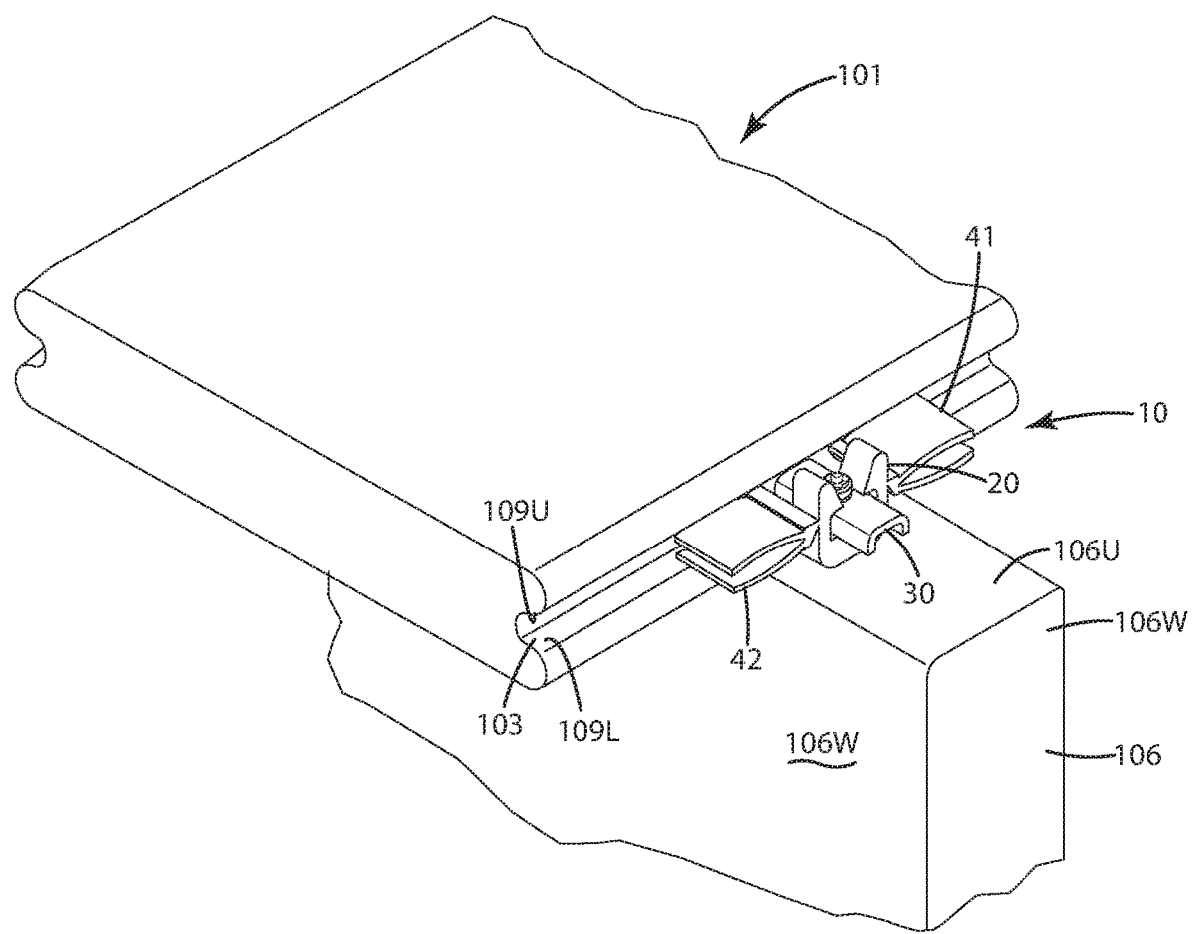
FIG. 6 is a perspective view of the resilient compression elements installed in a groove and holding the fastener unit adjacent the board.

As shown in FIGS. 2 and 6, the boards 101, 102 can include respective grooves 103 and 104. These grooves can include a groove depth GD of optionally 1/16 inch, further optionally 1/8 inch, even further optionally 1/4 inch, yet further optionally 1/2 inch or other depths depending on the particular application. Further, as shown in FIG. 2, the groove can be bounded by upper 105 and lower 107 lobes or projections that transition to the upper and lower surfaces of the board 101. Although shown as a continuous groove, each of the respective grooves 103 and 104 can be intermittent and/or discontinuous, depending on the particular application and board construction. Each groove 103 also can include a lower wall 109L, a rearward wall 109R and an upper wall 109U. These walls can be radiused and can transition smoothly or cleanly to one another as shown. Alternatively, they can be joined at right angles, depending on the application.

The fastener unit 10 of the current embodiment will be described generally in connection with joining boards 101, 102 to an underlying joist 106, where the deck boards lay across an upper surface 106U of the joist. The joist 106 of course can be any support structure or element and can be constructed from any type of material, such as wood, plastic, composites, metal, ceramic, tile, masonry or other materials depending on the application. Further, it will be appreciated that the fastener unit can be used in conjunction with any type of decking, flooring, covering, roofing or other components.

Turning now to the fastener unit 10, each of the respective components, such as the spacer block 20, board engagement elements or resilient compression elements 41, 42, grip element 30 and fastener 90 will now be described in more detail. Referring to FIGS. 1-4, the spacer block 20 includes a front surface 21 and an opposing rear surface 22. These surfaces are on opposite sides of the vertical axis VA of the spacer body 20. This vertical axis VA can correspond to a longitudinal axis of the fastener 90. As described further below, a first fastener hole FF1 is aligned with this vertical axis VA. The spacer body 20 can include a first side surface 23 and an opposing second side surface 24.

The spacer block can define a thickness T1 that extends between the front surface 21 and the opposing rear surface 22. This thickness corresponds to a preselected gap G (FIG. 7) that to be located between adjacently placed boards 101, 102. This gap and thickness can be optionally at least 0.180 inches, further optionally at least 0.200 inches, further optionally at least 0.250 inches, even further optionally at least 0.300 inches, yet further optionally at least 0.350 inches, further optionally at least 0.400 inches, yet further optionally at least 0.450 inches, even further optionally at least 0.500 inches, or wider or increments thereof, depending on the application and the desired spacing between adjacent deck boards. Alternatively, the gap and thickness can be optionally less than 0.180 inches, further optionally less than 0.200 inches, still further optionally less than 0.250 inches, even further optionally less than 0.300 inches, yet further optionally less than 0.350 inches, further optionally less than 0.400 inches, yet further optionally less than 0.450 inches, even further optionally less than 0.500 inches, or narrower or increments thereof, depending on the application and the desired spacing between adjacent deck boards. Optionally, the thickness T1 and corresponding gap G set by the spacer body can be equal to and/or greater than the diameter DF of the fastener head 90H. In this manner, the fastener head can fit between and not excessively mar board surfaces that are placed adjacent the spacer body.

Figure 7:
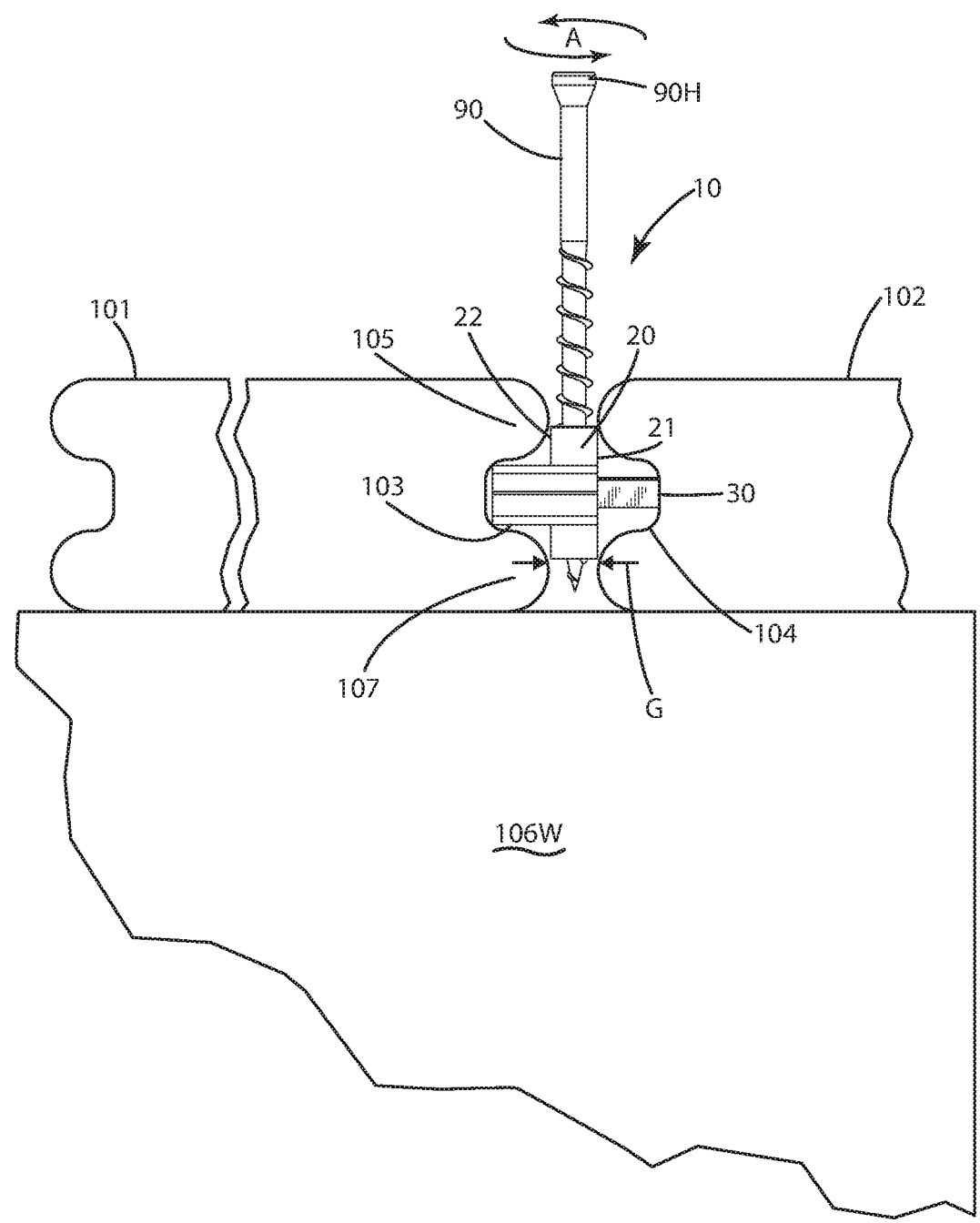
FIG. 7 is a side sectional view of the fastener unit installed within grooves of adjacent boards and establishing a gap with a spacer body between those adjacent boards.
Figure 8:
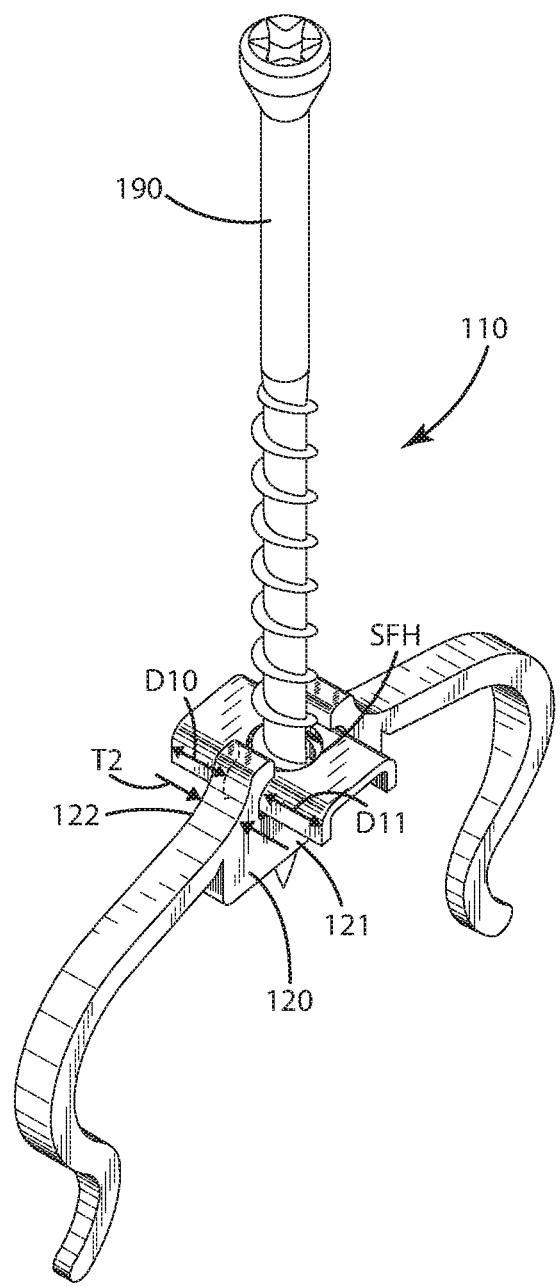
FIG. 8 is a perspective view of a first alternative embodiment of the fastener unit.

The spacer body 20 can set this gap G by way of the front surface 21 engaging in adjacent board, for example, board 102 in FIG. 7, and the rearward opposing face 22 engaging the board 101 as shown in FIG. 7. With this spacer body being disposed generally between the upper and lower lobes or projections 105, 107 that straddle the respective grooves 103 and 104, the spacer body effectively prevents those boards 101 and 102 from being placed any closer to one another than the gap G due to the thickness T1 of the spacer body 20 there between. As illustrated, the spacer body front surface 21 can engage the upper lobe 105 of a board above the groove 104. A lower portion of the spacer body 26 can engage the lower lobe 107 of the board, generally below the groove. Optionally, the spacer body can engage portions of the side surface of the board in the regions of the lobes 105 and 107 above and below the groove 103.

Figure 3:
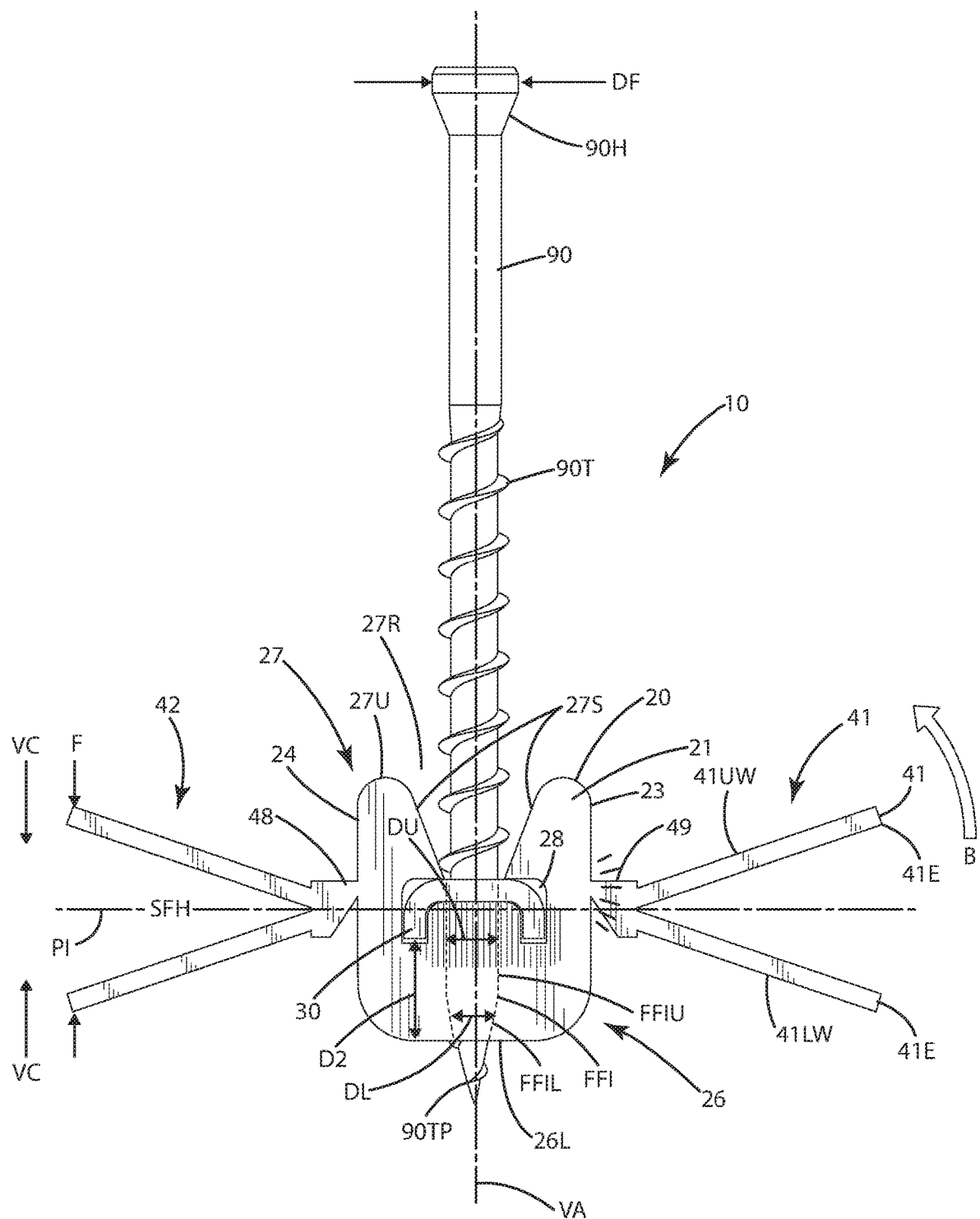
FIG. 3 is a front view of the fastener unit.
Figure 4:
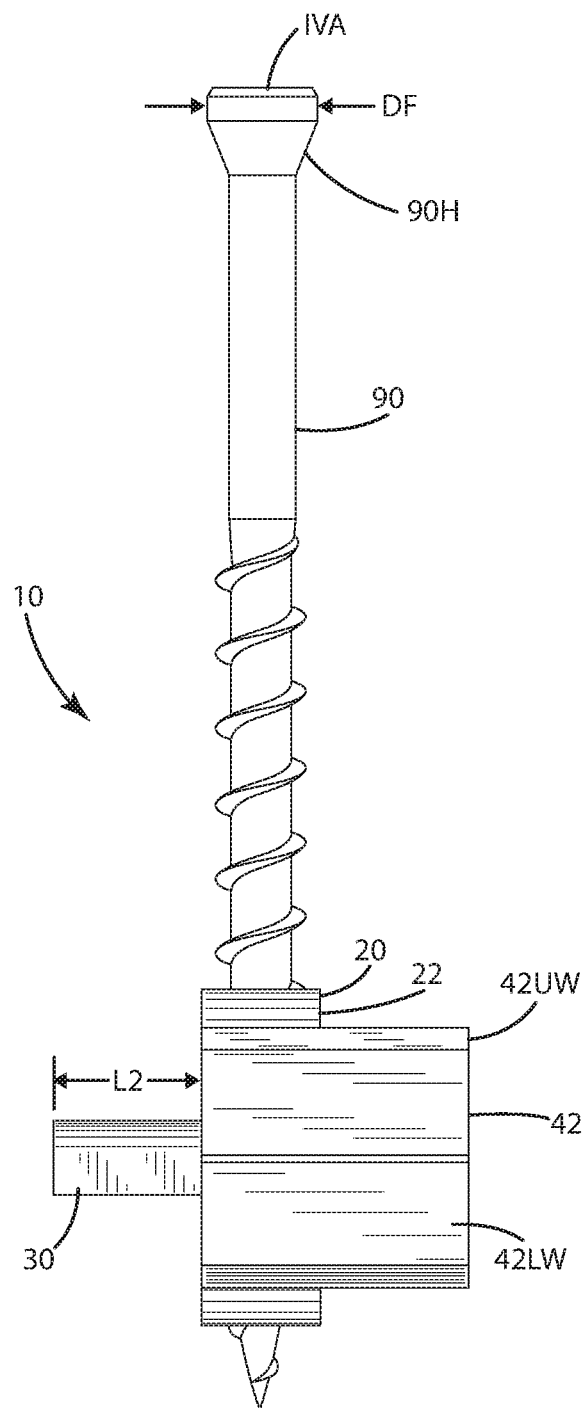
FIG. 4 is a side view of the fastener unit.

As shown in FIGS. 1 and 3, the spacer body upper portion 27 can include or define a recess 27R that extends from an upper most surface 27U, to a location adjacent the grip element 30. This recess 27R can be flanked by opposing ramped surfaces 27S. These ramped surfaces 27S can facilitate insertion of the fastener 90 into the first fastener hole FF1 as described further below.

Figure 5:
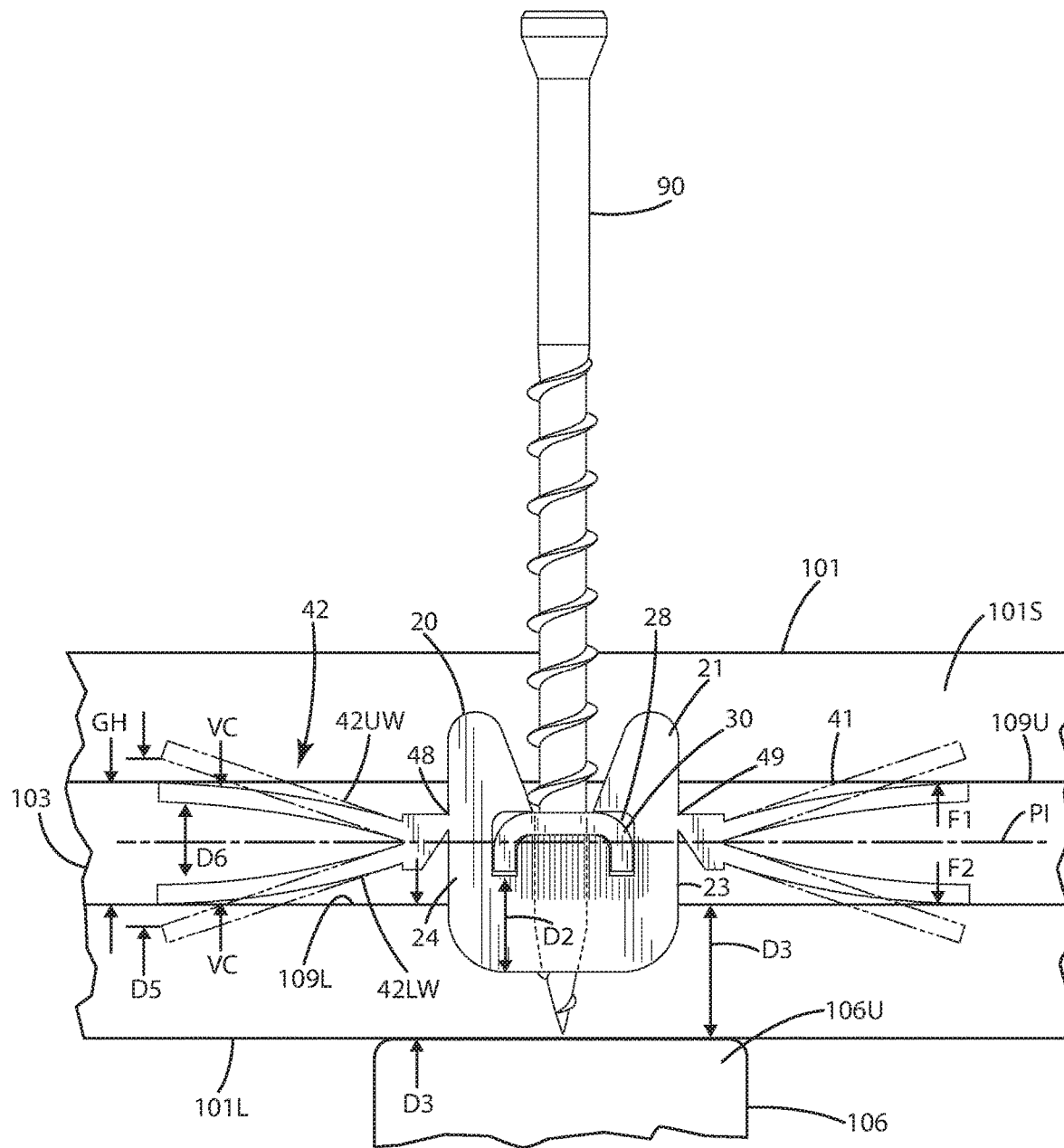
FIG. 5 is a front view of the fastener unit with the resilient compression elements being converted from an open mode to a compression mode.

As shown in FIGS. 1 and 3, the lower portion 26 can include a lower surface 26L that can be generally flat. The distance D2 between the lowermost portion of the grip element 30 and the lower surface 26L of the lower portion 26 can be less than the distance D3 between the lower wall 109L of the groove 103 as shown in FIG. 5. With this distance D2 less than D3, the spacer block 20 optionally will not interfere with the grip element 30 being brought into contact and engagement with the lower surface 109L of the groove. For example, if the distance D2 was optionally greater than D3, this might interfere with the engagement of the grip element 30 with the components of the groove 103. Of course, this alternative construction can be implemented for different applications where grip element engagement is irrelevant.

As shown in FIGS. 3 and 5, the spacer body 20 also can define a grip element recess 28. This grip element recess can extend generally through the spacer body, from the forward surface 21 to the opposing rearward surface 22. This grip element recess can be of a corresponding shape relative to the shape of the grip element 30. The recess 28 can be in the form of an inverted U- or C-shaped channel that opens downward toward a joist 106. This recess 28 can be sized to enable the grip element 30 to be inserted through the spacer body and in some cases, friction fit and held in place relative to the spacer body. Of course, there can be some gaps between the sides of the recess and the grip element 30 so that the spacer body does not hold that grip element well. In such constructions, the fastener 90, extending through a grip element aperture, also called a second fastener hole SFH defined by the grip element 30 and into the first fastener hole FF1 of the spacer body 20. Due to the engagement of the threads 90T of the fastener with the first fastener hole FF1, the fastener can secure the grip element in place relative to the spacer body. Optionally, the grip element 30 can be overmolded or 3-D printed over with material that forms the spacer body. In such a case, the grip element can be at least partially encapsulated by the spacer body and held in place accordingly.

As shown in FIG. 3, the first fastener hole FF1 can include an upper portion FF1U and a lower portion FF1L. The upper portion and lower portion can be of similar geometric shapes. For example, the upper and lower portions can both be cylindrical. In some cases, however, one can be frustoconical and the other can be cylindrical. In yet other applications, the shape can be rectangular, square, polygonal, ellipsoid, rounded or other geometric shapes. These respective portions can have different diameters or dimensions. For example, the upper portion can include a diameter DU and the lower portion can include a diameter DL. The lower portion diameter DL can be less than the upper portion diameter DU. This can enable the tip 90TP of the fastener 90, which can be pointed or frustoconical to be inserted into and have its threads partially bite into the lower portion FF1L. This in turn, can enable the fastener 90 to be slightly threaded into the spacer body so that it is secured thereto via those threads and the interaction of the threads with the first fastener hole FF1. It will be noted that although referred to herein as a diameter, that phrase encompasses any dimension of the first fastener hole, regardless of whether the respective portions of the hole are circular, elliptical, rounded or instead are polygonal.

Turning to FIGS. 1-5, the grip element 30 can be in the form of a C-, V- or U-shaped channel. The grip element can be joined with the spacer body and optionally disposed within a spacer grip element recess or aperture 28. The grip element can include a base 33 and optional first 31 and second 32 downwardly extending protrusions, cleats or gussets. These cleats can optionally be integrally formed with the base 33. The cleats can be spaced a distance from one another and relative to the second fastener hole SFH, and thus the fastener 90 and the fastener head 90H. In particular, the cleats can be spaced so that when the head 90H is tightened and engages the grip element, first and second portions on opposite sides or ends of the head or its diameter respectively can exert forces downward directly over and on the first and second cleats 31, 32, without bending the grip element. The cleats can function as reinforcing members to the base in this manner, particularly when the fastener head 90H is pressing down on the base, to optionally prevent buckling of that base. Optionally, as shown in FIG. 2, the cleats 31, 32 can be spaced so their interior facing surfaces are a distance D8 of optionally less than 0.500 inches from one another, further optionally less than 0.250 inches from one another, even further optionally less than 0.200 inches from one another, yet further optionally less than 0.180 inches from one another, and still further optionally about 0.208 from one another. The diameter DF of the fastener can be equal to, less than or greater than this distance D8. Optionally, the diameter DF can be equal to or slightly greater than the distance D8. In turn, this can maintain the cleats under or immediately adjacent the lower portions of the head 90H when those portions engage the grip element. Again, this can add rigidity and support closer to the fastener as it is tightened so the base and grip element in general do not deform, bend or buckle due to the downward force exerted by the fastener in the middle of the grip element.

These cleats can be configured to engage the grooves 103 and 104 of the respective boards with which the fastener unit 10 is used. As shown, the cleats can include flat lower edges, however these edges can be sharpened so that they are angled and come to points. Although not shown, the cleat lower edges can be serrated and/or include teeth to better bite into the groove of the board when the fastener unit is secured in place with the fastener 90.

As mentioned above, the grip element 30 includes a grip element aperture or second fastener hole SFH. This fastener hole can be aligned with the first fastener hole FF1 of the spacer body 20 so that the fastener can fit through both simultaneously. This second fastener hole SFH can be disposed in the center of the base 33, and optionally centered halfway between the forward edge 36 and rearward edge 37 of the grip element 30 as shown in FIG. 2.

Optionally, the second fastener hole SFH can be a circular hole drilled through the base 33. In other cases, the second fastener hole SFH can be a recess ground through the base and one or more of the cleats 31 or 32, but only from a single side. This can enable the grip element to retain enough material so that the head 90H of the fastener 90 will engage the grip element and pull it toward the underlying joist 106. The second fastener hole can be large enough to accept the threads of a fastener therethrough, but smaller than the diameter of the fastener head so that the head engages and pulls the grip element when tightened.

The grip element can also include a forwardly extending portion 38 that extends forwardly of the forward surface 21 of the spacer body 20. The grip element can also include a rearward portion 37 that extends rearwardly of the rearward face 22 of the spacer body. The forward portion and rearward portions of the grip element can be of lengths L1 and L2, which can be equal extending from the respective forward and rearward faces of the spacer body. Of course, in some applications the distances and lengths can vary.

The grip element 30 can be constructed from a variety of materials, such as metal, composites, polymers, ceramics, reinforced composites, polymers and the like. The grip element can be strong enough so that it does not buckle or collapse when the fastener head 90H engages it and pulls the grip element 30 into the lower surface 109L of the board groove 103. In this manner, the fastener 90 pulls the grip element 30 into tight engagement with that lower surface 109L or other components of the groove 103. This in turn, clamps the board 101 down to the underlying support structure 106. Due to this clamping, the board 101 effectively can be prevented from moving upon expansion and contraction of that board when subjected to different environmental conditions, such as heating and cooling. This can prevent the board from creeping in one direction or the other or generally becoming uneven.

Optionally, although shown as an inverted channel, the grip element can be in the form of a small tube with corresponding teeth, a single flat piece of high-strength steel, optionally with serrations or knurling on its lower surface, or other forms, depending on the application and the materials from which the boards are constructed and/or as well as the desired holding strength.

As mentioned above, the fastener unit 10 can include first 41 and second 42 resilient compression elements. These resilient compression elements can be similar in structure and therefore only one will be described in detail here. It also will be appreciated that one of the resilient compression elements can be eliminated from the design in certain applications. In further applications, that area of the fastener unit can be occupied by a simple flange or leg that extends outwardly from the side surface of the spacer body 20, where that component is not compressible or movable from an open mode to a compressed mode as with a resilient compression element.

The first resilient compression element 41 can extend outwardly from the first side surface 23 of the spacer body 20. The second resilient compression element 42 can extend outwardly from the second side surface 24 of the spacer body, which is opposite the side 23. Thus, the resilient compression elements optionally can be symmetric about the vertical axis VA as shown in FIG. 3. Generally, the resilient compression elements 41 and 42 can be joined on opposite sides of the vertical axis VA. In this manner, they can engage the groove distal from one another to provide two or four points of engagement and contact between the fastener unit and the groove, not counting the engagement by the grip element 30.

The first resilient compression element can include a vertically compressible upper wing 41UW and a vertically compressible lower wing 41LW. These wings can be joined at a junction 41J. The wings as illustrated are generally in the form of flat plates angled relative to another and joined at apex at the junction 41J. Of course, in other applications these wings can be curved, rounded, or of other shapes. These upper and lower wings can be designed to be vertically compressed in direction VC as shown in FIGS. 3 and 5. By vertically compressible, it is meant that the a wing or component or portion of the resilient compression element can be moved in direction of the arrows VC, generally toward a plane P1 that is orthogonal to or otherwise transverse to the vertical axis VA of the spacer body 20. Due to their resilient nature, however, these portions resiliently deform and are urged to expand and re-attain their previous configuration in an open mode of those elements as shown in FIGS. 1 and 3. After application of forces F to move the wings toward one another and/or generally toward the plane P1, due to the resilient nature of the wings, those wings are self-urged to open back up to the configuration shown in FIGS. 1 and 3.

The resilient compression elements 41, 42 are operable in an open mode, as shown in FIG. 3 and a compressed mode as shown in FIGS. 5-7. In the open mode, the fastener unit 10 is not yet installed relative to a groove of a board. In that configuration, the ends or outermost portions of the wings, farthest from the spacer body 20, are disposed a distance D5 from one another. This distance D5 in the open mode can be less than the height GH of the groove. Because of the vertically compressible nature of the resilient wings 42UW and 42LW of the resilient compression element 42, these wings can be moved toward one another or generally toward a spacer body horizontal reference plane, that is, the first plane P1. Optionally, this plane P1 can pass through the grip element recess 28 and/or the portions of the grip element 30. When these wings are vertically compressed under a vertical compression force F, the distance D6 between them decreases. This distance D6 can be less than the groove height GH. Optionally, the compression elements upper and lower portions can be separated by a variable distance. This distance can be varied so that the resilient compression elements can fit within a particular groove of a board.

Referring to FIG. 3, the outer ends 41E of the wings, and generally the resilient compression element 41, are free ends that extended the space. That is, they are not connected to one another. Optionally, in some applications, these elements and the ends can be connected to one another, provided that the connection allows vertical compression in direction VC. As an example, the upper and lower wings can be joined with corresponding wings, in the shape of "V", that extend outwardly from the ends 41E. In turn, this allows these components to be compressed. In other constructions, the vertically compressible wings can be in the form of elongated elliptical or circular shapes that are structured to enable them to be compressed and reduce their overall vertical dimension, optionally to some dimension that is less than the groove height GH of the groove 103.

With reference to FIG. 5, in operation, a user can manually apply a force F to vertically compress the wings 41 and 42 in direction VC toward the plane P1 and/or generally toward one another. This converts the wings from the open mode shown in broken lines to a compressed mode as shown in solid lines. The resilient wings or portions of the compression elements bend, flex or otherwise move toward one another so that the distance between them is reduced from the distance D5 to the distance D6. This reduction in distance can be approximately 5%, 10%, 15%, 25%, 30%, 35%, 40%, 50% or more, depending on the application and amount of vertical compression. Generally, the first wing and second wing or other portions of the resilient compression element are resiliently moveable toward one another and/or the first plane P1 such that the vertical distance between the wings decreases upon the application of a compressive force by a user.

With the resilient compression elements in the compressed mode, a user can install those elements 41 and 42 into the groove 103. Because the distance D6 is less than the groove height GH, these elements will now fit within the groove. When the user releases or reduces the force F applied in the compressed mode to the respective portions of the resilient compression element, those wings want to go back to the configuration of the open mode. Due to the upper 109U and lower 109L surfaces of the groove, engagement if those wings with the resilient compression elements and the respective wings or other portions thereof, exert forces F1 and F2 on the board 101 in the groove, and against the upper and lower surfaces of the groove. These forces can optionally be at least 0.0001 pounds, further optionally at least 0.001 pounds, even further optionally at least 0.05 pounds, yet further optionally between 0.0001 pounds and 0.5 pounds. Of course, other forces can be exerted by the compression elements against the surfaces of the groove depending on the application and configuration of the resilient compression elements.

Due to the forcible expansion of the resilient compression elements within the groove, the resilient compression elements secure the spacer block in a position adjacent the first groove. In this manner, the spacer block can be disposed in and effectively form the gap G between the side surfaces of the boards 101 and 102 when the second board is installed, as shown in FIG. 7.

The resilient compression elements 41, 42 can include respective front edges 41F, 42F and rear edges 41R, 42R. The rear edges 41R are configured to fit within the groove 103 of the board 101. In some cases, the rear edges can be disposed entirely within the groove and located adjacent the rear wall 109R. The front edges, however, can extend outward from the groove, and beyond the site surface of the board, and in particular the lobes 105 and 107.

Optionally, the front edge and rear edge are separated by a compression element width CEW. This compression element width CEW can be greater than the thickness T1 of the spacer block 20. Put another way, the thickness T1 of the spacer block 20 can be less than the compression element width CEW. Thus, the resilient compression elements can extend forward and/or rearward from the front and rear surfaces of the spacer block. As illustrated, the front edge 42F can lay within a common plane with the front surface 21 of the spacer block 20. The rearward edges 41R, 42R can extend beyond and outwardly from the spacer block rear surface 22 a distance D7 as shown in FIG. 1.

In some cases, there can be spatial relationships between the grip element, spacer block and resilient compression elements. For example, the grip element can have a grip element length L3 that extends from the front edge to the rear edge of the grip element 30. As mentioned, above the spacer block 20 can include a spacer block thickness T1 and the resilient compression elements can each include compressible element widths CEW. As illustrated, the grip element length L3 can be greater than the compressible element width CEW. The resilient compression element width CEW can be greater than the spacer block thickness T1. In some cases, both the grip element length L3 and the compression element width CEW can be greater than the thickness T1. This can enable the respective grip element and resilient compression elements to fit within the groove of one board yet not interfere with fitment of another board adjacent the first board. Indeed, the compression element width CEW can be less than the sum of the groove depth GD plus the thickness T1 of the spacer block. This can enable the resilient compression elements to be disposed within the groove to hold the spacer block in place, yet not extend beyond the spacer block to interfere with the setting of a gap between adjacent boards. With this decreased width, the resilient compression elements also might not interfere with or engage another groove 104 of an adjacent board 102. Instead, only the grip element 30 optionally extends into and is engaged against that groove 104 to secure the boards to another.

The resilient compression elements 41, 42 can be joined with the spacer body 20 at respective fracturable joints 48 and 49. As shown in FIGS. 3 and 5, these fractional joints can be effective zones of weakness where the material joining the spacer body and the resilient compression elements is thinned so that those resilient compression elements can be bent in direction B and effectively break off at that joint. This is illustrated in FIG. 3 where the joint 49 has been fractured. In some cases, the fractional joint can be a portion of plastic that has perforations or holes extending therethrough. With this fracturable a joint, a user can selectively and manually remove one of the resilient compression elements 41, 42 to fit in a particular confined space or over a combination of abutting underlying support joists.

A related method of using the fastener unit 10 of the current embodiment will now be described. In general, the fastener unit can be provided including its spacer body 20, grip element 30, and resilient compression elements 41 and 42. The fastener 90 can be installed therein or can be installed by the user generally extending through the fastener holes as described above and engaging different portions of those holes as also described above. A user can apply a force F as shown in FIG. 3 to vertically compress in direction VC the wings of the resilient compression element toward one another and/or generally toward a plane P1. This in turn, changes the distance between the ends of the wings from a distance D5 to a lesser distance D6. When so compressed, the fastener unit transforms from an open mode, shown in broken lines, to a compressed mode, shown in solid lines, in FIG. 5. The wings of the resilient compression elements as well as the rearward portion 37 of the grip element 30 can be inserted into the groove 103 as shown in FIG. 6. These elements can be pushed in direction R as shown in FIG. 2 into the groove. The wings can be released to remove the manually applied compressive force F on the wings. In turn, the wings resiliently deform back toward their configuration in the open mode from the compressed mode. This in turn, exerts forces F1 and F2 by the resilient compression elements against the upper and lower surfaces of the groove. This fixes the fastener unit in place adjacent that groove. The spacer body 20 is thus held adjacent the first side surface 101S of the board 101 that is adjacent the groove 103.

As mentioned above, in some cases, two joists may be immediately adjacent one another. To center the fasteners and associated grip elements over each of the joists, one resilient compression element can be broken off each of the adjacent fastener units. This can be achieved by the user manually bending in direction B one of the resilient compression elements 41 to snap that component off from the spacer body as shown in FIG. 3.

With the fastener unit properly installed relative to the first board 101, a second board 102, as shown in FIG. 7, can be placed immediately adjacent the first board 101, but separated by a gap G established by the thickness of the spacer body 20 of the fastener unit 10. Due to the grip element 30 extending outwardly from the forward face 21 of the spacer block, that grip element can be installed in the second groove 104 of the second board 102. With the boards so installed on the joist 106, the fastener 90 can be rotated in direction A. As a result, the fastener advances through the spacer body 20, the grip element 30 and into the underlying support or joist 106. As it does so, the head 90H eventually engages the grip element 30. This in turn pulls the grip element downward toward the joist 106. As a result, the grip element and, for example, its cleats or protrusions bite into the lower surfaces of the respective grooves of the boards. This in turn provides enhanced holding force of the boards against the joist 106. With the fastener unit of the current embodiments, the overall length of the unit from end to end is generally sufficient to cover all of the top of the joist 106 that may otherwise be exposed through the gap G established between the boards.

A first alternative embodiment of the fastener unit is illustrated in FIGS. 8-11 and generally designated 110. The fastener unit of this embodiment is similar in structure, function and operation to the embodiment described above with several exceptions. For example, this unit 110 includes a fastener 190 similar to the fastener 90 above. It also includes a grip element 130 that is disposed in a recess 128 defined by a spacer body 120. The spacer body can have a spacer body width SW. The grip element can have a grip element width GW. The grip element width can be less than the spacer body width. For example the grip element width can be optionally less than ¾ the spacer body width, further optionally less than ½ the spacer body width.

The spacer body can be configured to establish a gap between adjacent boards, and sized with a thickness T2 similar to the thickness T1 described in the embodiment above. The grip element 130 can define a second fastener hole SFH' that is aligned with a first fastener hole FFH' of the spacer body 120 similar to that described above. The first fastener hole FFH' also can include upper and lower portions FF1U' and FF1L' that have different diameters, the lower one having a diameter less than the upper one's diameter. The grip element 130 optionally can extend from the forward 121 and rearward 122 surfaces of the spacer body 120 by equal distances D10 and D11. Of course, in some applications, these distances can vary.

In this embodiment, the unit 110 can include first and second compression elements which are in the form of first and second joist legs 141 and 142 that extend downward and outward from the spacer body 120. These first and second joist legs are configured to straddle and clampingly engage a joist. The joist legs are similar in construction, so only the first joist leg 141 will be described here. The joist leg 141 includes an outwardly extending portion 143 that extends outward from a side of the spacer body 120. That outwardly extending portion 143 transitions to a rounded or curved portion 145 that extends downwardly, away from a bottom 126L of the spacer body 120. The curved portion 145 is generally concave, opening toward the vertical axis VA. That curved portion 145 extends to a lower engagement portion 146. This lower engagement portion is generally convex relative to the vertical axis VA and opens away from that vertical axis VA. The engagement portion includes an inner engagement surface 146S which is configured to engage and slide over a portion of the outer walls 106W of the joist 106. This surface 146S again is generally curved and convex away from the vertical axis to facilitate sliding of this portion over the walls 106W.

Optionally, each of the joist legs 141 and 142 can be joined with the spacer body 120 at fracturable joints 148, 149 similar to those described above. In this manner, at least one of the first and second joint legs can be manually broken off from the spacer body to accommodate double joists or other confined spaces.

Figure 10:
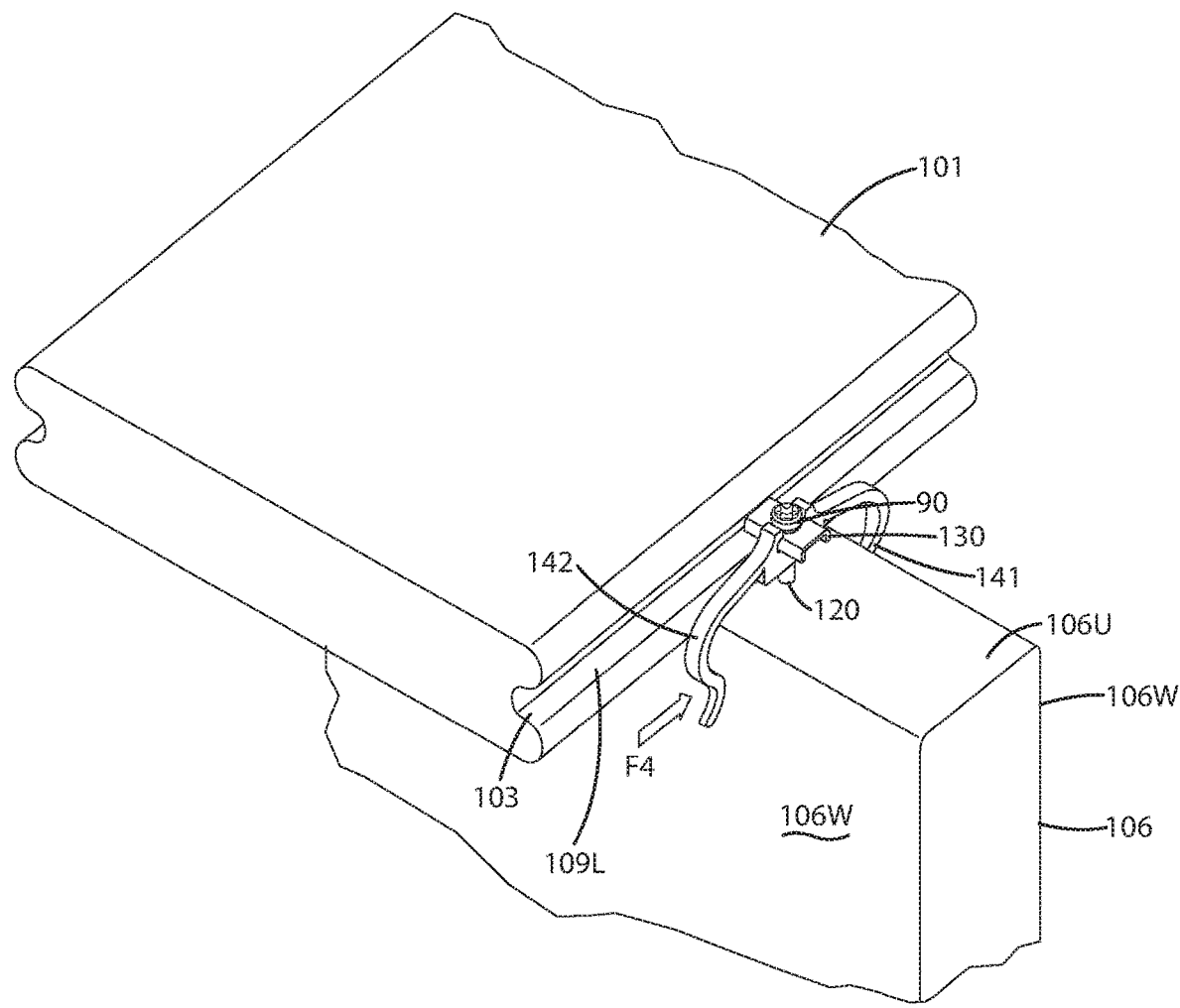
FIG. 10 is a perspective view of the first alternative embodiment of the fastener unit being installed relative to a groove of a board and an underlying support.
Figure 11:
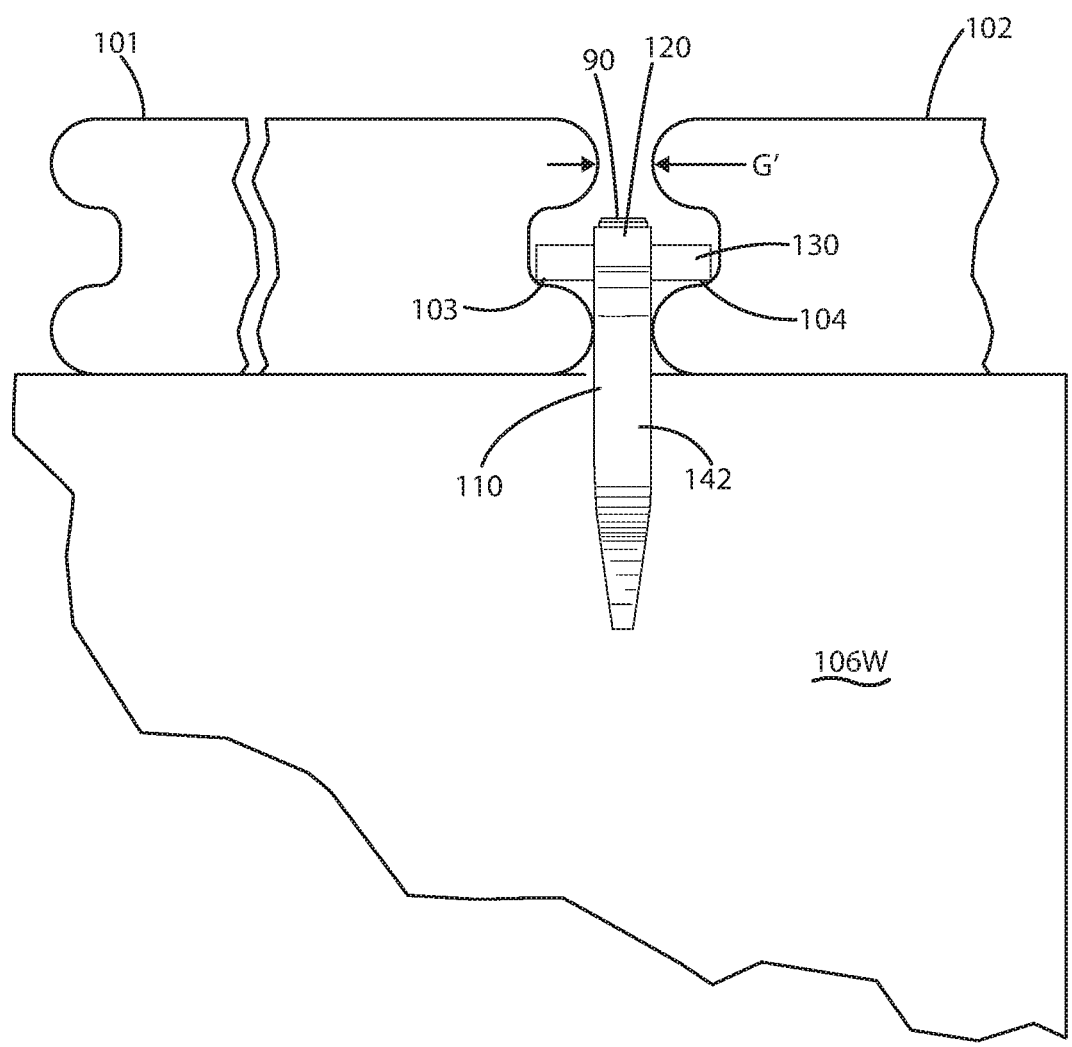
FIG. 11 is a side sectional view of the first alternative embodiment of the fastener unit installed within grooves of adjacent boards and establishing a gap with a spacer body between those adjacent boards.

A method of installing the fastener unit 110 will now be described in connection with FIGS. 9-11. The fastener unit 110 can be disposed adjacent a joist 106 and board 101 as illustrated in FIG. 10. In particular, the joist legs 141 and 142 can be resiliently deformed outward by sliding the engagement surfaces 146S into engagement with the walls 106W of the joist 106. Due to the rounded nature, the joist legs can be resiliently flexed or moved outward and can slide over those walls. Before the lower surface 126L of the spacer body engages the upper surface 106U of the joist 106, the grip element 130 can be inserted into the groove 103 and engage the groove lower surface 109L. Due to the spatial relationship of the spacer body, its lower surface 126L and the lower surface 109L of the groove, the lower surface of the spacer body can be placed at a level lower than a lower surface of the first groove, for example, the lower surface 126L of the spacer body can be below the lower surface 109L of the groove.

As illustrated, the joist legs can exert a compressive or clamping force F4 on the joist 106 to hold the grip element 130 at the elevation above the joist shown in FIG. 10, generally protruding into the groove 103. With the grip element in this location, as shown in FIG. 11, a second board 102 can be moved in place adjacent the fastener unit 110. Due to the thickness T2 of the spacer body 120 separating the two boards, a gap G' can be established between those boards. The grip element 130 also extends into both of the respective gaps of the two boards. With the grip element so placed, and the gap G' established, a user can advance the fastener 90 into the underlying joist. In turn, this causes the grip element 130 and its corresponding cleats to bite into the respective grooves, thereby securing the board in a fixed location over the joist 106.

Figure 9:
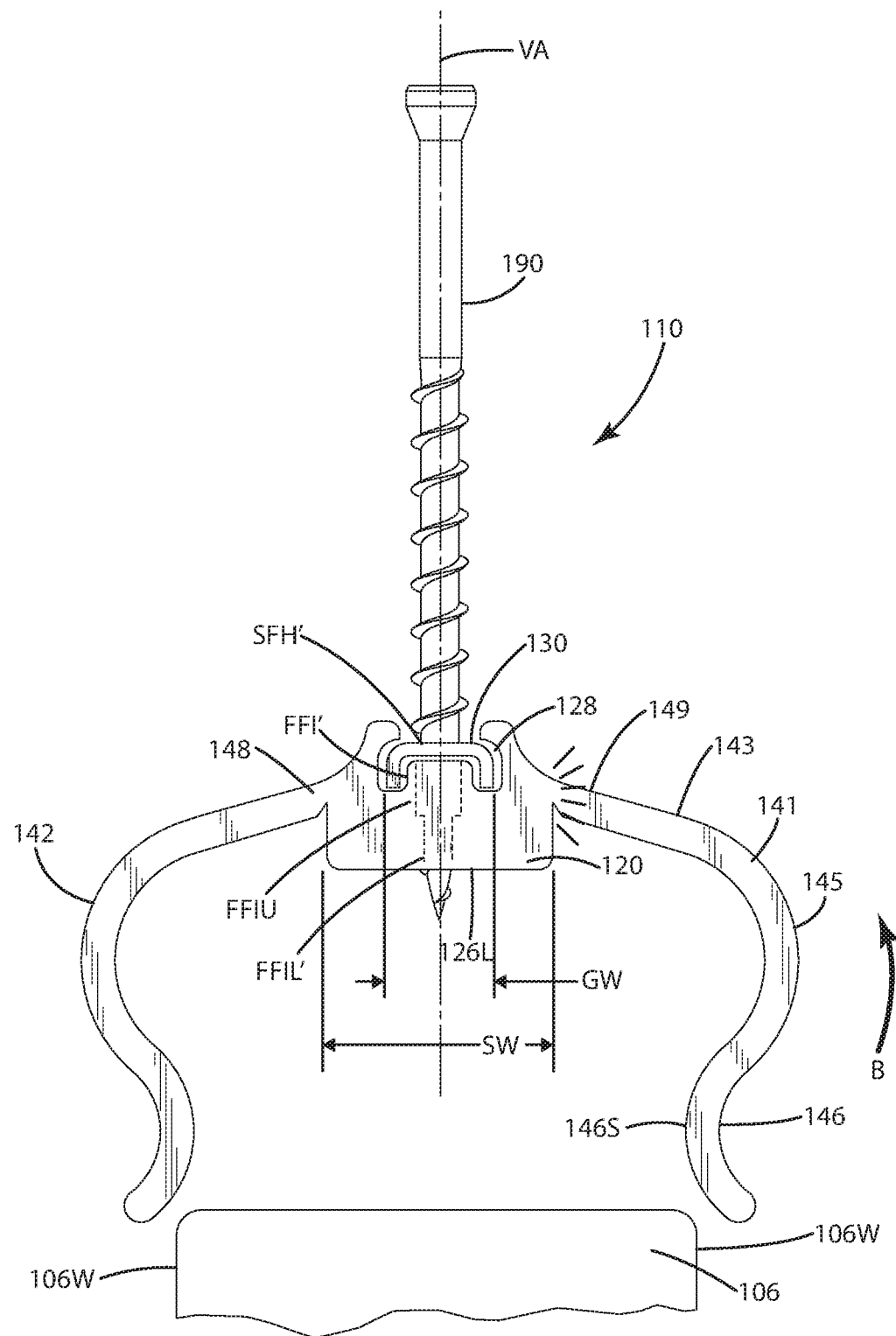
FIG. 9 is a front view of the first alternative embodiment of the fastener unit.

Optionally, in confined spaces, with reference to FIG. 9, one of the joist legs 141 can be bent in direction B to resiliently break off that leg at the fracturable joint 149.

Figure 12:
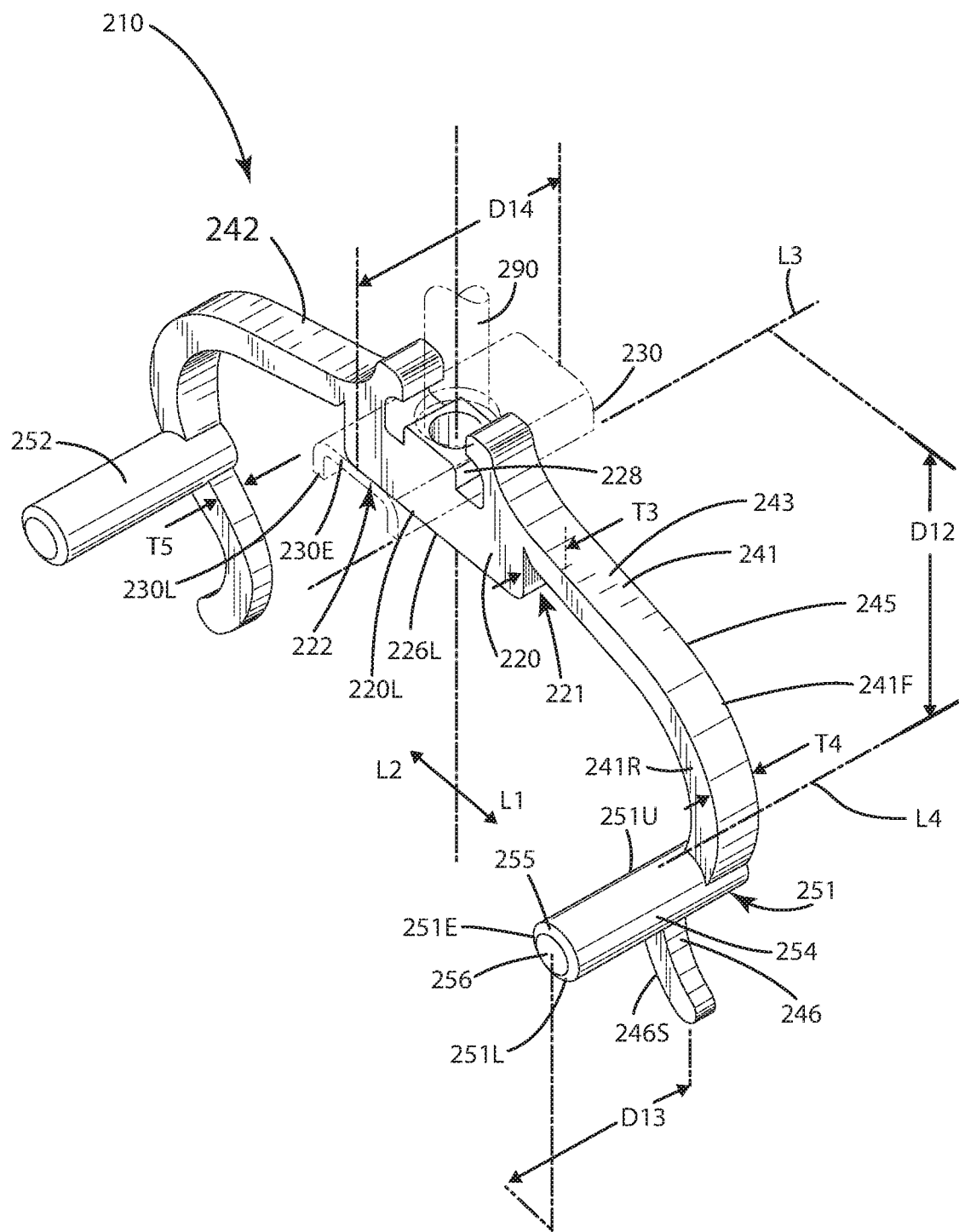
FIG. 12 is a perspective view of a second alternative embodiment of the fastener unit including one or more stabilizer bars.
Figure 13:
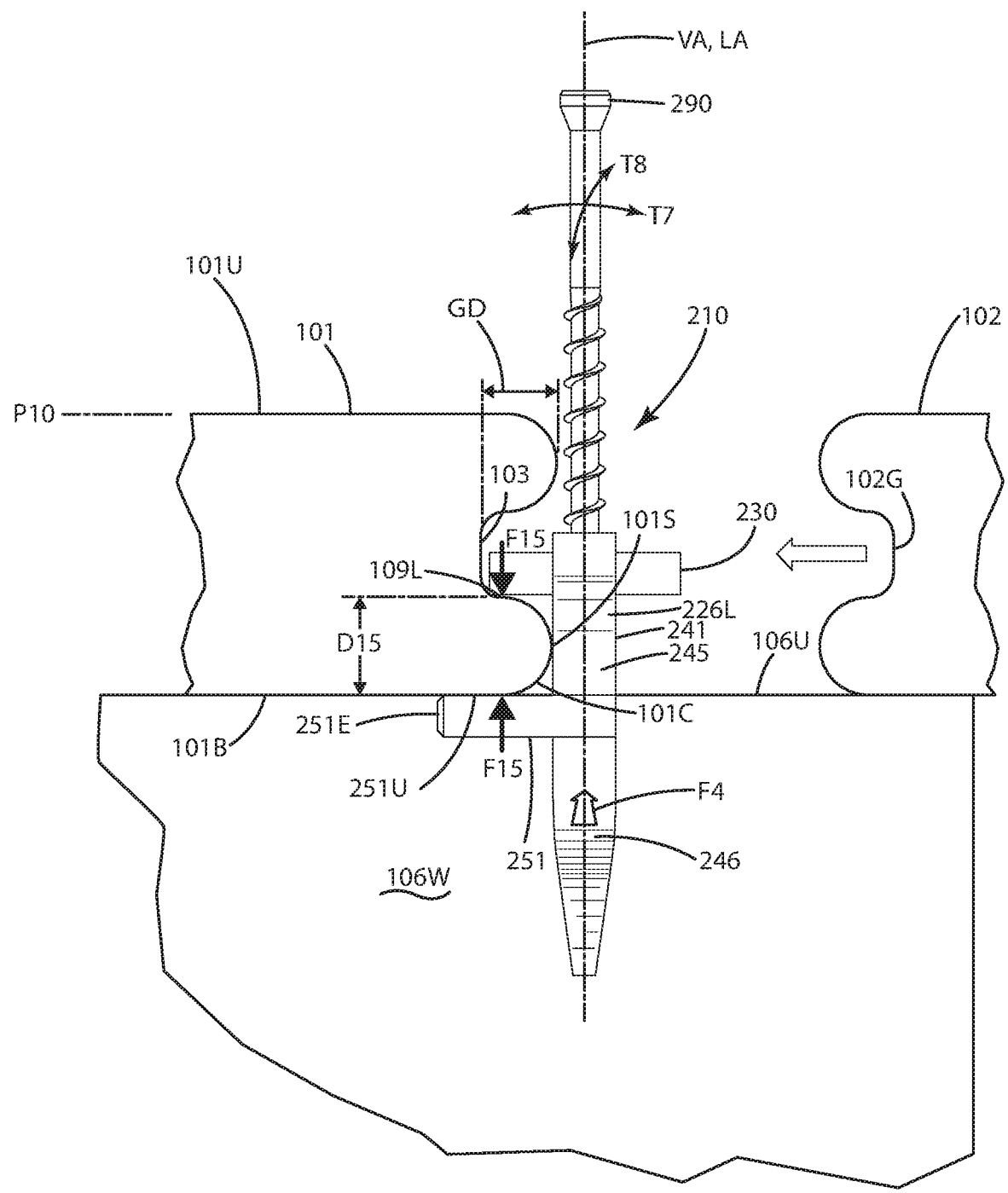
FIG. 13 is a side sectional view of the second alternative embodiment of the fastener unit installed with a grip element in groups of adjacent boards, and with the one or more stabilizer bars engaging a lower surface of a board to provide further stabilization of the fastener unit

A second alternative embodiment of the fastener unit is illustrated in FIGS. 12-13 and generally designated 210. The fastener unit of this embodiment is similar in structure, function and operation to the embodiments described above with several exceptions. For example, this unit 210 can include a fastener 290 similar to the fasteners 90 and 190 above. It also can include a grip element 230 that is disposed in a recess 228 defined by a spacer body 220. The grip element 230 optionally can extend from and beyond the forward 221 and rearward 222 surfaces of the spacer body 220. As above, the spacer body can be configured to establish a gap between adjacent boards, and sized with a thickness T3 similar to the thicknesses T1 and T2 described in the embodiments above.

In this embodiment, the unit 210 includes first and second joist legs 241 and 242, also referred to as resilient compression element in some cases, that extend downward and outward from the spacer body 220. These first and second joist legs are configured to straddle and clampingly engage a joist. The joist legs are similar in construction, so only the first joist leg 241 will be described here. The joist leg 241 includes an outwardly extending portion 243 that extends outward from a side of the spacer body 220. That outwardly extending portion 243 transitions to a rounded or curved portion 245 that extends downwardly, away from a bottom 226L of the spacer body 220. The curved portion 245 is generally concave, opening toward the vertical axis VA of the spacer body 220, which can be coincident and/or parallel to the longitudinal axis LA of the fastener 290. That curved portion 245 extends to a lower engagement portion 246. This lower engagement portion 246 can be convex relative to the vertical axis VA and can open away from that vertical axis VA. The engagement portion can include an inner engagement surface 246S configured to engage and slide over a portion of the outer walls 106W of the joist 106. This surface 246S can be curved and convex away from the vertical axis VA to facilitate sliding of this portion over the walls 106W. Of course, in other constructions, that surface 246S can be flat, planar, rough, ridged, triangular, or can have other geometric configurations depending on the configuration of the joist or the workpiece against which the leg is to be engaged.

As shown in FIG. 12, the first joist leg 241 can extend from a first lateral side L1 of the spacer block 220 on a first side of the vertical axis VA, and the second joist leg 242 can extend from a second lateral side L2 of the spacer block 220. The first and second joist legs can extend outwardly and downwardly from the spacer block. Each of the joist legs can include a forward surface and a rearward surface, and one or more of the joist legs can include a stabilizer bar extending from the joist leg a predetermined distance. In general, the opposing stabilizer bars 251, 252 on the opposing joist legs 241 and 242 can be disposed at a common level L4 relative to one another and relative to another level L3 of the bottom or lower surface 230L of the grip element 230. Due to the similarities of the legs and the stabilizer bars in the embodiment illustrated, only the first joist leg 241 and its corresponding stabilizer bar 251 will be described here.

The first joist leg 241 can include a front surface 241F and a rear surface 241R. The rear surface optionally can be planar and/or rounded. The rear surface can further include the stabilizer bar 251 projecting rearward from it in a direction opposite the front surface 241F of the joist leg 241. As illustrated, the stabilizer bar 251 can be integrally formed and joined with the leg at a transition location between the curved portion 245 and the lower engagement portion 246 of the joist leg. The stabilizer bar can project from the rear surface 241R a distance D13. This distance D13 can be equal to a distance D14 from which an end 230E of the grip element 230 extends away from the rearward surface 241R of the leg and/or of the rear surface 222 of the spacer body. The distance D13 optionally can be 1/32 inches, further optionally 1/8 inches, further optionally 1/4 inch, yet further optionally 1/2 inch, even further optionally 3/4 inches, or other distances depending on the application. In some cases, D13 can be greater than, less than or equal to D14. In cases where a bottom of the board with which the fastener unit 210 is utilized, the distance D13 is greater than the distance D14 by at least 10% to 25%, such that the stabilizer bar 251 can adequately extend beyond a curved lower corner of the board and engage the under surface or bottom surface of the board as described below.

Referring to FIG. 12, the stabilizer bar 251 can include an upper surface 251U and a lower surface 251L. The upper surface 251U and lower surface 251L optionally can be part of a continuous cylindrical wall 254 where the stabilizer bar 251 is of a cylindrical shape. Of course, where the stabilizer bar 251 is of another geometric shape, for example, a square shape, a polygonal shape an ellipsoid shape, or some other rounded or irregular shape, the upper and lower surfaces can be formed by different portions of a wall or different walls altogether.

The wall 254 can extend to the rear surface 241R of the leg 241. In some cases, the stabilizer bar can alternatively extend also from the forward surface 241F of the joist leg. It may extend the distance D13, or some lesser or greater distance, depending on the application and the type of board utilized with the fastener unit. The stabilizer bar also can be configured such that the stabilizer bar 251 terminates at a free end 251E that projects out into space, in which case the stabilizer bar is cantilevered. This end 251E can include a ramped portion 255 and a flattened end portion 256. The ramped portion 255 can be a frustoconical shape or angled or rounded. In some cases, the ramp 255 and end 256 can be merged into a hemispherical or otherwise rounded end. The end can be rounded or ramped as shown so that that end easily traverses past a corner or other side surface or bottom of a board when the fastener unit is installed. The ramp and/or rounded surface easily rides over the corner of the board and/or the bottom surface of the board for rapid installation.

As further shown in FIG. 12, the stabilizer bar can be disposed a distance D12 below the lower surface 230L of the gripping element 230. For example, the lower surface 230L can be disposed at a level L3, while the upper surface 251U of the stabilizer bar 251 can be disposed at a second level L4. The distance D12 between these different levels can be equal to a distance between a bottom of a groove, and a bottom surface of that same board. In this manner, the board can be pinched or clamped between the bottom surface 230L of the gripping element 230 and the upper surface 251U of the stabilizer bar. Optionally, the portion of the board between the bottom of a groove of the board and the bottom surface of the board can be pinched or clamped between the gripping element 230 and the stabilizer bar 251 on the joist leg 241. Via this interaction with the board, as described further below, the fastener unit 210 can be secured to and joined temporarily with the board optionally to maintain the fastener 290 longitudinal axis LA in a vertical, upright position before installation of the fastener 290 into an underlying joist.

Although shown as a generally cylindrical bar, the stabilizer bar 251 also can have other shapes. In some cases, the stabilizer bar 251 can be a portion of the joist leg 241 below the curved portion 245 at a distance D12, where that leg becomes a greater thickness (not shown) from its rear surface 241R to its front surface 241F. For example, above the stabilizer bar, the thickness T4 of the joist leg 241 can be approximately 1/4 inch. Starting at the upper surface 251U of the stabilizer bar (although not shown) the leg can be of a substantially greater thickness T5 such that the leg is 2, 3, 4, 5 or more times as thick as the thickness T4. This greater thickness T5 can extend all the way to the tip of the engagement portion 246. In other cases (although not shown) the stabilizer bar can extend in this manner to taper from the thickness T5 back toward the thickness T4 or some other thickness of the joist leg 241 toward the tip of the joist leg.

A method of installing the fastener unit 210 will now be described in connection with FIG. 13. The fastener unit 210 can be disposed adjacent a joist 106 and board 101 as illustrated in FIG. 13. In particular, the joist legs 241 and 242 can be resiliently deformed outward by sliding the engagement portions 246, and their respective surfaces 246S into engagement within and along the opposing walls 106W of the joist 106. Due to the rounded nature, the joist legs can be resiliently flexed or moved outward and can slide over those walls. Before the lower surface 226L of the spacer body engages the upper surface 106U of the joist 106, the grip element 230 can be inserted into the board groove 103 and engage the groove lower surface 109L. The joist legs 241, 242 can exert a compressive or clamping force F4 on the joist 106 to hold the grip element 230 at the elevation above the joist 106 shown in FIG. 13, with the element protruding into the groove 103.

In addition, as shown in FIG. 13, the stabilizer bar 251 can be disposed below the bottom surface 101B of the board 101. In particular, the upper surface 251U of the stabilizer bar 251 can engage the bottom surface 101B adjacent the corner 101C of the board. The end 251E of the stabilizer bar optionally projects a distance that is greater than the depth GD of the groove 103 inward from the side surface 101S of the board 101. This distance can be the distance D13 shown in FIG. 12. Thus, the distance D13 can be greater than groove depth GD, and optionally greater than the distance D14 by which the grip element 230 extends from the rear surface of the fastener unit.

The lower surface 230L of the grip element as mentioned above can be a distance D12 from the upper surface 251U of the stabilizer bar 251. This distance can be less than the distance D15 below the groove lower surface 109L, between the groove lower surface 109 and the bottom surface 101B of the board. Accordingly, the grip element 230, in cooperation with the stabilizer bar 251, can exert a force F15 on the board with the grip element 230 exerting the force F15 on the lower surface 109L of the groove, and the upper surface of the stabilizer bar exerting the force F15 on the bottom surface 101B of the board 101. This in turn exerts a slight clamping or pinching force on the board within that region. Accordingly, the stabilizer bar can assist in further holding and maintaining the vertical axis VA of the fastener unit and the longitudinal axis LA of the fastener 290 in a generally vertical, upright orientation. This vertical, upright orientation can refer to an orientation that optionally is perpendicular to the plane P10 of the board 101, in particular, its upper surface 101U, which optionally can lay in a horizontal plane. The upright vertical orientation can be perfectly vertical, or can be slightly offset from vertical by up to 5° or up to 10°, depending on the application.

With the stabilizer bar cooperating with the grip element 230, the fastener unit exerts both a force on the board 101 and another force on the joist 106, the latter, by virtue of the forces exerted by the legs 241 and 242 against opposing sides of the joist. Thus, the joist legs exert clamping force F4 on the joist, and the stabilizer bars exert another force F15 on the board, between the groove and the bottom surface of the board. Optionally, the force F15 is a vertical force, while the force F4 exerted by the joist legs is a substantially horizontal force. Of course, depending on the orientation of the joist in the board, the directions of the forces can change relative to horizontal and vertical planes.

The fastener unit 210 so installed can provide multiple points of contact between the fastener unit and the board, and thereby stabilize the fastener unit in a particular orientation, optionally holding the fastener associated with the unit in an upright, vertical orientation, ready for engagement by a tool. Optionally, the fastener unit 210 can engage the board 101, and the joist 106 to prevent forward and aft tilting T7, generally in a direction toward or away from the side surface 101S of the board. The fastener unit also can prevent teetering in directions T8 which are generally into and out of the plane of FIG. 13, such that the fastener and fastener unit do not slide along the side surface 101S of the board when in position. Thus, the fastener unit can provide multidirectional stability and support for the fastener 290, optionally holding it in an upright, vertical orientation as shown.

With the fastener unit oriented as shown in FIG. 13, a second board 102 can be moved in place adjacent the fastener unit 210. Due to the stabilization and forces exerted by the joist legs, the grip element and the stabilizer bars of the fastener unit 210, the fastener unit can remain in position, with the other end of the grip element 230 sliding into the groove 102G of board 102, and the fastener 290 staying in a generally upright and vertical orientation. With the grip element in position in the opposing gaps of the boards, and the appropriate gap set by the spacer body, the user can advance the fastener 290 into the underlying joist. In turn, this causes the grip element 230 and its corresponding cleats to bite into the respective grooves, thereby securing the board in a fixed location over the joist 106.

Figure 14:
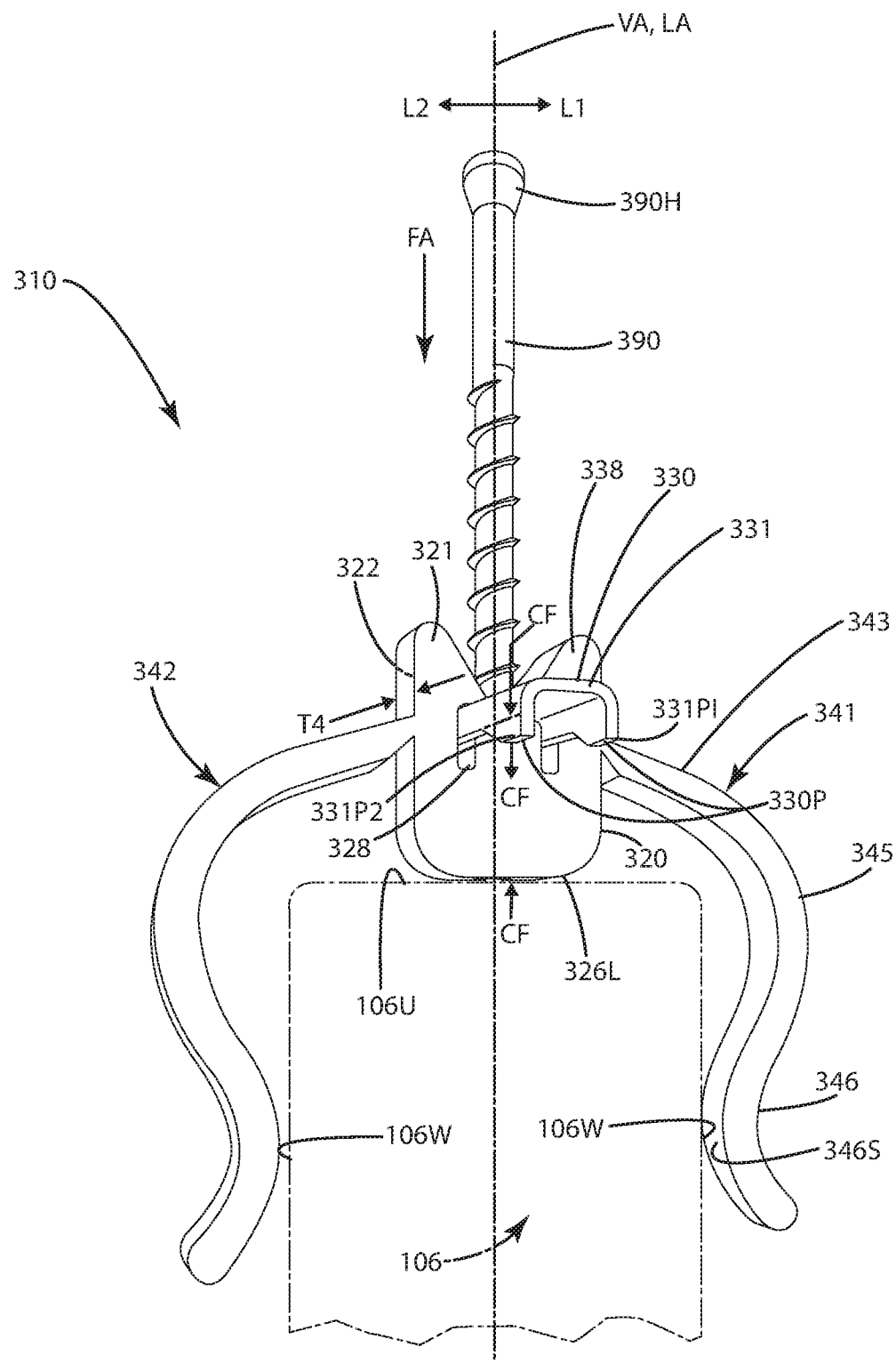
FIG. 14 is a perspective view of a third alternative embodiment of the fastener unit including a grip element with one or more pressure feet and a timing spacer block.
Figure 15:
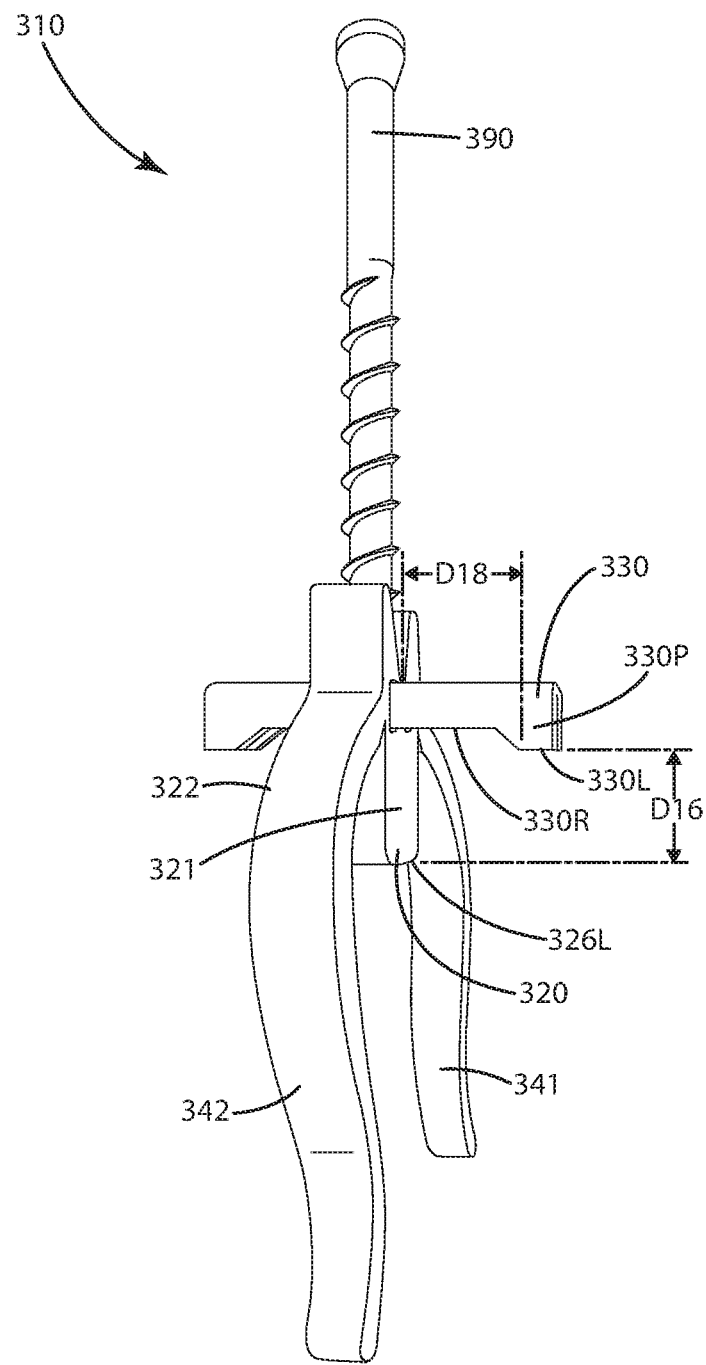
FIG. 15 is a perspective view of the third alternative embodiment of the fastener unit installed on an underlying joist and at least partially installed in a groove of a board.
Figure 16:
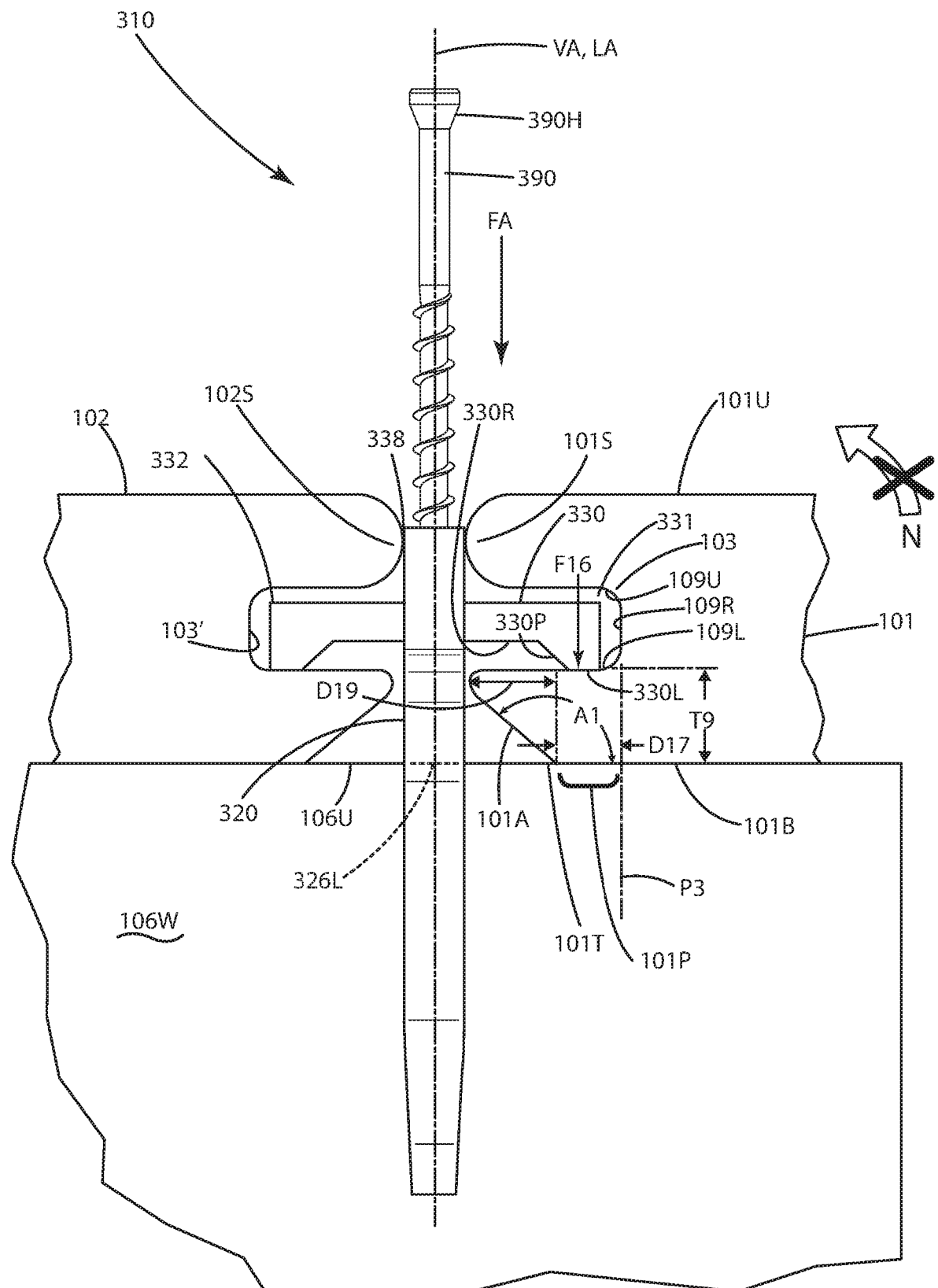
FIG. 16 is a side sectional view of the third alternative embodiment of the fastener unit installed within grooves of a boards and the fastener installed to apply force well within the grooves via the one or more pressure feet, and the timing spacer block bottomed out against the underlying joist.

A third alternative embodiment of the fastener unit is illustrated in FIGS. 14-16 and generally designated 310. The fastener unit of this embodiment is similar in structure, function and operation to the embodiments described above with several exceptions. For example, this unit 310 can include a fastener 390 similar to the fasteners 90, 190 and 290 above. It also can include a grip element 330 that is disposed in a recess 328 defined by a spacer body 320. The grip element 330 optionally can extend from and beyond the forward 321 and rearward 322 surfaces of the spacer body 320. As above, the spacer body can be configured to establish a gap between adjacent boards, and sized with a thickness T4 similar to the thicknesses T1, T2 and T3 described in the embodiments above.

In this embodiment, the unit 310 includes first and second joist legs 341 and 342, also referred to as resilient compression element in some cases, that extend downward and outward from the spacer body 320. These first and second joist legs are configured to straddle and clampingly engage a joist. The joist legs are similar in construction, so only the first joist leg 341 will be described here. The joist leg 341 includes an outwardly extending portion 343 that extends outward from a side of the spacer body 320. That outwardly extending portion 343 transitions to a rounded or curved portion 345 that extends downwardly, away from a bottom 326L of the spacer body 320. The curved portion 345 is generally concave, opening toward the vertical axis VA of the spacer body 320, which can be coincident and/or parallel to the longitudinal axis LA of the fastener 390. That curved portion 345 extends to a lower engagement portion 346. This lower engagement portion 346 can be convex relative to the vertical axis VA and can open away from that vertical axis VA. The engagement portion can include an inner engagement surface 346S configured to engage and slide over a portion of the outer walls 106W of the joist 106. This surface 346S can be curved and convex away from the vertical axis VA to facilitate sliding of this portion over the walls 106W. Of course, in other constructions, that surface 346S can be flat, planar, rough, ridged, triangular, or can have other geometric configurations depending on the configuration of the joist or the work piece against which the leg is to be engaged.

As shown in FIG. 14, the first joist leg 341 can extend from a first lateral side L1 of the spacer block 320 on a first side of the vertical axis VA, and the second joist leg 342 can extend from a second lateral side L2 of the spacer block 320. The spacer block 320 itself can be formed as a timing spacer block such that the lower surface 326L of the spacer block of this embodiment engages the upper surface 106U of the joist as the fastener 390 is tightened to install the fastener unit 310. This lower surface 326L can be disposed below the lower surface 330L of the grip element, optionally at least ¼ inch below, further optionally at least ½ inch below that surface. Optionally, the lower surface 326L can engage the upper surface 106U of the joist 106 when the grip element 330 engages the groove 103, for example the lower wall 109L of the groove 103 upon the application of a force F16 as described below.

With reference to FIGS. 15-16, the timing spacer block 320 can be configured so that it has a relationship relative to a thickness T9 between the lower surface 109L of the groove and the bottom surface 101B of the board 101, or other boards, such as board 102 on the opposite side of the fastener unit 310. This thickness T9 can be optionally ¼ inch, further optionally ½ inch, or other dimensions depending on the particular board. The fastener unit 310 can be configured so that the bottom 326L of the timing spacer body is spaced a distance D16 from the lowermost surface 330 L of the grip element 330, whether or not that grip element has one or more pressure feet 330P. This distance D16 can be equal to or less than the thickness T9 mentioned above. In some applications, the distance D16 relative to the thickness T9 can be expressed in a ratio, for example optionally 1:1, further optionally 0.99:1, yet further optionally less than 1:1, even further optionally between 0.9:1 and 1:1, inclusive.

These ratios and the general relationship between the thickness T9 and D16 can be established so that the spacer block 320 (and in particular its lower surface 326L) is "timed" to engage the upper surface 106U of the joist 106 when the predetermined force F16 is applied by a pressure foot 330 against the board 101, and in general against the lower surface 109L of the groove 103. Optionally, the lower surface 326L of the timing spacer block 320 can engage the upper surface 106U of the joist 106 after or at the same time as the pressure foot 330P engages the lower surface 106L of the groove. This can enable the fastener unit 310 to apply a predetermined force F16 through the pressure foot 330P and the grip element 330 in general. When the spacer body, however, bottoms out against the upper surface of the joist, the amount of additional force added to the predetermined force F16 can be limited and/or cut off completely because the spacer body prevents the fastener from being tightened further, and thus prevents the fastener from advancing farther, which otherwise would increase or otherwise add to the predetermined force F16 applied to the board via the feet in the groove. In this manner, the timing spacer block 320 can be constructed to assist in limiting or otherwise controlling the predetermined force F16 that is applied to the boards 101 and 102 when and as the fastener unit 310 is secured in place. In some cases, where the board is weak, thin or undercut below the groove, this can prevent the grip element from damaging or breaking the part of the board adjacent or under the groove. Also, it will be appreciated that although only a force F16 is illustrated in the groove 103 of board 101, another force, substantially equal to force F16 is being applied in the groove 103' of the other board 102 via the feet at the other end 332 of the grip element 330.

Optionally, the portion of the board 101 between the lower surface 109L of the groove and the bottom 101B of the board can be pinched or clamped between the bottom surface 330L of the gripping element 330 and the upper surface 106U of the joist with the predetermined force F16 as the fastener unit 310 is tightened, that is when the fastener 390 is advanced into the joist 106 and the head 390H of the fastener 390 engages the gripping element 330 to pull the gripping element downward, upon the application of the predetermined force F16 through the gripping element 330. Again, this predetermined force F16 can be limited by way of the lower surface 326L of the timing spacer block 320 engaging the upper surface 106U of the joist 106 to prevent and/or impair the fastener 390 from further advancing into the joist 106, which would thus pull the gripping element 330 farther toward the joist and produce more clamping force F16.

Further optionally, it will be appreciated that when the timing spacer block 320 engages the upper surface 106U of the joist 106, and the fastener 390 is further advanced in direction FA toward and into the joist 106, the spacer block 320 itself is placed under a compressive force CF between the upper surface of the joist and the gripping element 330, when the gripping element is engaged by the head 390H of the fastener 390. This compressive force CF can be greater than, equal to or less than the force F16. In many cases, the compressive force can be greater than the force F16.

In the embodiment illustrated in FIGS. 14-16, the fastener unit 310 also can be outfitted with a gripping element 330 that is similar to the gripping elements 30, 130 and 230, with several exceptions. For example, this gripping element 330 can be constructed for use with a particular type of board 101, 102. As one example, this board can be a TIMBERTECH or other composite deck board commercially available from AZEK Building Products of Skokie, Ill. Such a board 101 can be constructed to include a groove 103 that is defined inward from side surface 101S. In such a board, this groove also can be duplicated and defined on both opposing sides of the same board 101 (although the second opposing groove is not shown). The groove 103 can transition inward from the side surface 101S. The groove can include an upper surface 109U that transitions to a rear wall 109R which further transitions to a lower wall 109L. The upper and lower walls of the groove are opposite one another and can be generally planar. The lower wall 109L can transition out to the side surface 101S.

In some constructions, below the lower wall 109L, the side surface 101S can transition to a slanted wall 101A. This slanted wall 101A differs from the portion of the side surface 101S above the upper wall 109U of the groove 103, in that the slanted wall 101A angles back toward the plane P3 within which the rear wall 109R can at least partially lay. The slanted wall 101A can transition to the bottom surface 101B of the board 101 a preselected distance D17 from the plane P3. The slanted wall 101A can be disposed at an angle A1 relative to the bottom wall 101B. This angle A1 can be an obtuse angle, optionally greater than 90°. This slanted wall 101A can be rounded or slightly curvilinear, rather than linear as illustrated. The slanted wall 101A can transition to the bottom wall 101B at a transition region 101T, which can form part of the angle A1. This transition region 101T can be disposed the distance D17, closer to the side surface 101S than the rear wall 109R of the groove 103. The region 101P between the transition region 101T and the plane P3 within which the rear wall 109R of the groove lays can be configured to transfer the force F16 applied by the grip element 330 in particular the predetermined force F16 when this force is applied through the pressure foot 330P as described below. Optionally, the slanted wall 101A can be disposed between the side surface 101S and the transition 101T. The slanted wall can extend a distance D19 from the side surface 101S horizontally away from that surface. This distance D19 can be less than the depth of the groove, that is the distance from the side surface 101S to the rear wall 109R of the groove 103.

The grip element 330 can be similar to the grip elements 30, 130 and 230 described above, with several exceptions. For example, the grip element 330 optionally can be in the form of a C- or U-shaped channel, with the channel opening downward relative to the vertical axis VA or longitudinal axis LA. The grip element can be disposed in a recess defined by the spacer body 71 similar to force noted above. The grip element can be constructed to include downwardly extending cleats, which optionally can be portions of the channel or an elongated metal or composite bar. The grip element can include one or more feet or teeth, formed as part of the channel, the cleats or as additional protrusions extending from the grip element. As an example, the grip element 330 can include one or more pressure feet 330P. These pressure feet 330P can be disposed at the first 331 and second 332 ends of the grip element. These pressure feet can each form at least a portion of the lower surface 330L of the grip element 330. The pressure feet also can come in pairs, for example a pair of pressure feet 331P1 and 331P2 can be disposed at the first end 331. The second end 332 can include a similar pair of pressure feet.

The pressure feet can include the lower surface 330L of the grip element, with each of the pair of the pressure feet forming a portion of that lower surface 330L. The pressure feet can extend all the way to the very end 331 of the grip element. Although shown as flat of the lower surface 326L, the feet can be pointed or rounded at that lower surface. The individual ones of the pairs of pressure feet also can form opposing sides of the U-channel that extend downward from the grip element. In this manner, each end can include two opposing pressure feet. Optionally, the pairs can distribute the predetermined force F16 evenly and spread out between those two pressure feet. Optionally, where the grip element is not C or U-shaped, and is in the form of a bar (not shown), there can be single pressure feet located at the opposing ends. These pressure feet can also include larger lower surfaces of a particular geometric shape to provide more surface contact with the interior of the groove.

The pressure feet of grip element can be spaced a particular distance from the respective front 321 and rear 322 surfaces of the fastener unit 310. For example, as shown in FIG. 15, the pressure feet 330P of one end 331 of the grip element 330 can be disposed a distance D18 from the front surface 321 of the spacer block 320. Of course, the pressure feet at the second opposing end 332 can be disposed a similar distance from the rear surface 322 of the spacer block. This distance D18 can be greater than the distance D19 mentioned above with regard to the slanted wall 101A. Within this distance D18 away from the spacer block 20, the grip element can be recessed upward from the lower surface 330L. For example, as shown in FIGS. 15 and 16, the pressure feet 330P can transition upward to a recessed surface 330R of the grip element. This recessed surface 330R can be disposed at a level above the lower surface 330L of the grip element 330 such that the recessed surface 330R generally does not substantially contact the lower surface 109L of the groove 103 when the fastener unit 310 is installed relative to the grooves and the boards. In this manner, substantially only the lower surface 330L of the grip element associated with the pressure feet 330P engage that lower surface 109L of the groove.

The pressure feet 330P, when spaced the distance D18 on the spacer block 320, can be configured to enable the predetermined force F16 to be distributed downward into the preselected pressure region 101P. Substantially all of the force F16 can be distributed to this region 101P. Optionally, little to no portion of the force F16 is distributed by the pressure feet 330P to the slanted wall 101A and/or the transition region 101T. Accordingly, with the force F16 distributed this far from the spacer block 320 and in general the side surface 101S, which can engage the spacer block directly, the force F16 is not distributed in a manner so as to urge the board 101 to rotate in direction N. Thus, the board 101 is prevented from tipping or angling when the fastener unit 310 is advanced to pull the board downward against the joist 106.

Optionally, the pressure feet 330P can be disposed the distance D18 from the spacer body 320 to ensure that the predetermined force F16 administered through the pressure feet 330P is not administered directly vertically over the slanted wall 101A, but rather in pressure region 101P that is farther away from the side surface 101S than the slanted wall 101A. Where the region 101P forms a portion of the bottom surface 101B of the board 101, the pressure feet and the grip element thus can exert the predetermined force F16 downward, directly to the bottom surface 101B which is in contact and generally parallel to the upper surface 106U of the joist 106. The flat generally planar bottom surface 101B of the board 101 can engage the flat generally planar upper surface 106U of the joist and the two can be pressed together under the predetermined force F16. And as mentioned above, this predetermined force F16 can be limited by the spacer body 320 engaging the joist.

A method of installing the fastener unit 310 will now be described in connection with FIGS. 14 and 16. The fastener unit 310 can be disposed adjacent a joist 106 as illustrated in FIG. 14. In particular, the joist legs 341 and 342 can be resiliently deformed outward by sliding the engagement portions 346, and their respective surfaces 346S into engagement within the and along the opposing walls 106W of the joist 106. Due to the rounded nature, the joist legs can be resiliently flexed or moved outward and can slide over those walls. The lower surface 326L of the spacer body 320 can be move toward and optionally can engage the upper surface 106U of the joist 106. The joist legs 341, 342 can exert a compressive or clamping force on the joist 106 to hold the grip element 330 at the elevation above the joist 106 shown in FIG. 16, with the element protruding into the groove 103.

The grip element 330 can be inserted into the board groove 103, for example, into the respective grooves 103 of both of the opposing boards 101 and 102. These boards can be pushed toward one another so that the spacer body 320 and an upper portion 338, above the gripping element, can be contacted by and engaged by the respective side surfaces 101S, 102S of the opposing boards 101 and 102. The grip element can be positioned in the respective groups of the boards 101 and 102 such that the lower surface 330L of the respective pressure feet 330P engage the groove lower surface 109L. When the boards are pushed together, the pressure feet 330P are disposed at the distance D18 from the spacer body 320. Accordingly, the pressure feet are disposed over the pressure region 101P that corresponds to the bottom, generally planar surface 101B of the board. The pressure feet also can be positioned at a location within the distance D17 between the rear wall 109R and the transition 101T. Optionally, the pressure feet are not disposed directly vertically above the slanted wall 101A. Further optionally, the pressure feet 330P can be disposed farther into the groove, closer to the rear wall 109R than to the side surface 101S of the board. As a further example, the pressure feet can be disposed at or greater than the distance D19 away from the side surface of the board. The pressure feet that the opposing end 332 can be disposed in the groove 103' and oriented relative to its surfaces in a similar manner.

The lower surface 330L of the grip element, and in particular the pressure feet, as mentioned above can be a distance D18 from the spacer body. This distance can place the pressure feet 330P directly over the pressure region 101P. When the fastener unit is installed relative to the boards 101 and 102 as shown in FIG. 16, the fastener 390 can be advanced in direction FA, through the spacer body and the grip element, advancing into the underlying joist 106. Upon this advancement, the head 390H of fastener 390 eventually engages the upper surface of the grip element 330. The fastener continues to be advanced into the joist 106. If the lower surface 326L was not in direct engagement with the upper surface 106U of the joist 106, it can begin to be so engaged as the fastener is advanced. As the advancement of the fastener 390 continues, the head 390H pulls the grip element 330 downward. This engages the pressure feet 330P and the lower surface 330L of the grip element 330 against the lower surfaces 109L of the grooves 103. This exerts the force F16 directly downward onto to the pressure region 101P along the bottom surface 101B of the board. Due to the recessed surface 330R not engaging the remainder of that lower surface, closer to the side surface, the force F16 is not distributed toward or through the slanted wall 101A. Accordingly, the board 101 does not tip in direction N due to the force F16 creating a moment about the transition region 101T.

As the fastener continues to advance, the timing spacer body 320 is placed under a compressive force CF between the head 390H of the fastener and the portion of the fastener pulling the head into the joist 106. When this occurs, the timing spacer body generally bottoms out the fastener and in general the fastener unit 310 so the fastener will not advance farther. As a result, timing spacer body limits the amount of additional force added to the predetermined force F16 to push the boards 101 and 102 into further contact with the joist 106. This in turn, can prevent the groove from being damaged or otherwise deforming the board 101 near the groove.

A fourth alternative embodiment of the fastener unit is illustrated in FIGS. 17-23 and generally designated 410. The fastener unit of this embodiment is similar in structure, function and operation to the embodiments described above with several exceptions. For example, this unit 410 can include a fastener 490 similar to the fasteners 90, 190, 290 and 390 above. It also can include a grip element 430 that is disposed in a recess 428 defined by a spacer block 420. The grip element 430 optionally can extend from and beyond the forward 425 and rearward 426 surfaces of the spacer block 420. The spacer block can be configured to establish a gap G between adjacent boards, and sized with a thickness T5. This thickness T5 can correspond to a preselected gap G (FIG. 22) that is to be established between adjacently placed first board 101 and second board 102, similar to the thicknesses T1-T4 above. Optionally, the thickness T5 and corresponding gap G set by the spacer block 420 can be equal to and/or greater than the diameter DF of the fastener head 490H. In this manner, the fastener head can fit between and not excessively mar board surfaces that are placed adjacent the spacer block.

Figure 22:
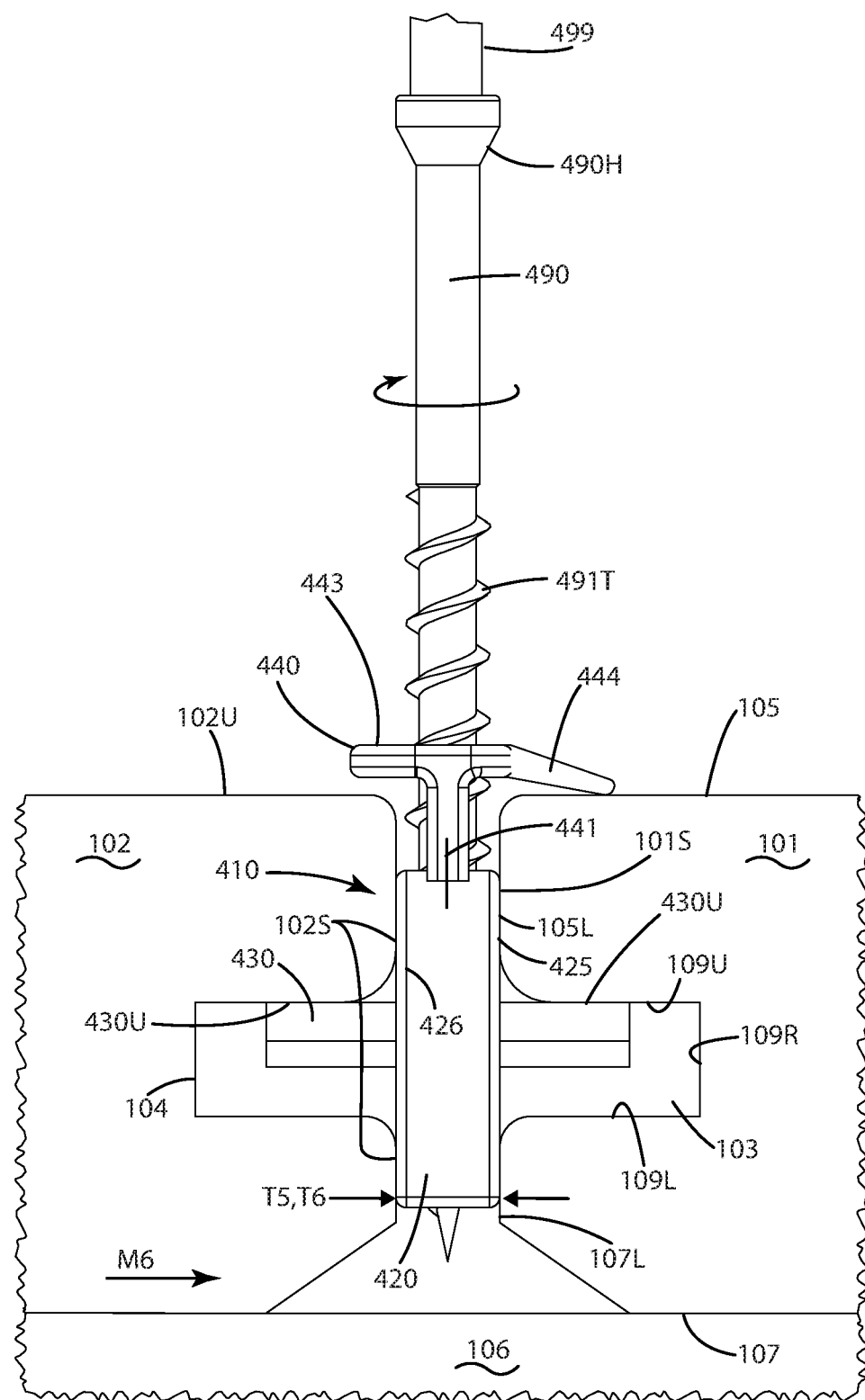
FIG. 22 is a side view thereof in the clamping mode to clamp to the board and hold the fastener unit between adjacent boards while setting a gap between those boards.

The spacer block 420 can set the gap G by way of the front surface 425 engaging adjacent first board 101 and the rearward opposing surface face 426 engaging the board 102 as shown in FIG. 22. With this spacer block being disposed generally between the upper and lower lobes or projections 105L, 107L that straddle the groove 103, the spacer block effectively prevents those boards 101 and 102 from being placed any closer to one another than the gap G due to the thickness T5 of the spacer block 420 there between. Optionally, the spacer block 420 can engage portions of the side surfaces 101S, 102S of the respective boards in the regions of the lobes 105L and 107L above and below the respective grooves 103 and 104.

The spacer block 420, can include opposing first 422 and second 423 side surfaces. The spacer block 420 also can define a spacer grip element recess or aperture 428, within which the grip element 430 can be disposed, generally held in by way of the fastener 490 passing through an aperture or second fastener hole SFH4 defined by a grip element base 433 between the optional first 431 and second 432 downwardly extending protrusions, cleats or gussets. These cleats can optionally be integrally formed with the base 433 and dimensioned like the cleats in the embodiments above. The cleats can be spaced a distance from one another and relative to the second fastener hole SFH4, and thus the fastener 490 and the fastener head 490H. In particular, the cleats can be spaced so that when the head 490H is tightened and eventually engages the grip element, the first and second portions on opposite sides or ends of the head or its diameter respectively can exert forces downward, directly over and on the first and second cleats 431, 432, with or without bending the grip element 430. These cleats can be configured to engage the grooves 103 and 104 of the respective boards with which the fastener unit 410 is used. As shown, the cleats can include flat lower edges, however these edges can be sharpened so that they are angled and come to points. Although not shown, the cleat lower edges can be serrated and/or include teeth to better bite into the groove of the board when the fastener unit is secured in place with the fastener 490.

As mentioned above, the grip element 430 includes a grip element aperture or second fastener hole SFH4. This second fastener hole can be aligned with a first fastener hole FF14 defined by the spacer block 420 so that the fastener can fit through both simultaneously. This second fastener hole SFH4 can be disposed in the center of the base 433. Optionally, the second fastener hole SFH4 can be a circular hole drilled through the base 433. In other cases, the second fastener hole SFH4 can be a partial recess, optionally not completely surrounding the fastener, and further optionally extending through the base and one or more of the cleats 431 or 432.

Figure 17:
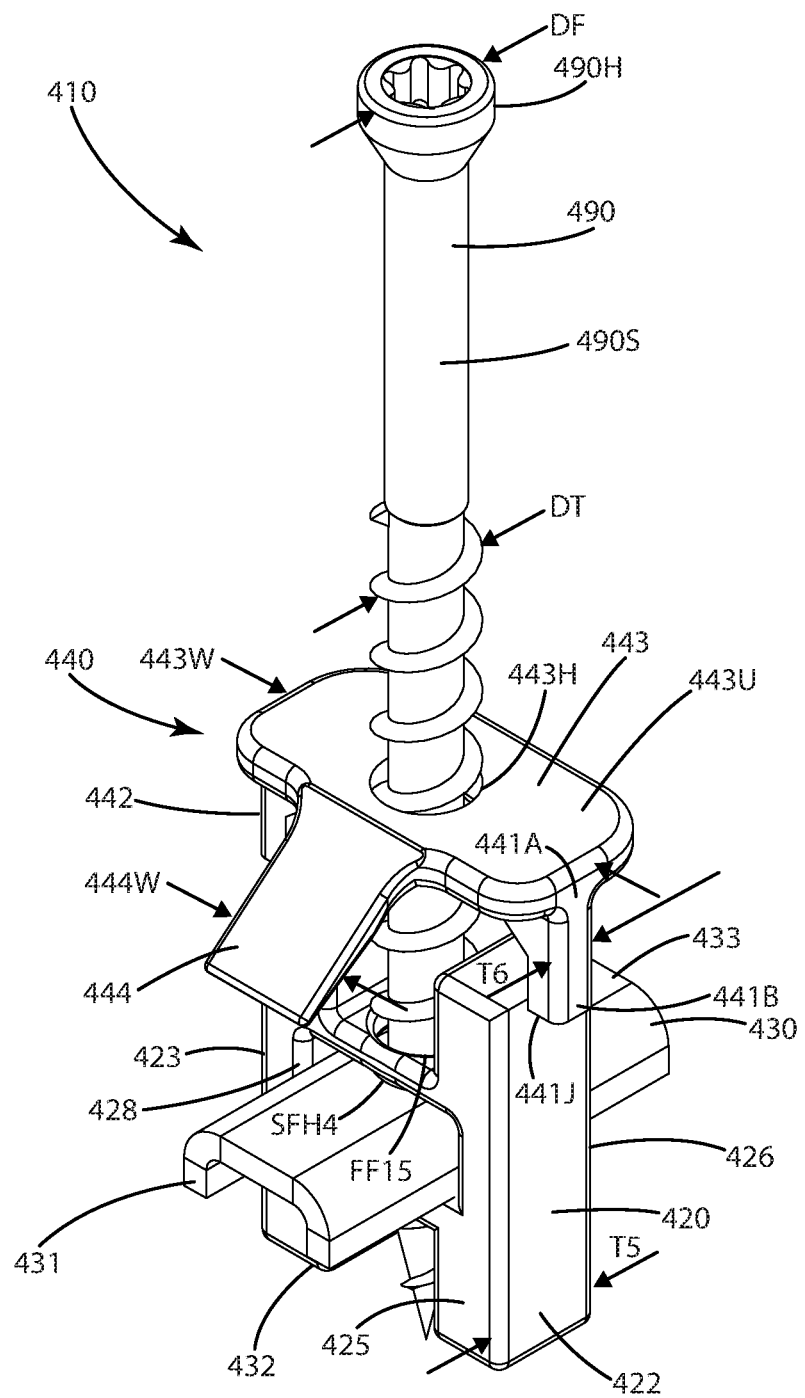
FIG. 17 is a perspective view of a fourth alternative embodiment of the fastener unit including a one piece unit with an upper platform clamp and opposing legs.
Figure 20:
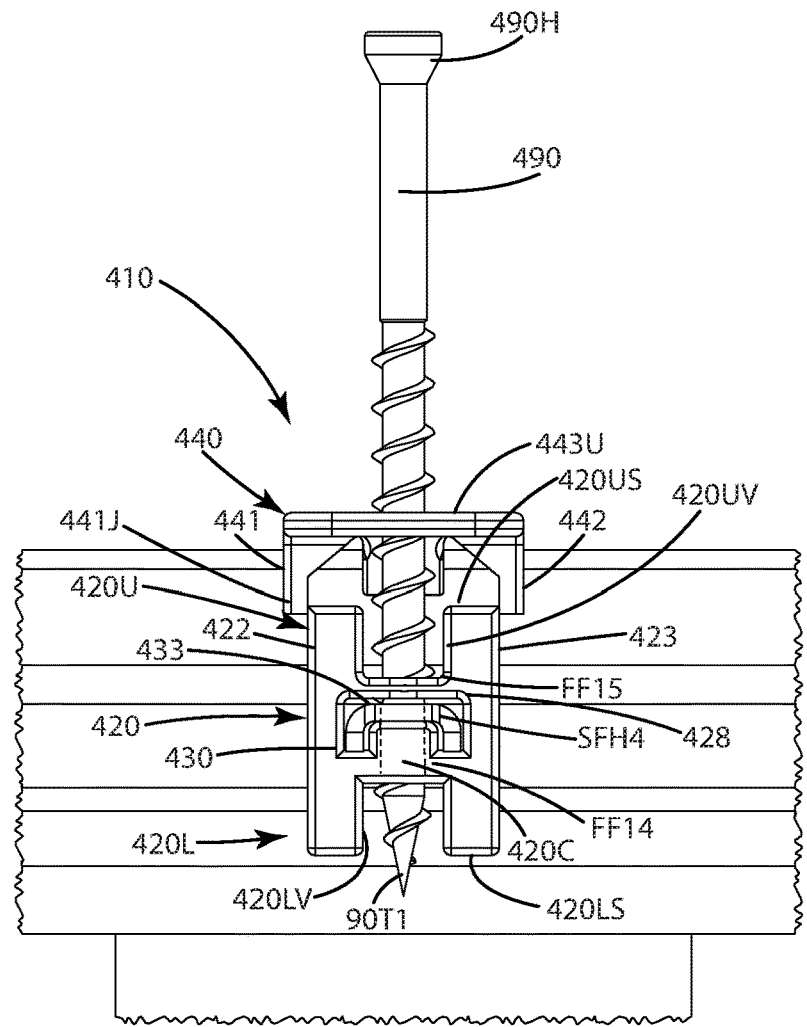
FIG. 20 is a front view of the fourth alternative embodiment of the fastener unit as it is installed on the board in a clamping mode.

The spacer block 420 shown in FIGS. 17 and 20 include an upper portion 420U and a lower portion 420L. The upper portion and lower portion can define respective voids. For example the lower portion 420L can define a lower void 420LV, and the upper portion 420U can define an upper void 420UV. The lower void 420LV can extend upward from a lower surface 420LS of the spacer block 420. The upper void 420UV can extend downward from the upper surface 420US of the spacer block 420. The lower void 420LV can be sized to receive at least a portion of a tip 490T1 of the fastener 490. The upper void 420UV can be sized to receive the head 490H of the fastener 490 when the fastener is fully installed. In some cases, the void 420UV can be of a depth sufficient to receive substantially the entire head 490H such that the head is below the upper surface 420US and optionally not visible from the side view of the fastener unit 410 in the spacer block 420 in FIG. 23 after the fastener 490 is fully installed.

Optionally, as shown in FIG. 20, the spacer block can be generally of an H configuration, with a central bar or portion 420C. At least a portion of the grip element recess 428 can be defined in the central bar. The central bar 420C can define the first fastener hole FF14 as well as a another fastener hole FF15 such that fastener holes are defined above and below the grip element 430. The second fastener hole SFH4 of the grip element can be aligned with these two fastener holes. In some cases, one of these fastener holes in the spacer block can be eliminated. Optionally, the second fastener hole SFH4 can be larger than the largest dimension or diameter DT of the threads and/or the shaft 490S of fastener 490. The other spacer by hole FF15 can likewise be of a dimension or diameter larger than the diameter DT of the shaft and/or threads. With this construction, the shaft and threads can rotate freely in these holes, without engaging a perimeter of the holes. The first fastener hole FF14, however can be equal to or smaller than dimension DT so that the tip 490T1 and/or the shaft of the fastener 490 can engage the material around the first fastener hole FF14 and generally join or hold the fastener 490 with or relative to the spacer block in this region.

As shown in FIGS. 17-20, the fastener unit 410 can include one or more board engagement element 440. As illustrated in this fourth embodiment, the board engagement element 440 can extend above the spacer block 420. This board engagement element 440 can be configured to engage an upper surface 105 of a first board 101 to cooperatively clamp with the grip element 430, the spacer unit 410 adjacent the side surface 101S of the board 101. This board engagement element 440 can include first and second legs 441 and 442 that can extend downward to spacer block. The legs can contact, engage or be joined with and/or integral with the spacer block 420. The board engagement element 440 can also include a first platform 443 and/or an engagement arm 444 to sometimes referred to as a resilient arm or engagement arm herein.

With reference to FIGS. 17-20, the first and second legs can be joined to the upper portions 420U of the spacer block 420. Each of the legs can include an upper end 441a and a lower end 441B. The upper end 441A can be joined with the first platform 443 and the lower end 441B can be joined with the spacer block upper portion 420U. The lower end 441B can be directly joined with the respective side surface, for example, side surface 422. Optionally, the lower end can be joined with the front and/or rear surfaces, or can be an extension of the spacer body itself.

Further optionally, the first leg and second leg each can be smaller in dimension than the thickness T5 of the spacer block. For example, the legs can be of a thickness T6 that is less than the thickness T5. The legs also can be joined with the spacer block 420 at respective fracturable joints 441J. This fracturable joint 441J can be a joint or portion that can fracture, break, deform, become damaged or otherwise fail such that the first leg and/or second leg, all or in part or pieces thereof, become dissociated from the spacer block and/or the fastener unit in general.

As mentioned above, this fracturable joint can be a location or component or connection, between the respective leg and the portion of the spacer block, which includes a zone of weakness, such as a thinned region, a region with perforations or holes, an area with a brittle material, or some other weakening portion, so that an element such as the legs and/or the board engagement element itself or other parts of the fastener unit can break off, fall off, fragment, become destroyed, separate from, disassociate from, become removed from, move away from and/or reorient relative to the spacer body or some other component. The foregoing are all interchangeably referred to as one component disassociating from another herein.

As shown in FIG. 20, the first and second legs can be connected at their ends to the upper portion 442U of the spacer block. The legs 441, 442 can be disposed outwardly relative to the respective side surfaces 422 and 423. Thus, when the platform 423 is engaged by the head 490H of the fastener 490 as described below, that fastener pushes downward on the platform and the forces can be transmitted to the legs. Due to the fracturable joints adjacent the upper portion, the legs lower ends or second ends can break off from the respective side surfaces of the spacer block. As further described below, the head 490H can continue to spin until it penetrates through the third hole 443H defined by the first platform 443. At that time, while the fastener is advanced and rotating, the head can break through the first platform, damaging and/or deforming the first platform in the process. The board engagement element 440 can disassociate from the remainder of the fastener unit 410 as shown, for example, in FIG. 23, where a tool 499 is advancing the fastener 490 into an underlying joist 106.

Returning to FIGS. 17 and 20, the first platform 443 can be integrally formed with the first and second legs 441 and 442. The legs can extend downwardly from a lower surface of the platform. The upper surface of the platform 443U can face upwardly, away from the spacer block 420. The first platform 443 can define the third fastener hole 443H, which can be aligned with the first fastener hole FF14, of the spacer block, the other optional fastener hole FF15 of the spacer block, and the second fastener hole SFH4 defined by the grip element. The hole 443H can be larger than the largest dimension of the threads DT such that the threads can rotate or spin freely in that hole 443H, without substantially engaging the perimeter around that hole. The hole 443H can be dimensioned such that it is smaller in dimension than the diameter DF of the head 490H. Thus, when the head 490H is advanced toward the first platform 443, that head eventually collides with and/or engages the upper surface 443U of the platform around the hole 443H for a while until the head pushes the platform down so the legs are broken from the spacer block or otherwise, and the board engagement element is disassociated from the remainder of the fastener unit 410.

Figure 18:
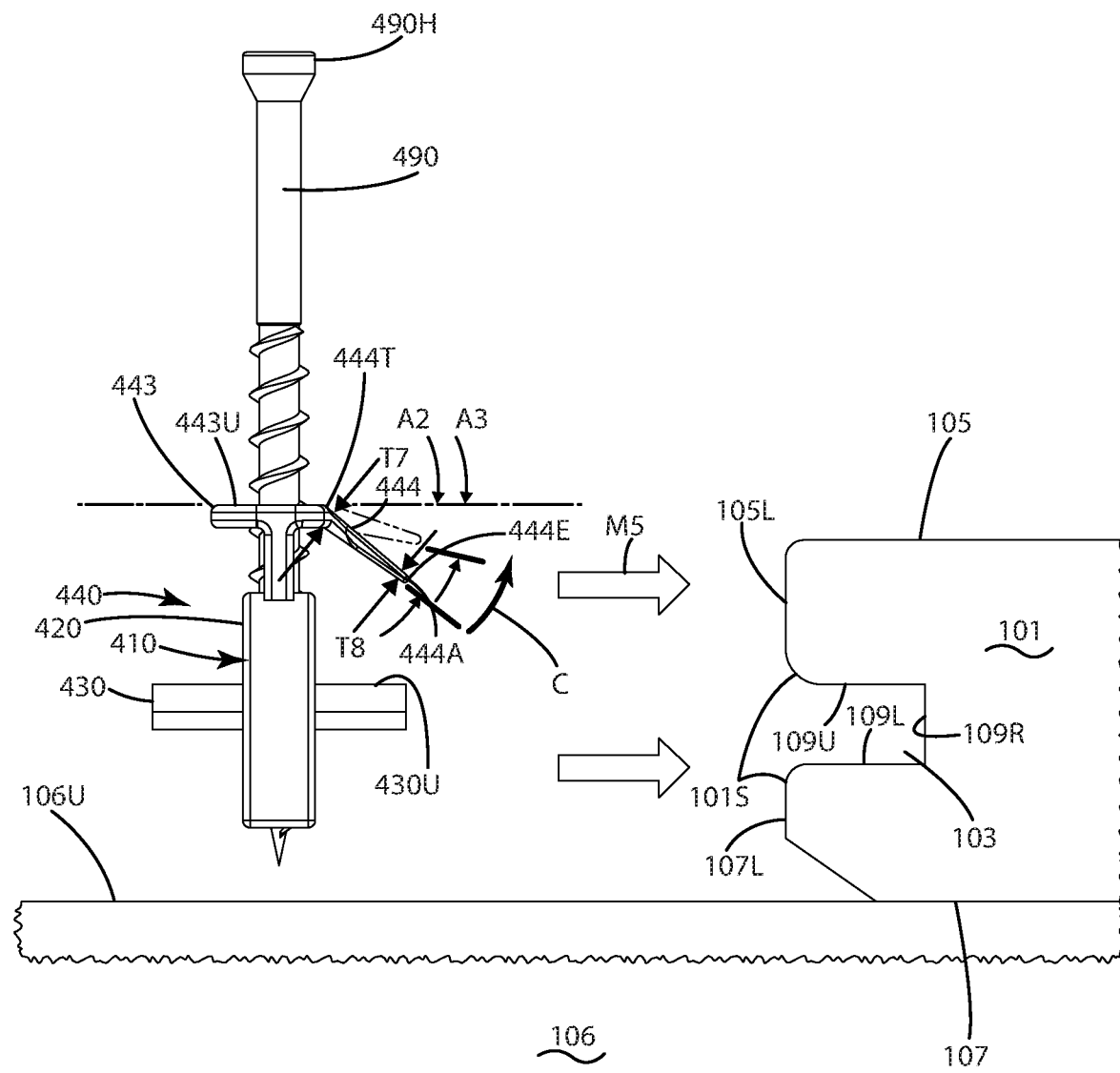
FIG. 18 is a side view of the fourth alternative embodiment of the fastener unit as it is moved for installation into a groove and converted to an expanded mode.

With reference to FIGS. 17-18, the board engagement element 440 can include an engagement arm 444. The arm can be integrally formed with and/or included in the first platform 443 or portions of the legs 441, 442, or in some cases the spacer block itself. The arm can be width 444W that is less than the width 443W of the platform. The arm width 444W can be optionally less than 75%, less than 66%, less than 50%, less than 33%, or less than 25% of the width 443W of the first platform 443. In other cases, these widths can be equal or reversed. The arm 444 can be angled downward when the board engagement element 440 is in a neutral mode, not engaged with a board. As shown in FIG. 18, the arm can angle at an angle A2 downward from the upper surface 443U of the platform 443. This angle A2 can be optionally about 0° to about 60°, inclusive, about 5° to about 45°, inclusive, about 10° to about 45°, inclusive, or about 15° to about 55°, inclusive, or other angles, depending on the application. It is noted that when the fastener unit 410 is installed relative to a board and its groove, the arm 444 can move in direction C shown in FIG. 18 so the angle A2 decreases to a second angle A3, which can be less than the first angle A2. This second angle A3 can be optionally less than 90%, less than 80%, less than 75%, less than 50%, less than 25% of the first angle A2 when the arm 444 is in the neutral mode.

As also shown in FIG. 18, the arm 444 can be movable, bendable and flexible about a transition region 444T where it is joined with the first platform. All or a part of the arm 444 can bend, flex, deform, hinge or otherwise translate (all interchangeably referred to as "bend" herein) about or relative to this transition region 444T. In other cases, the arm 444 can bend to different degrees along its length so that it becomes more arched or angled as it bends. As shown, the arm 444 can be tapered from a first thickness T7 to a second thickness T8 away from the platform 443. The second thickness T8 can be less than the first thickness T7. With this tapered construction the arm can bend more.

When the arm bends, as shown in FIG. 18, the end 444E can increase in distance away from the grip element 430 and the grip upper surface 430U. In converting from the neutral mode shown in solid lines to the working or clamped mode shown in broken lines, the arm increases in distance away from the grip upper surface 430U.

A method of using the fastener unit 410 of the fourth alternative embodiment will now be described with reference to FIGS. 18-23. On a high level, the fastener unit 410 is configured such that the board engagement element 440 and the grip element 430 are operable to clamp the portion of the board 101 between the upper surface 105 of the board and the groove 103 in a clamped mode, in which the spacer block 420 is held in a static position adjacent the first side surface 101S of the board and generally held in that position while the second board 102 is placed adjacent the first board 101. The second board is spaced a gap G away from the first board 101 such that the fastener 490 can be advanced to engage the grip element 430 against the board, within the grooves and secure those boards to an underlying joist 106.

Turning to FIG. 18, the fastener unit 410 is shown initially in a neutral mode in solid lines. The fastener 490 extends above the platform 443 and the spacer block 420. The arm 444 is in a neutral position at angle A2 relative to the upper surface 443U of the platform. A user can move the fastener unit toward the board 101, generally aligning the grip element 430U with the groove 103. The user can manually move the arm 444 upward in direction C, optionally bending it, so that it achieves a second angle A3 relative to the platform, and is placed a greater distance from the grip upper surface 430U. The arm 444 can spread farther away, or a greater distance away, from the grip upper surface 430U. A user can alternatively achieve this by pressing or forcibly inserting the grip element 430 initially into the groove 103 and then sliding the cantilevered free end 444E over the curved upper portion of the lobe 105L to transition to the arm over the upper surface 105 of the board 101.

Figure 19:
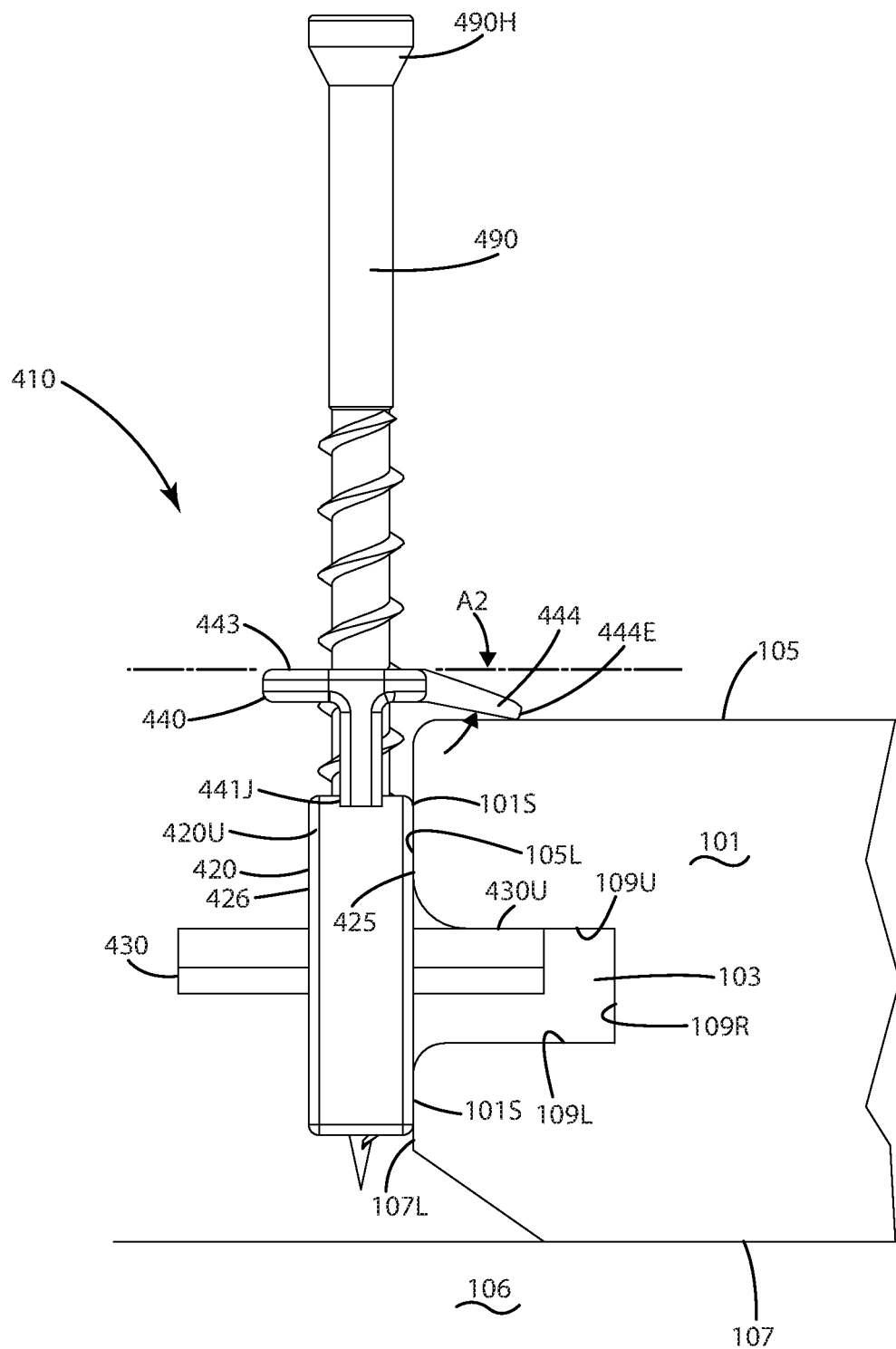
FIG. 19 is a side view therefor as the fastener unit is moved over an upper surface of a board to clamp the board between the upper surface and the groove below the upper surface in a clamping mode.

The fastener unit 410 can be fully installed on the board 101 as shown in FIGS. 19 and 20. There, the board engagement element 440 engages the upper surface 105 of the board, while the grip element 430 and grip upper surface 430U engage the groove 103. In particular, the board engagement element 440 and the grip element 430 clamp the portion of the board above the groove 103 and below the upper surface 105 between those elements. The arm can be generally bent upward at the angle A3 and disposed a farther distance away from the grip upper surface 430U than in the neutral mode shown in FIG. 18. The fastener unit and board engagement element in this mode are shown in a clamping mode. In this clamping mode, the spacer block 420 is held adjacent the first side surface 101S of the board, optionally engaging both the upper and lower lobes 105L and 107L, above and below the groove, with respect to the upper and lower portion of the spacer body. In this clamped mode, the board engagement element 440 and in particular the arm 444 can engage the upper surface 105 and exert a downward force on that surface. The spacer block upper portion 420U can engage the upper lobe 105L and generally the side surface 101S of the first board 101. The grip element 430 and the grip element upper surface 430U can engage the groove upper wall 109U, optionally without the grip element 430 engaging the lower wall 109L or the rear wall 109R of that groove 103. The grip element exerts and equal and generally opposite force toward the arm so that the portion of the board between the arm and grip element is clamped by these opposing forces in the clamping mode.

Figure 21:
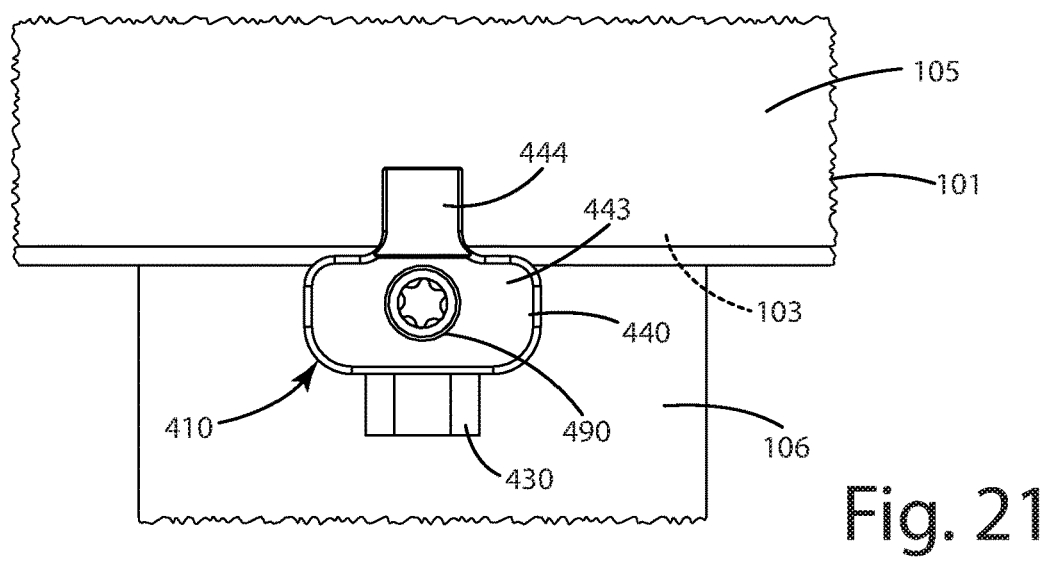
FIG. 21 is a top view thereof.

As shown in FIG. 21, the fastener unit 410 is aligned over the joist 106 underlying the first board 101, generally adjacent the groove 103, with the grip element 430 extending into the groove 103. The arm 444 extends from the first platform 443 outward, over the upper surface 105 of the board 101. With the fastener unit 410 in this position, adjacent the side surface 101S of the first board 101, a second board 102 can be moved in direction M6 as shown in FIG. 22, toward the fastener unit 410. The second board 12 can be moved until its second side service 102S engages the spacer block 420 which sets the gap G with its thickness T5 between the first board and the second board and their respective side surfaces. The other end of the grip element 430 also can enter the second groove 104 of the second board 102, Optionally engaging the upper wall of that groove. The grip element, can be simultaneously in the first groove 103 and the second groove 104 in this configuration. The first platform 443 can extend at least partially over the upper surface 102U of the second board 102 in some cases. The resilient arm 444 continues to engage the upper surface 105 of the first board 101. Optionally, the first board engagement element 440 clamps a portion of the first board from its upper surface, but does not clamp the second board in this clamping mode.

At this point, the fastener unit 410 is installed relative to the first and second boards. The fastener 490 is ready to be advanced downward, through the factors unit and into the underlying joist 106.

Figure 23:
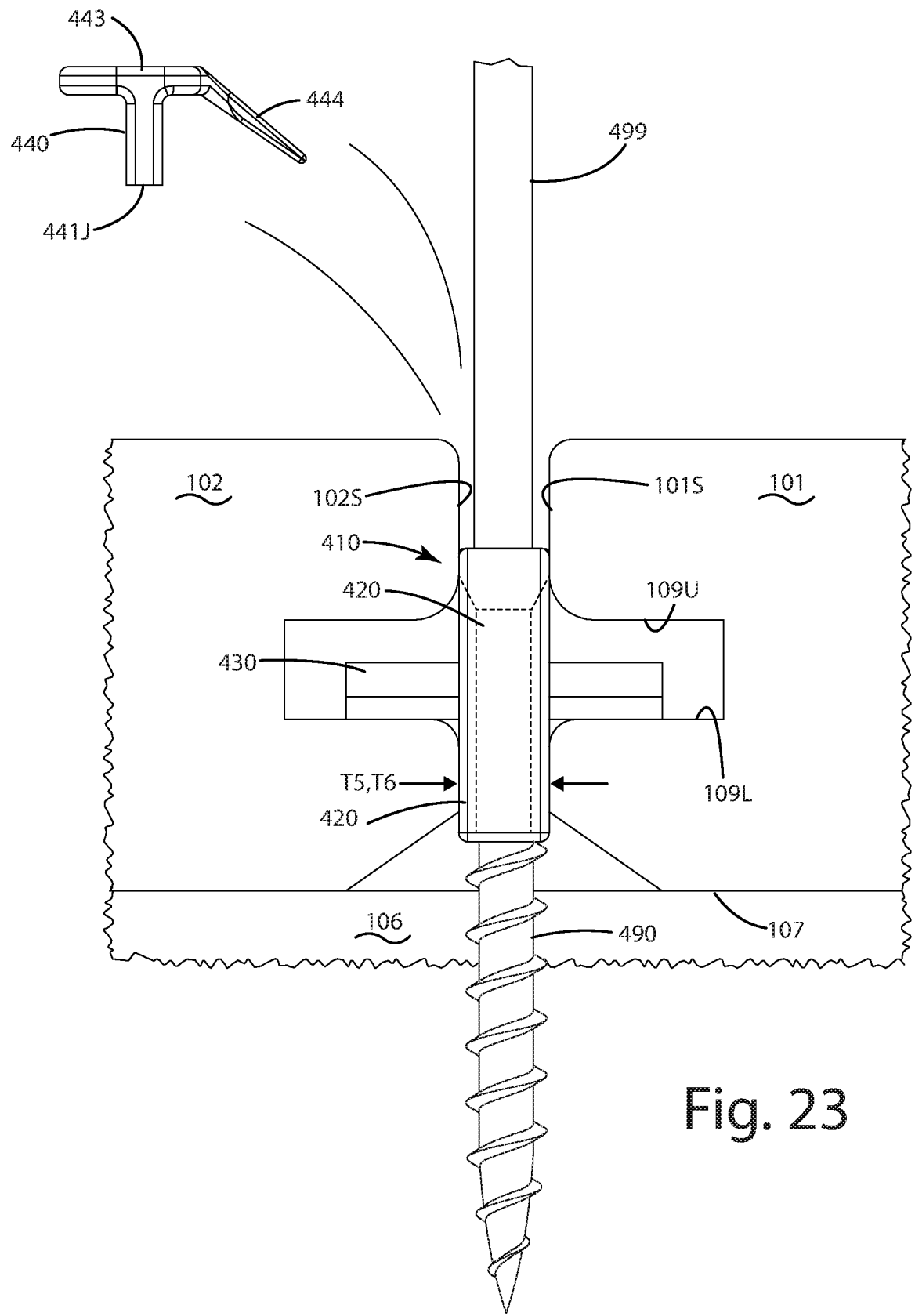
FIG. 23 is a side view of thereof with a fastener installed in an underlying joist and the fastener unit holding down the adjacent boards relative to the joist, with the upper platform clamp and legs disassociated from the fastener unit.
Figure 24:
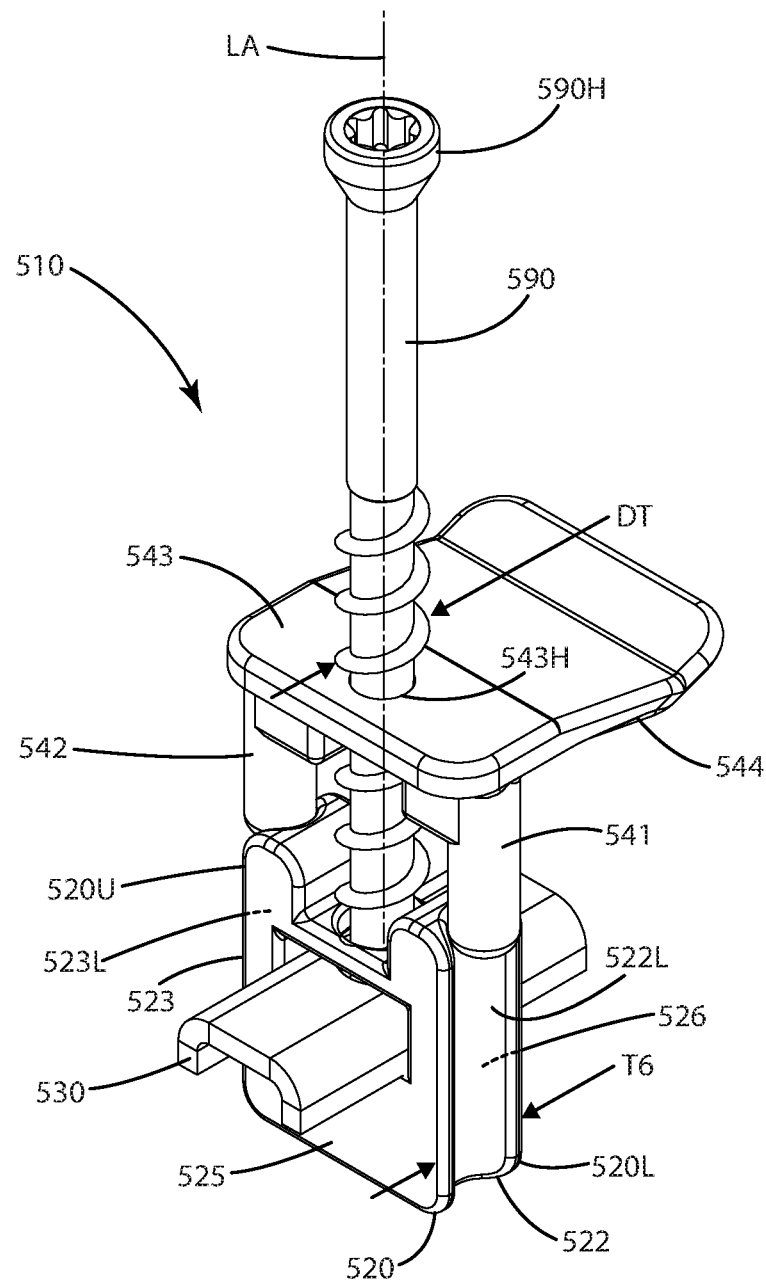
FIG. 24 is a perspective view of a fifth alternative embodiment of the fastener unit including a two piece unit with an upper platform clamp and opposing friction legs.

Accordingly, as shown in FIGS. 22-23, a user can apply a tool 499 to the fastener 490 and begin rotation of the fastener. As the fastener rotates, the threads 4901T rotate without engaging the hole 443H in the platform f443 or the second fastener hole SFH4 defined by the grip element 430 or the hole in the grip element. The threads can, however, engage the fastener hole FF14. The fastener can advance downward, between the respective side surfaces 101S and 102S. As the fastener advances downward, as shown in FIG. 23, the fastener eventually engages the board engagement element 444, in particular the upper platform 443. The head 490H engages the upper surface with a force and pushes downward on the platform and thus downward on the legs 441 and 442. When enough force is exerted downward or on the platform, the platform and/or the arms can buckle or deform. The legs can snap, break or become dissociated from the spacer block 420 at the respective fracture joints or locations 441J. The fastener continues to advance downward, until the head enters the above-mentioned upper void 420U of the spacer body 420. The head 490H continues to advance downward toward the joist. As it does, it can further fracture, break or otherwise disassociate the board engagement element 440. As a result, the fastener unit 410 no longer has the board engagement element associated with it, and is no longer in a clamping mode. Therefore, it transitions out of the clamping mode to a neutral mode. The head 490H also can engage the upper surface 430U or the grip element 430 in general, pulling it downward. As a result, the grip element, particularly the upper surface 430U disengages or moves away from the groove upper wall 109U of the first groove 103 and the other upper wall of the other groove 104 in the second board. The grip element thus moves downward, being dragged along by the head 490H. The grip element thus transitions from engaging the groove upper wall 109U to engaging the groove lower wall 109L as the fastener is advanced. The fastener 490 is advanced such that the grip element 430 pulls the first and second boards downward against the joist 106 and in particular its upper surface 107 to secure the boards to the joist.

This process can be repeated with multiple similar fastener units 410. Further, it is noted that the board engagement element 440, when dissociated from the fastener unit, optionally can be picked up and collected for removal from the site at which the fastener unit is used. Optionally, the board engagement element of this embodiment and any of the other embodiments herein, particularly the two-piece embodiments, can be brightly colored, for example of an orange, yellow, red, or blue color, so that it can be easily identified by a user and retrieved from the worksite. In some cases the spacer body can be a different color from the board engagement element 440. For example the spacer body 420 can be black, brown or a dark color, while the board engagement element 440 can be of a lighter or florescent color for easy identification and location.

Further optionally, the board engagement element of this embodiment and any of the other embodiments herein, particularly the two-piece embodiments, can be constructed all or in part from a biodegradable material so that when the board engagement element is disassociated from the fastener unit or other components, and falls to rest in the environment around the fastener unit, it will biodegrade over time. For example, the board engagement element, the fastener unit and/or parts thereof can be constructed from biodegradable material, such as fibers, cellulose, wood, starch, amylose, UV unstable polymers, and the like. When subjected to moisture, water, heat, UV rays or the like, the component or pieces can break down and disintegrate or turn from solid to liquid or a gel or simply disintegrate into smaller pieces. In some cases, the board engagement element alone can be constructed from the biodegradable material, while the remainder of the spacer body can be constructed from a polymer. The two elements can be glued, fastened, welded or otherwise connected to another via the legs or some other connection. In other cases, the board engagement element and the spacer body can be constructed from a common material which is biodegradable. Over time, the spacer body can also degrade after the gap is set and the grip element 430 holds the boards relative to one another and the joist.

A fifth alternative embodiment of the fastener unit is illustrated in FIGS. 24-30 and generally designated 510. The fastener unit of this embodiment is similar in structure, function and operation to the embodiments described above with several exceptions. For example, this unit 510 can include a fastener 590 similar to the fasteners 90, 190, 290, 390 and 490 above. It also can include a grip element 530 that is disposed in a recess defined by a spacer block 520 similar to the embodiments above. The grip element 530 optionally can extend from and beyond the forward 525 and rearward 526 surfaces of the spacer block 520. The spacer block can be sized with a thickness T6, which can correspond to a preselected gap G5 (FIG. 29) that is to be established between adjacently placed first board 101 and second board 102, similar to the thicknesses T1-T5 above. Like the fourth embodiment above, this fastener unit can be configured to engage the groove and the top surface of one or more boards in a clamping mode to secure the fastener unit adjacent a side surface of the board. The fastener unit 510 as shown can be a two piece unit, with the board engagement element separable and independently constructed from the spacer body.

The spacer block 520 and its features can be substantially identical to that of the fourth embodiment spacer block 420 above with several exceptions. For example, the spacer block 520 can define a first leg track 522L adjacent the first side surface 522 of the spacer block and a second leg track 523L adjacent the second side surface 523 of the spacer block. Each of these leg tracks can be generally C or U shaped and can be concave or defined inwardly, relative to the outermost portions of the respective side surfaces of the spacer block 520. These leg tracks can extend from the upper portion 520U downward, and some cases into the lower portion 520L of the spacer block 520. Although not shown, each of these leg tracks include a stop, to restrict the relative vertical movement of the respective first leg 541 and second leg 542, which can be slidably disposed in each of the respective leg tracks 522L and 523L.

Figure 26:
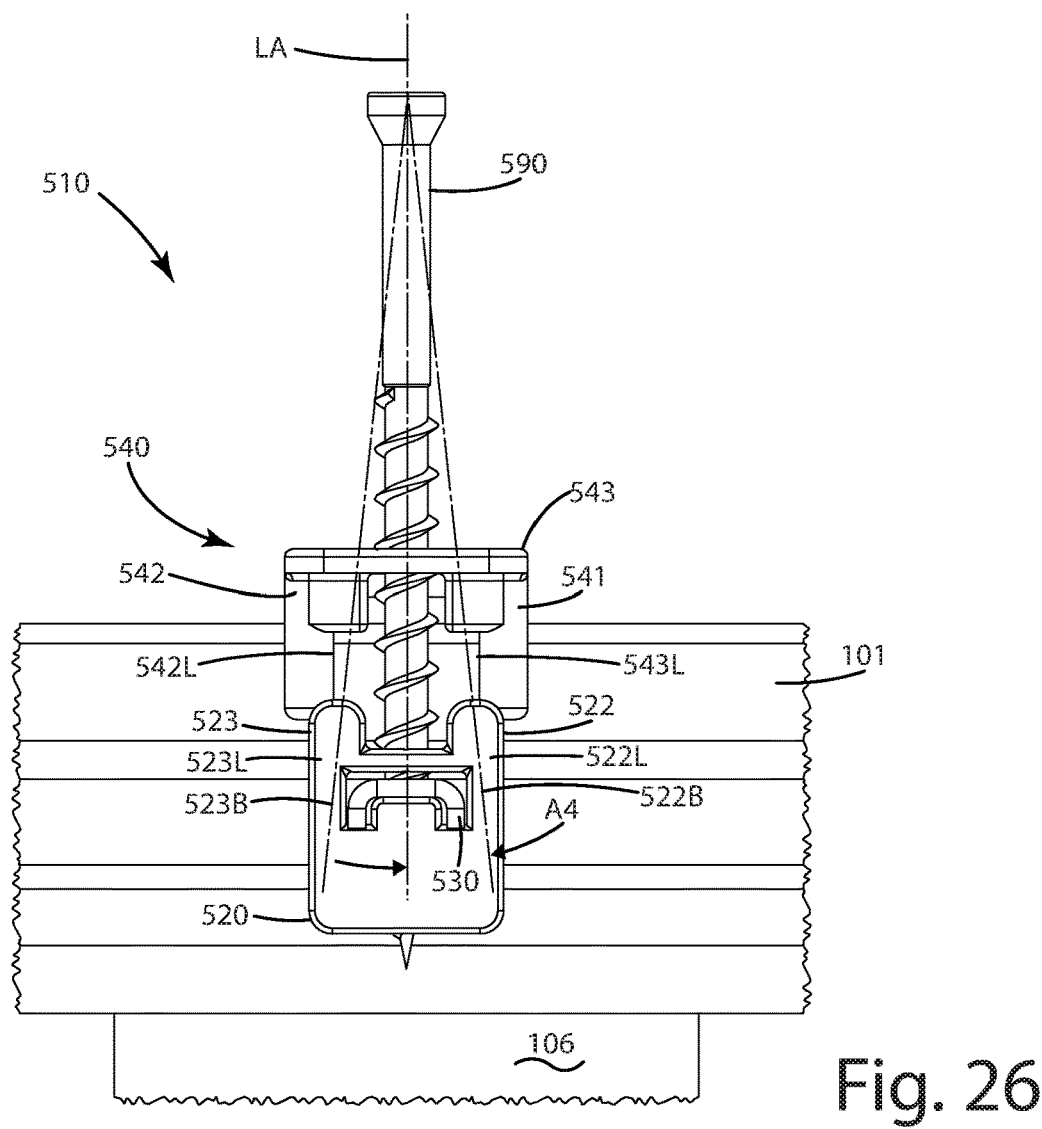
FIG. 26 is a front view of the fifth alternative embodiment of the fastener unit as it is about to transition from an expanded mode to a clamping mode.
Figure 27:
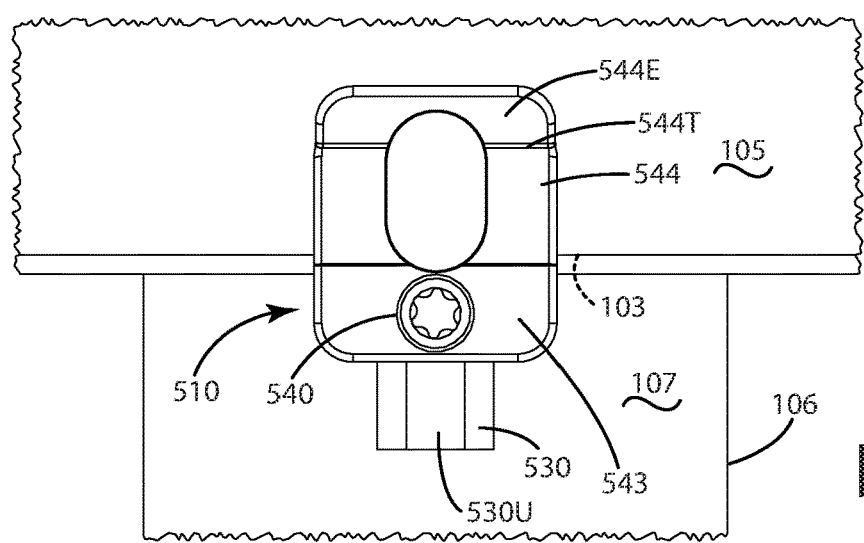
FIG. 27 is a top view thereof.

The leg tracks, shown in FIG. 26, optionally can include bottoms 522B and 523B. These bottoms can transition to the respective sidewalls of each of the leg tracks. These bottoms 522B and 523B can be angled at an angle A4 relative to a longitudinal axis LA of the fastener unit 510 and the fastener 590 when installed relative to the fastener unit. Optionally, the bottoms of the leg tracks and the leg tracks themselves can be offset and not parallel to the longitudinal axis. In some applications, the angle A4 can be offset from the longitudinal axis LA, optionally at least 2°, at least 5°, at least 10°, at least 15°, between 0° and 15° inclusive, between 1° and 15° inclusive, between 1° and 10° inclusive or between 1° and 5° inclusive.

The board engagement element 540 can be substantially identical to the board engagement element 440 described above, or other board engagement elements of other embodiments herein. The board engagement element 540 can include a platform 543 and first and second downwardly extending legs 541, 542. Each of these legs can include a respective track portion 542L and 543L which can be closer to the fastener 590 than an exterior or outer portion of each of the respective legs. The track portions 542L and 543L can be configured to slidably engage the respective tracks 522L and 523L of the spacer block 520.

In particular, the track portions 542L and 543L can slidably and frictionally engage the tracks 523L and 522L respectively. Each of the track portions and/or legs can also extend substantially parallel to the longitudinal axis LA. Therefore, when the platform 543 is pushed closer toward the grip element 530 and/or the spacer block 520, the tracks and their respective bottoms urge the legs 541 and 542 outward, away from the longitudinal axis LA slightly. This in turn creates a pinching effect between the legs so that the legs 541, 542 pinch, compress or otherwise bias against the spacer block 520. In turn, the legs frictionally engage the tracks and the spacer body to set a particular distance between an arm 544 of the board engagement element 540 relative to a grip element 530. Optionally, although not shown, the legs can be angled relative to the longitudinal axis inward, while the leg tracks can be substantially parallel to the longitudinal axis. In other applications, the legs tracks can be specially angled relative to one another to provide friction and forces to hold the legs a fixed position relative to the spacer block to set a distance between the board engagement element 540 and the grip element 530. Further optionally, the legs and the leg tracks can be coated with friction enhancing materials or constructed from such materials to enhance the friction between the two, to facilitate relative positioning and spacing of the components. Even further optionally, the legs and/or tracks can include respective teeth and associated recesses such that the legs can be adjusted and locked in the tracks at predetermined set intervals.

In the fifth embodiment, the board engagement element 540 and its components can engage the spacer block 520 to set a distance between the board engagement element 540 and the grip element 530. In turn, this can set the fastener unit 510. The fastener unit 510 as shown can be a two piece unit, with the board engagement element separable and independently constructed from the spacer body, in a clamped mode or an expanded mode. For example, the engagement of the legs 541 and the track 522L shown in FIG. 25 can set a preselected distance between the arm 544, and in particular its lowermost portion 544N, and the grip upper surface 530U of the grip element 530. By adjusting the legs, and sliding them within the respective tracks, the distance D2 can be altered to another distance, for example D21, which can be a lesser distance, when the fastener unit 510 is in a clamping mode shown in FIG. 28 relative to an extended mode shown in FIG. 25. In general, the first and second legs are movable relative to the first and second leg tracks respectively to adjust the preselected distance between the grip element and the board engagement element. The threads of the fastener 590 optionally can engage or interfere with a hole 543H around a board engagement element 540 to maintain the legs in position and set the preselected distance as well. The user thus can operate the fastener unit in the clamped mode or the extended mode, depending on the relative set up of the fastener unit and/or the installation state of the fastener unit 510 relative to one or more boards 101, 102.

As mentioned above, the board engagement element 540 can be substantially identical to that of the embodiments above, such as the fourth embodiment immediately above with several exceptions. For example, the board engagement element 540 can include a board engagement platform 543 from which an arm 544 extends, generally outward over a portion of the upper surface 530U of the grip element 530. The board engagement element 540, however, optionally can be separately constructed from the spacer body 520 and movable relative thereto. The arm 544 can include an outwardly extending portion 544D that transitions back upward at a transition region 544T toward an end 544E of the arm 544. The arm 544 can extend outward from the platform first at a downward angle and then back upward at an upward angle. The undersurface of the arm 544 can include engagement portion 544N, which can be configured to directly engage the upper surface 105 of the board 101. The arm 544 also can extend the entire width of the platform 543 shown for example in FIG. 27. Of course, the arm 544 can be of a width that is less than the entire width of the platform 543.

Optionally, the platform can define a fastener hole 543H, which can be larger in dimension than the diameter of the threads DT and the shaft in general. Thus, the board engagement element 540 can be readily and easily moved toward the grip element 530 to clamp the board between those elements, without the threads or shaft interfering with that motion by engaging the platform around the hole 543H. Further optionally, in other applications, the hole 543H can be constructed to be equal to or smaller in dimension than the diameter of the threads DT or the shaft in general. Thus, the board engagement element and/or the perimeter of the platform around the fastener can directly engage that fastener, its threads and the shaft. This engagement of interference between these components can be used to set a preselected distance between the arm 544 and the grip upper surface 530U so the unit fits a particular board or portion of a board between its upper surface and the groove. For example, the distance D21G from the upper surface to the upper wall 109U of the groove may be known for a particular board. The fastener unit 510 can be built or set so that the platform 543 engages the fastener 590 at the hole 543H and another hole defined by the spacer block 520 with an interference fit such that the board engagement element and spacer block are fixed spatially to maintain the distance D21 between the engagement part 544N and the grip upper surface 530U, which is equal to or slightly smaller than the distance D21G. Thus, when in use, a user can simply slide the unit onto the board, with the portion of the board between the upper surface and the groove fitting well into the gap between the engagement part 544N and the grip upper surface.

A method of using the fastener unit 510 of the fifth alternative embodiment will now be described with reference to FIGS. 25-30. Generally, the fastener unit 510 is configured such that the board engagement element 540 and the grip element 530 are operable to clamp the portion of the board 101 between the upper surface 105 of the board and the groove 103 in a clamped mode, in which the spacer block 520 is held in a static position adjacent the first side surface 101S of the board and generally held in that position while the second board 102 is placed adjacent the first board 101. The second board can be spaced a gap G5 away from the first board 101 such that the fastener 590 can be advanced to engage the grip element 530 against the board, within the grooves and secure those boards to an underlying joist 106.

Figure 25:
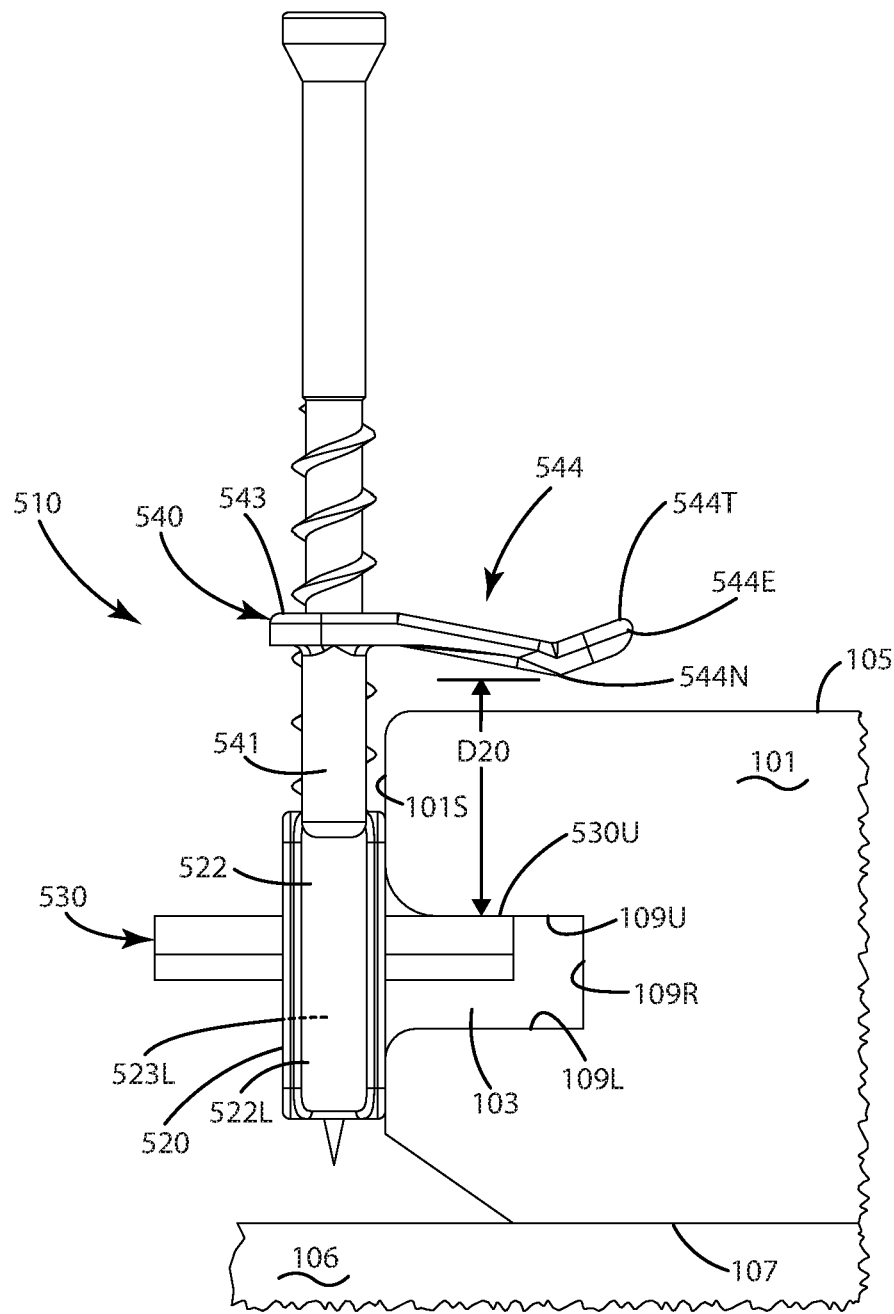
FIG. 25 is a side view of the fifth alternative embodiment of the fastener unit as it is moved for installation into a groove and over an upper surface of a board in an expanded mode.

Turning to FIG. 25, the fastener unit 510 is shown initially in an expanded mode. A user can move the fastener unit 510 adjacent the side surface 101S of the board 101, with the arm 544 projecting over the upper surface 105 of the board, and the grip element 530 extending inwardly into the groove 103 of the board. The upper surface 530U of the grip element can be placed adjacent the upper wall 109U of the groove. The arm 544 can be a distance D20 away from the grip element. In particular the engagement portion 544N of the arm 544 can be disposed a distance D20 away from the grip upper surface 530U. The spacer block 520 can be placed immediately adjacent the side surface 101S of the board 101. The legs 541 and 542 can be in an initial position relative to the respective leg tracks 522L and 523L. They can frictionally engage the leg tracks to hold the arm 544 and board engagement element in this fixed relationship relative to the grip element and the spacer body in general.

Figure 28:
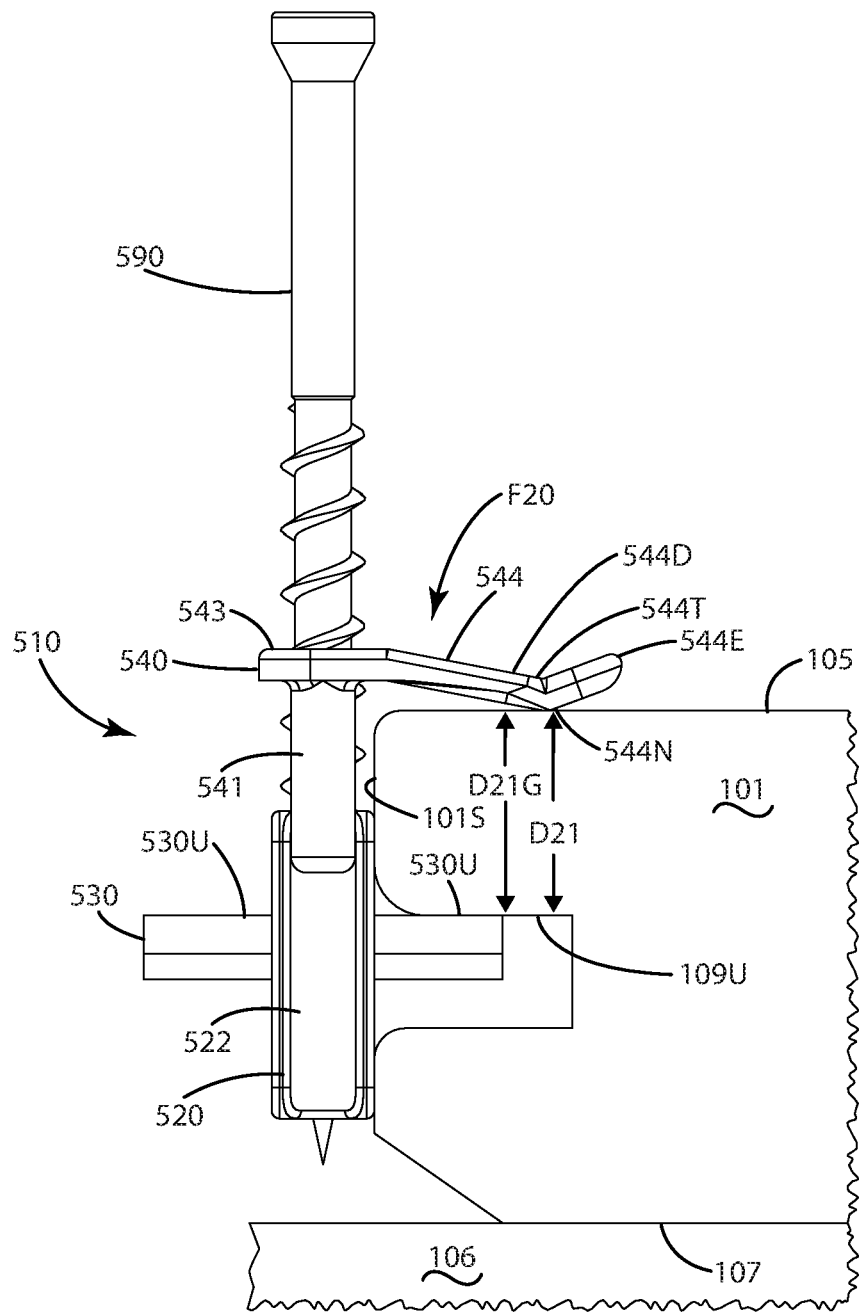
FIG. 28 is a side view thereof with the fastener unit converted to a clamping mode.
Figure 29:
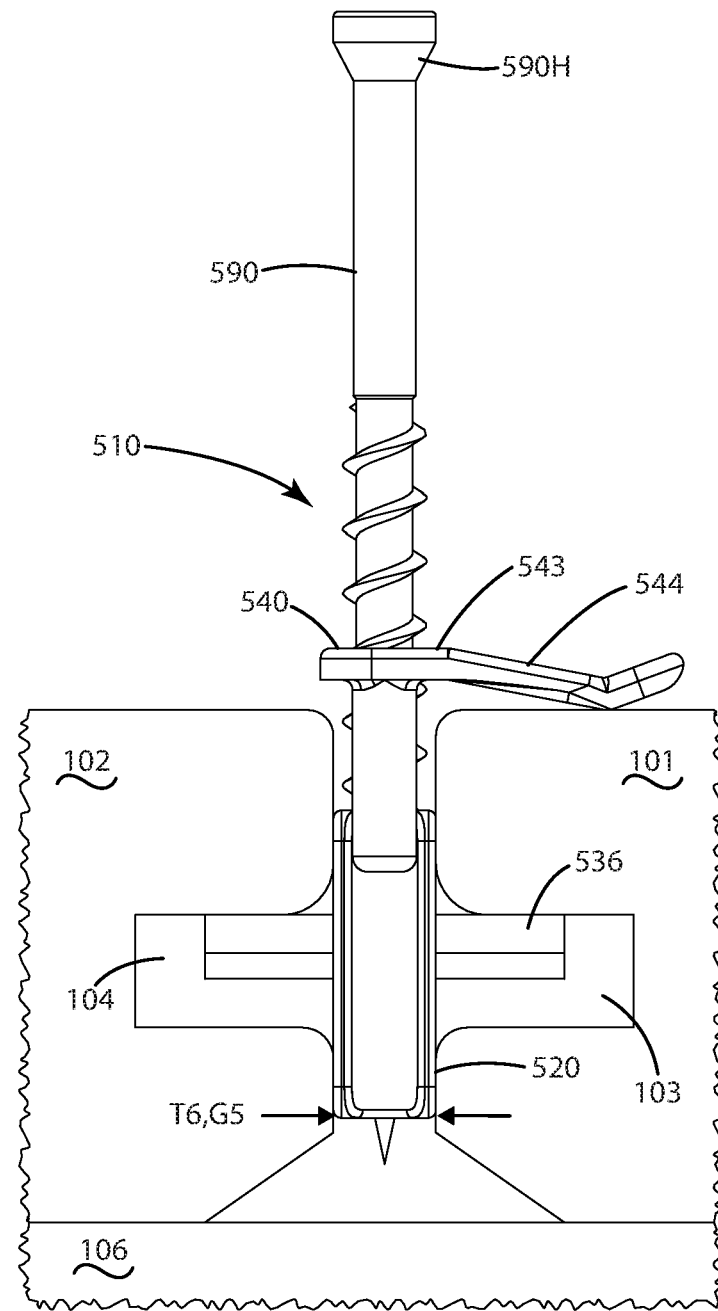
FIG. 29 is a side view thereof with the fastener unit in the clamping mode to clamp the board and hold the fastener unit between adjacent boards while setting a gap between those boards.

With the fastener unit 510 installed relative to the board 101, a user, as shown in FIG. 28 can apply a force F20 to move the board engagement element 540 toward the grip element 530. In turn, the arm 544 moves downward toward the board upper surface 105 until it engages that surface. The first leg 541 and the second leg 542 move downward in the respective leg tracks 522L and 523L. The legs frictionally engage these leg tracks and the spacer body in general as they move downward. As mentioned above, the tracks can be angled outward, away from the longitudinal axis, so that the legs are urged or bend outward, while holding the platform and remainder of the board engagement element in a fixed position relative to the spacer body when the force F20 is no longer applied. Optionally, where the hole 543H is smaller than the fastener and threads DT, the distance D21 between the arm portion 544N and the grip upper surface 530U can be preset before the fastener unit is applied to the board. In this case, the force F20 need not be applied to the unit, and the legs will not move relative to the spacer body. The unit can simply be pushed onto the board, captured between the arm and the grip element.

The force F20 continues to be applied until the engagement arm portion 544N engages the upper surface 105, while the grip upper surface 530U engages the upper wall 109U. The distance between the arm and the grip upper surface is set at a preselected distance D21. When set at this preselected distance, and with the board engagement element 540 engaging the groove with the grip element 530, the fastener unit 510 is placed in a clamping mode from the previous expanded mode. In this clamping mode, the board engagement element and grip element respectively clamp the board as described in the embodiments above to hold the spacer body 520 adjacent the side surface 101S of the board, and the fastener above the joist 106.

A second board 102 can be placed adjacent the first board 101, with the spacer block 520 setting the gap G5 via its thickness T6 located between the respective side surfaces of the first board 101 and second board 102, similar to the embodiments above. The board engagement element 540 and grip element 530 continue to engage the board located there between. Optionally, the board engagement element 540 and its arm 544 do not extend over the upper surface of the second board 102 placed adjacent the first board 101.

Figure 30:
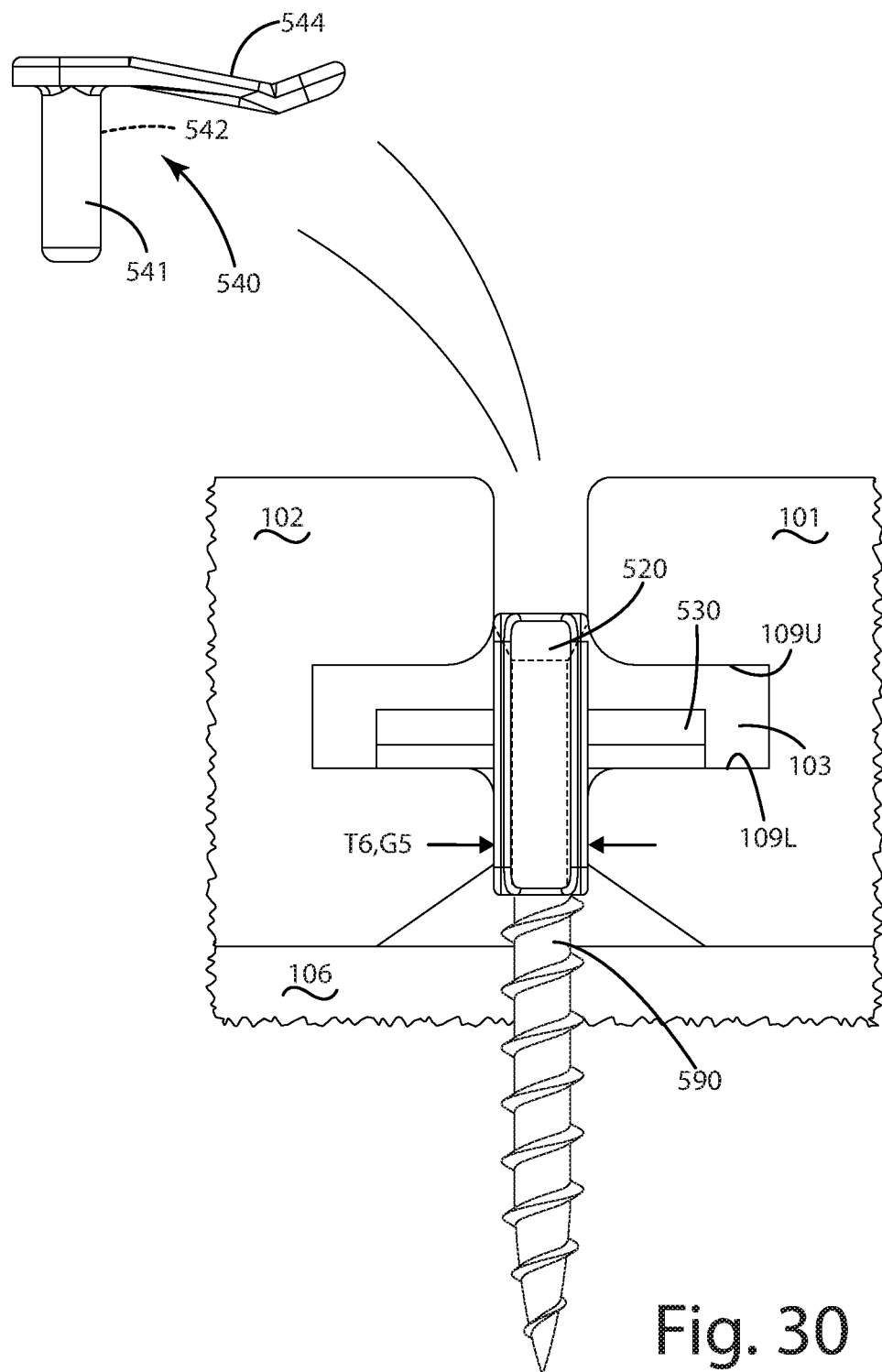
FIG. 30 is a side view thereof with a fastener installed in an underlying joist and the fastener unit holding down the adjacent boards relative to the joist, with the upper platform clamp and legs disassociated from the fastener unit.
Figure 31:
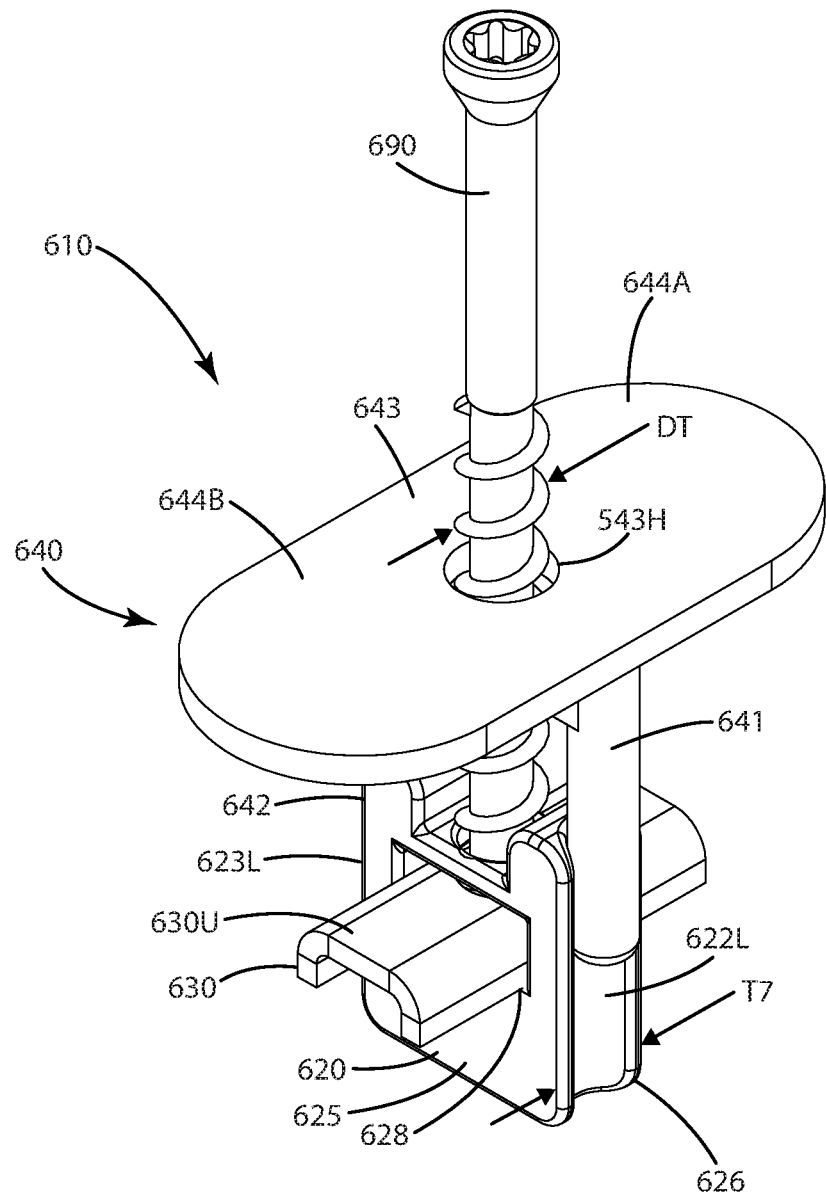
FIG. 31 is a perspective view of a sixth alternative embodiment of the fastener unit including a two piece unit with an upper platform clamp and opposing friction legs.

With the fastener unit 510 installed between the adjacent first and second boards 101 and 102, and the gap G5 set between those boards, the fastener 590 can be advanced downward into the joist 106. Similar to the embodiment above, the fastener head 590H engages the board engagement element 540 as the fastener 590 is advanced. The head 590H collides with or otherwise engages the platform 543 and/or the board engagement element 540A in general. The head 590H can be pulled through that component and can destroy deform or otherwise break a port portion of that component. As it does, the board engagement element 540 and its respective components, such as the legs 541, 542 and the arm 544 become dissociated from the spacer body 520 as shown in FIG. 30. Although shown there in a single complete piece, the board engagement element can break into multiple pieces and can become dissociated from the spacer body 520. Like the embodiment above, the grip element 530 also is pulled downward, away from the upper wall 109U to engage the lower wall 109L of the grooves to thereby clamp down the boards to the underlying joist 106. This process can be repeated for multiple fastener units, which can be preinstalled relative to the first and second boards before the advancing of the fastener begins.

A sixth alternative embodiment of the fastener unit is illustrated in FIGS. 31-36 and generally designated 610. The fastener unit of this embodiment is similar in structure, function and operation to the embodiments described above with several exceptions. For example, this unit 610 can include a fastener 690 similar to the fasteners 90, 190, 290, 390, 490 and 590 above. It also can include a grip element 630 that is disposed in a recess 628 defined by a spacer block 620. The grip element 630 optionally can extend from and beyond the forward 625 and rearward 626 surfaces of the spacer block 620 similar to the embodiments above. The spacer block can be sized with a thickness T7, which can correspond to a preselected gap G6 (FIG. 35) that is to be established between adjacently placed first board 101 and second board 102, similar to the thicknesses T1-T6 above. Like the fourth and fifth embodiments above, this fastener unit can be configured to engage the groove and the top surface of one or more boards in a clamping mode to secure the fastener unit adjacent a side surface of the board.

The spacer body 620 can include leg tracks 622L and 623L, as well as the first 641 and second 642 legs and a grip element 630, which can be substantially identical to those in the embodiments above and therefore will not be described again in detail here. The board engagement element 640, however, can be slightly different from the board engagement element 640 of the embodiment above. For example, the board engagement element 640 can include a platform 643. The platform can include first and second arms 644A and 644B. These arms can project forwardly and rearwardly relative to the legs 641 and 642, generally outward and over the grip upper surface 630U of the grip element 630. The arms 644A and 644B can be an extension of the first platform 643. They also can extend farther away from the spacer block forward and rearward surfaces than the grip element extends away from those forward and rearward surfaces of the spacer block 620. The platform 643 also can define a platform hole 643H. The platform hole can be larger than the diameter of the threads DT of the fastener 690 so that the fastener 690 can rotate within the fastener hole 643H without engaging the perimeter of that hole defined by the platform as the fastener rotates.

Figure 32:
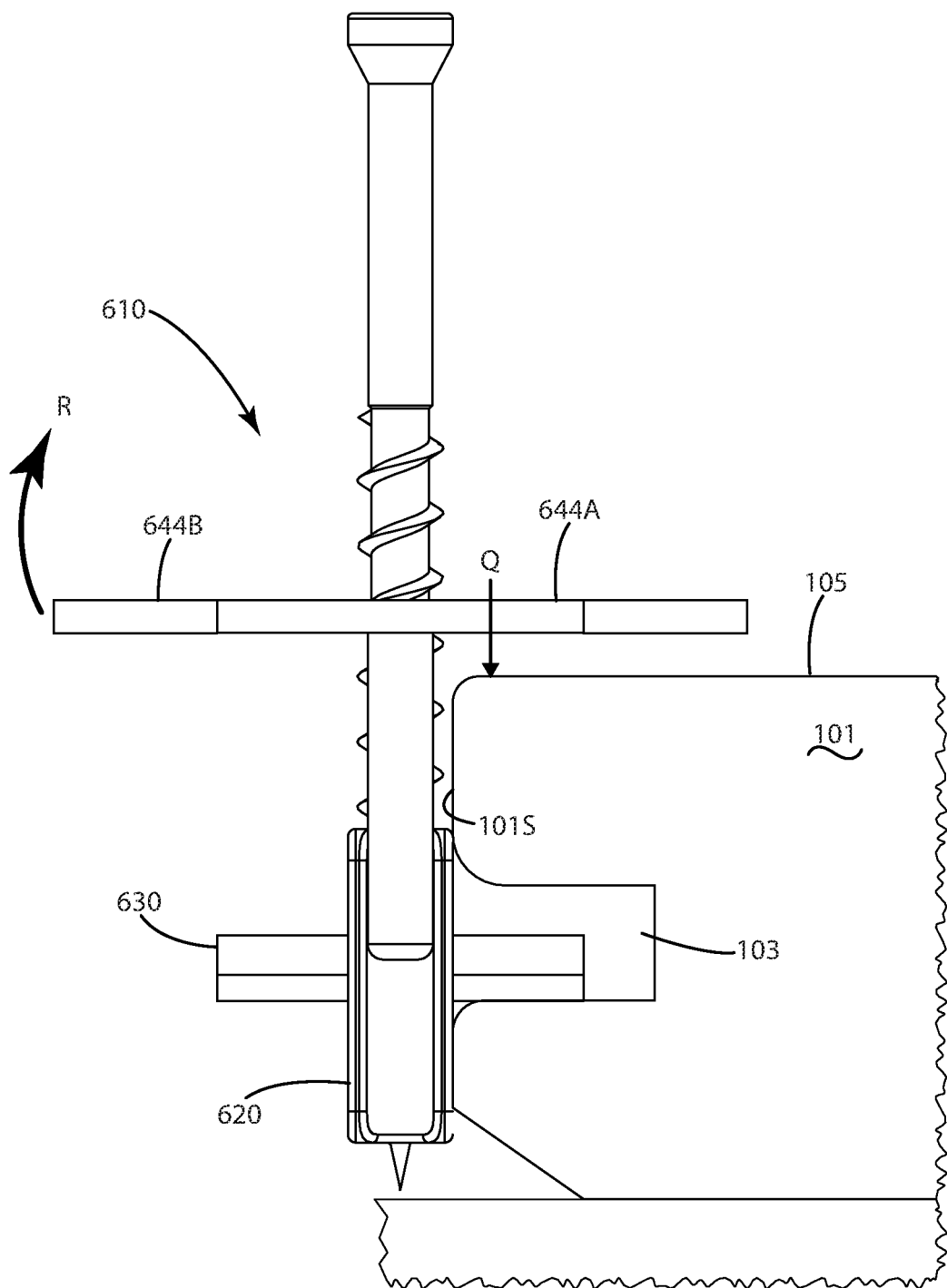
FIG. 32 is a side view of the sixth alternative embodiment of the fastener unit as it is moved for installation into a groove and over an upper surface of a board in an expanded mode.
Figure 33:
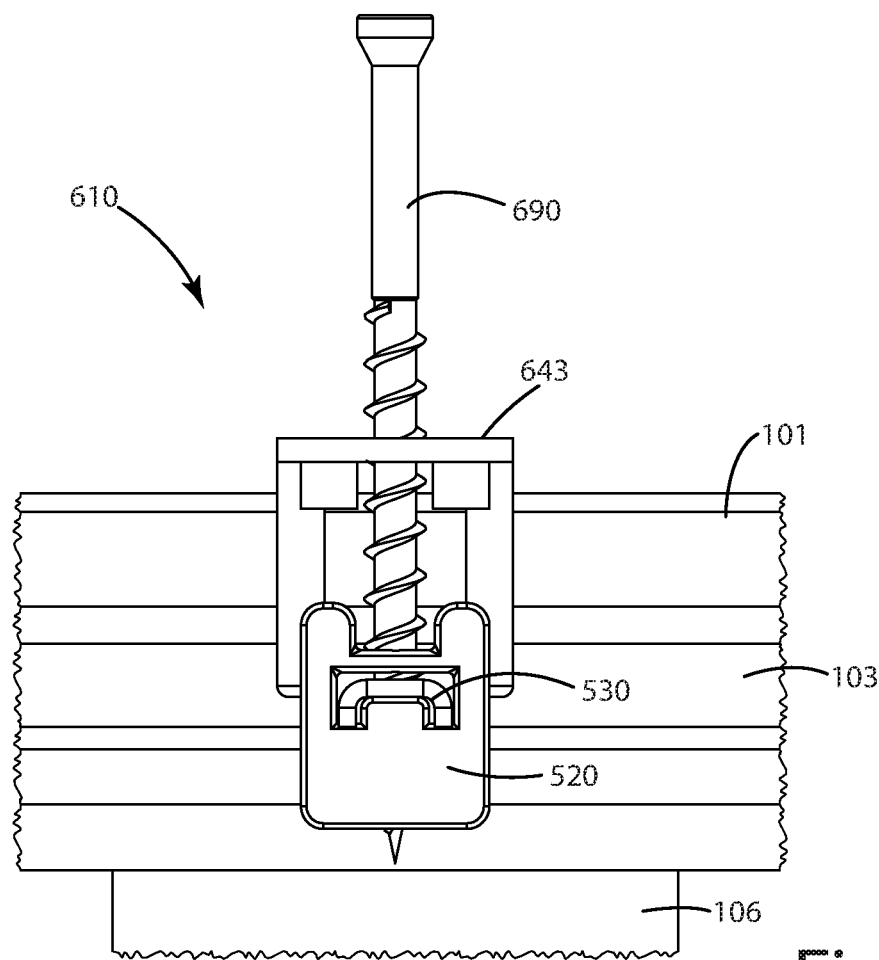
FIG. 33 is a front view of the sixth alternative embodiment of the fastener unit as it is about to transition from an expanded mode to a clamping mode.
Figure 34:
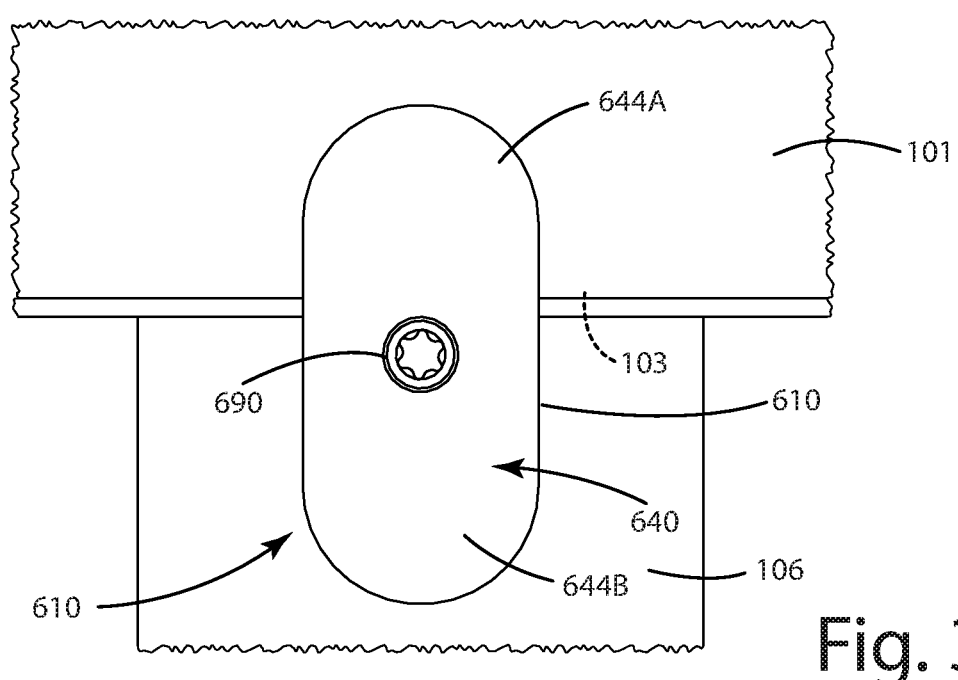
FIG. 34 is a top view thereof.

The fastener unit 610 can be installed and used relative to first and second boards similar to the fourth and fifth embodiments described above. For example, as shown in FIGS. 32-34, the fastener unit 610 can be placed adjacent a first board 101 such that the grip element 630 is inserted into the groove 103. A first arm 644A can extend over the upper surface 105 of the board 101. A second arm 644B can extend outward, away from the first board, similar to the grip element 630 extending in that direction away from the spacer block 620.

Figure 35:
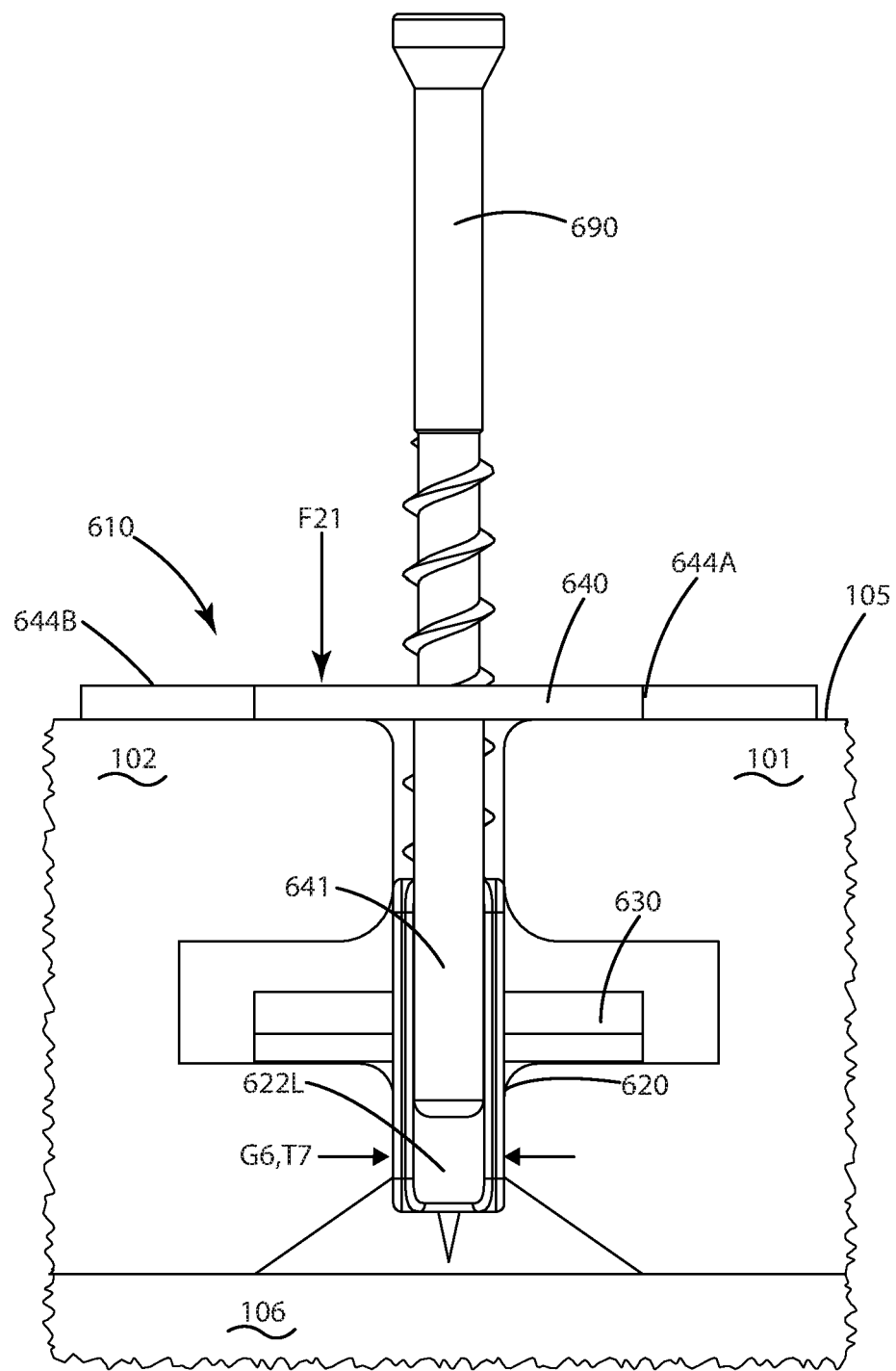
FIG. 35 is a side view of thereof with the fastener unit transitioned to a clamping mode to clamp the board and holding the fastener unit between adjacent boards while setting a gap between those boards.

As shown in FIG. 35, a user can push down with force F21 to move the board engagement element 640 downward, toward the grip element 630. The respective legs 641 and 642 thus move downward lay in the tracks leg tracks 622L and 623L respectively. The legs frictionally engage those tracks during this movement and after they come to rest. The portions of the boards between the upper surfaces of the boards and the grooves of the boards can be clamped between the board engagement element 640 and the grip element 630. The gap G6 can be set by the thickness T7 of the spacer block 620, which engages the respective side surfaces of the first and second boards.

Figure 36:
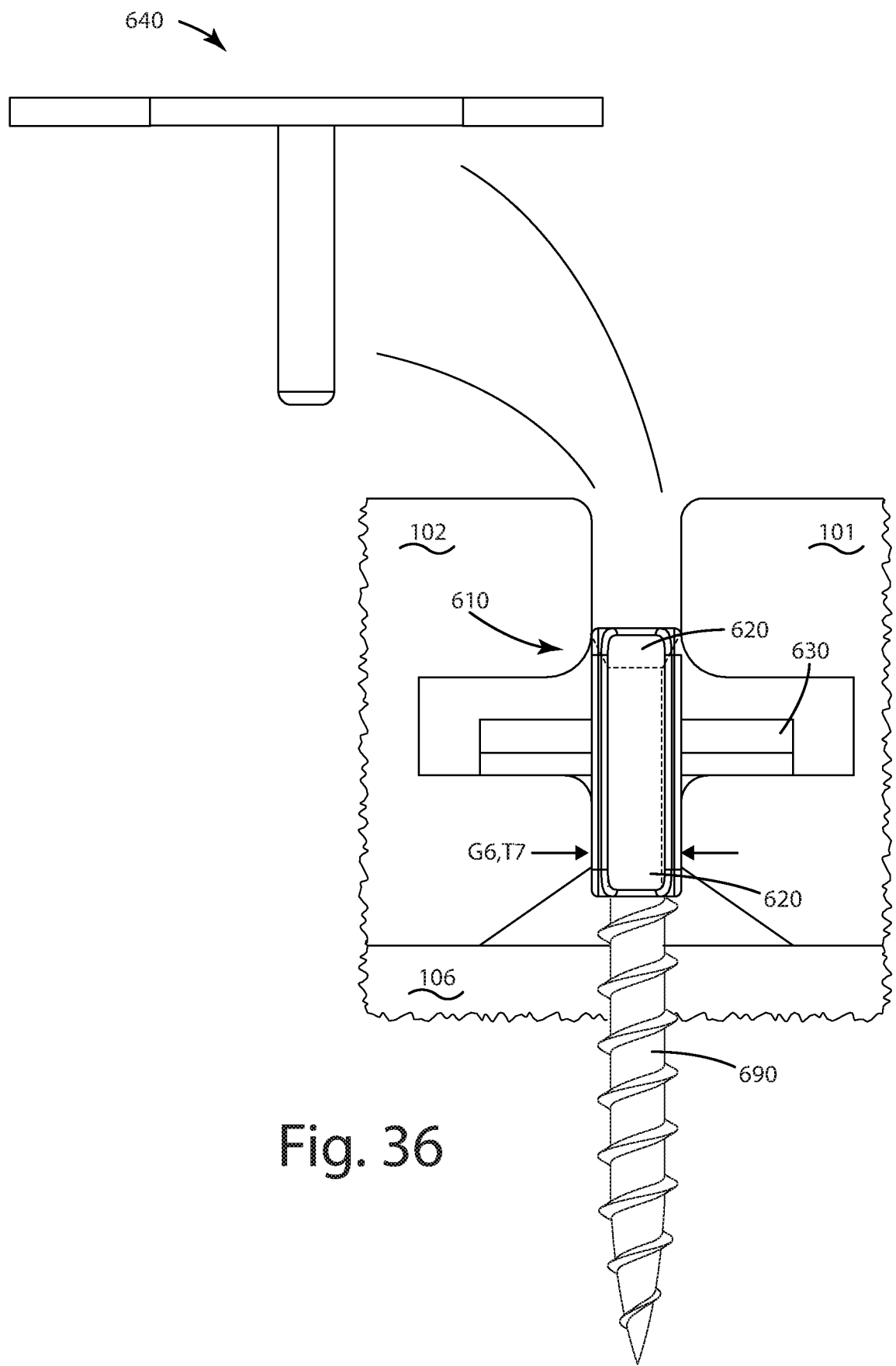
FIG. 36 is a side view of thereof with a fastener installed in an underlying joist and the fastener unit holding down the adjacent boards relative to the joist, with the upper platform clamp and legs disassociated from the fastener unit.
Figure 37:
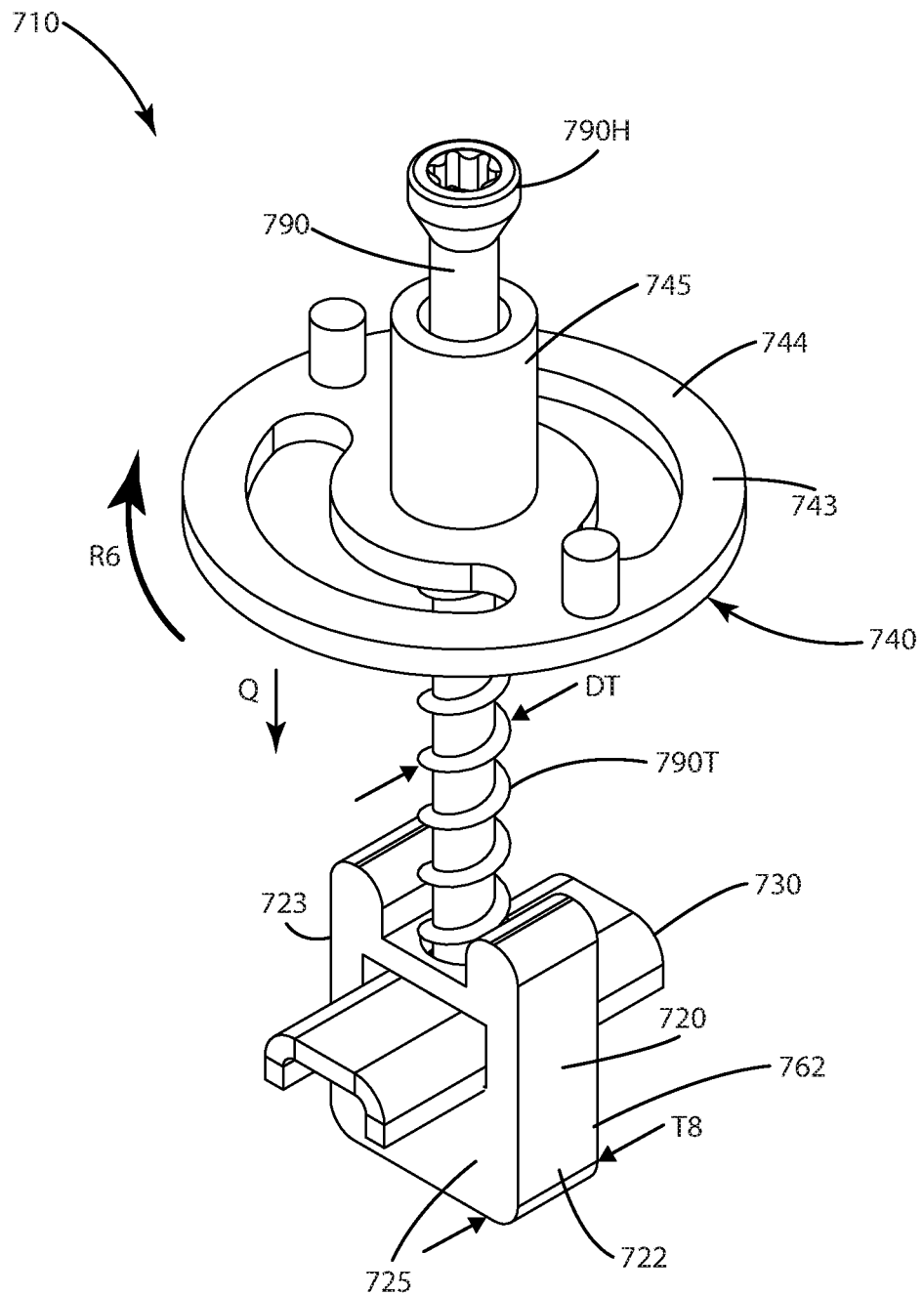
FIG. 37 is a perspective view of a seventh alternative embodiment of the fastener unit including an upper wheel clamp.

The fastener 690 can be advanced into the underlying joist as shown in FIG. 36. In doing so, the fastener head 690H can engage the grip element 630 thereby clamping the first and second boards 101 and 102 to the underlying joist 106. During the process, similar to the fourth and fifth embodiments above, the board engagement element 640 can become dissociated from the spacer body and the remainder of the fastener unit 610 in general, and can come to rest in the environment around the boards and/or on the respective boards. The process can be repeated for multiple additional fastener units to secure the boards to the underlying joist.

A seventh alternative embodiment of the fastener unit is illustrated in FIGS. 37-42 and generally designated 710. The fastener unit of this embodiment is similar in structure, function and operation to the embodiments described above with several exceptions. For example, this unit 710 can include a fastener 790 similar to the fasteners 90, 190, 290, 390, 490, 590 and 690 above. It also can include a grip element 730 that is disposed in a recess 728 defined by a spacer block 720. The grip element 730 optionally can extend from and beyond the forward 725 and rearward 726 surfaces of the spacer block 720. The spacer block can be sized with a thickness T8, which can correspond to a preselected gap G7 (FIG. 41) that is to be established between adjacently placed first board 101 and second board 102, similar to the thicknesses T1-T7 above. Like the fourth, fifth and sixth embodiments above, this fastener unit can be configured to engage the groove and the top surface of one or more boards in a clamping mode to secure the fastener unit adjacent a side surface of the board.

Figure 41:
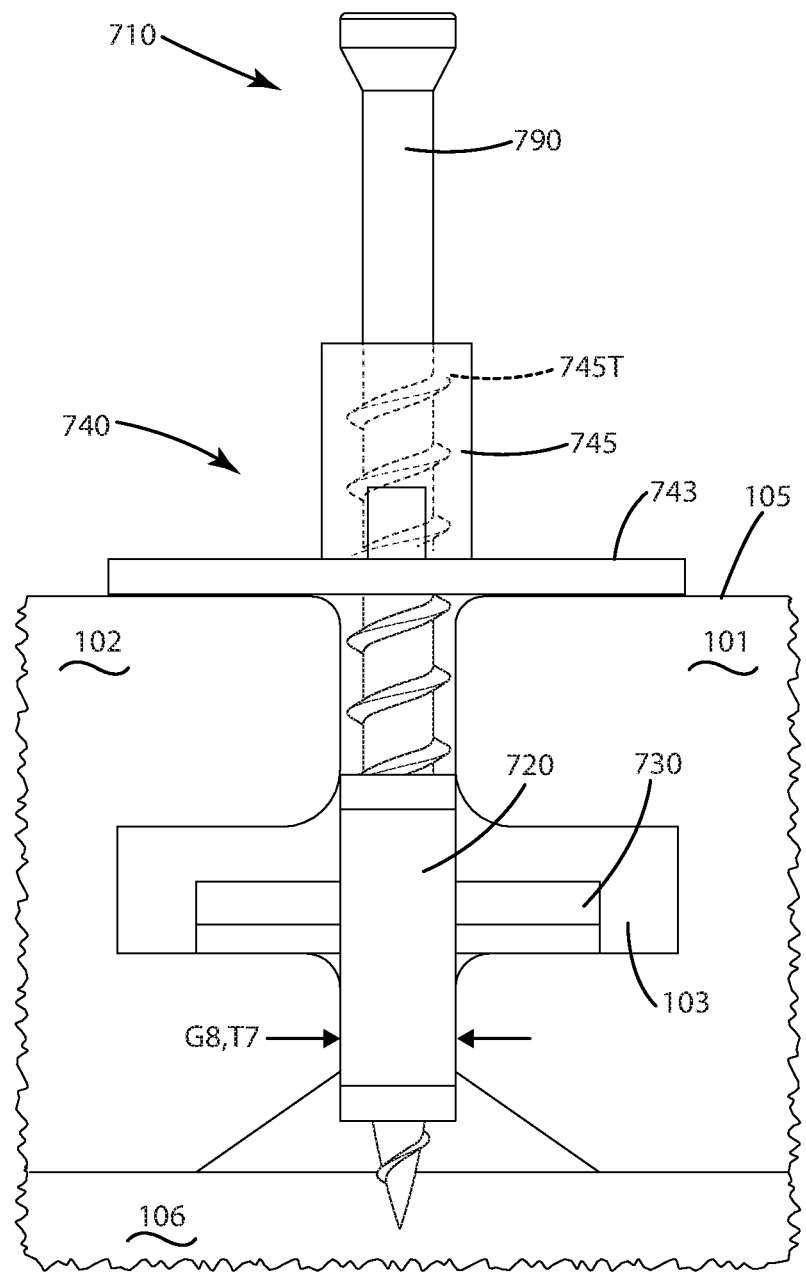
FIG. 41 is a side view of the seventh alternative embodiment of the fastener unit transitioned to a clamping mode to clamp the board and hold the fastener unit between adjacent boards while setting a gap between those boards.

The board engagement element 740 of this embodiment however, can move differently. The board engagement element 740 can include a platform 743 within an outer perimeter 744. The first platform 743 can be constructed in the form of a wheel, gear or rounded plate. Of course, other shapes for the platform, such as polygonal or rounded shapes can be selected. The plate can be a separate and independent component from the spacer block 720 and the grip element 730. The board engagement element 740 also can include a barrel 745 that extends from the plate 743. The barrel 745 can include internal threads 745T as shown in FIG. 41. These internal threads 745T can engage the threads 790T defined along the shaft of the fastener 790. Thus, the board engagement element 740 can be rotated in direction R6 (or another direction, depending on thread direction) such that the platform 743 moves in direction Q, generally toward the grip element 730.

Figure 38:
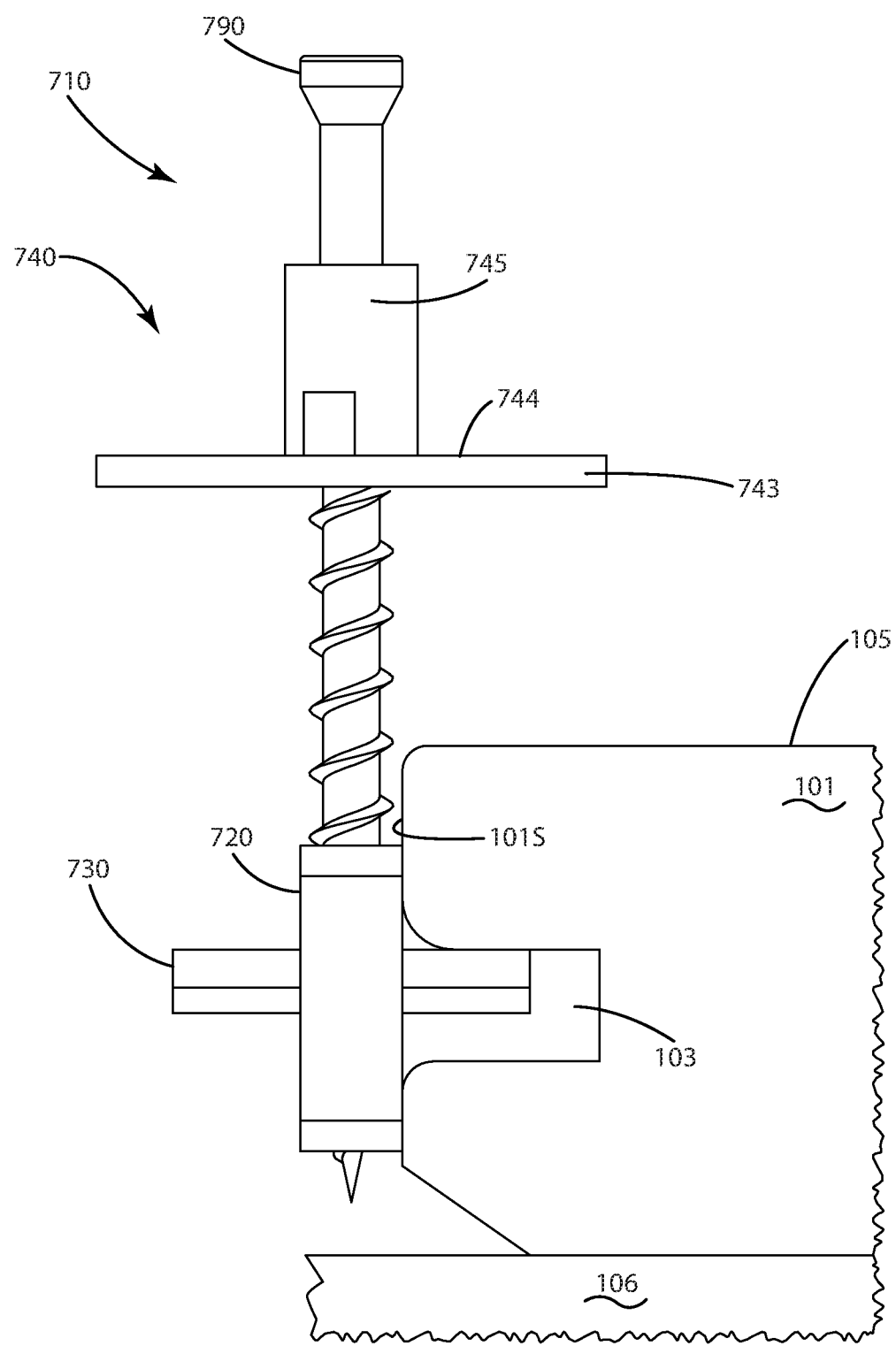
FIG. 38 is a side view of the seventh alternative embodiment of the fastener unit as it is moved for installation into a groove and over an upper surface of a board in an expanded mode.
Figure 39:
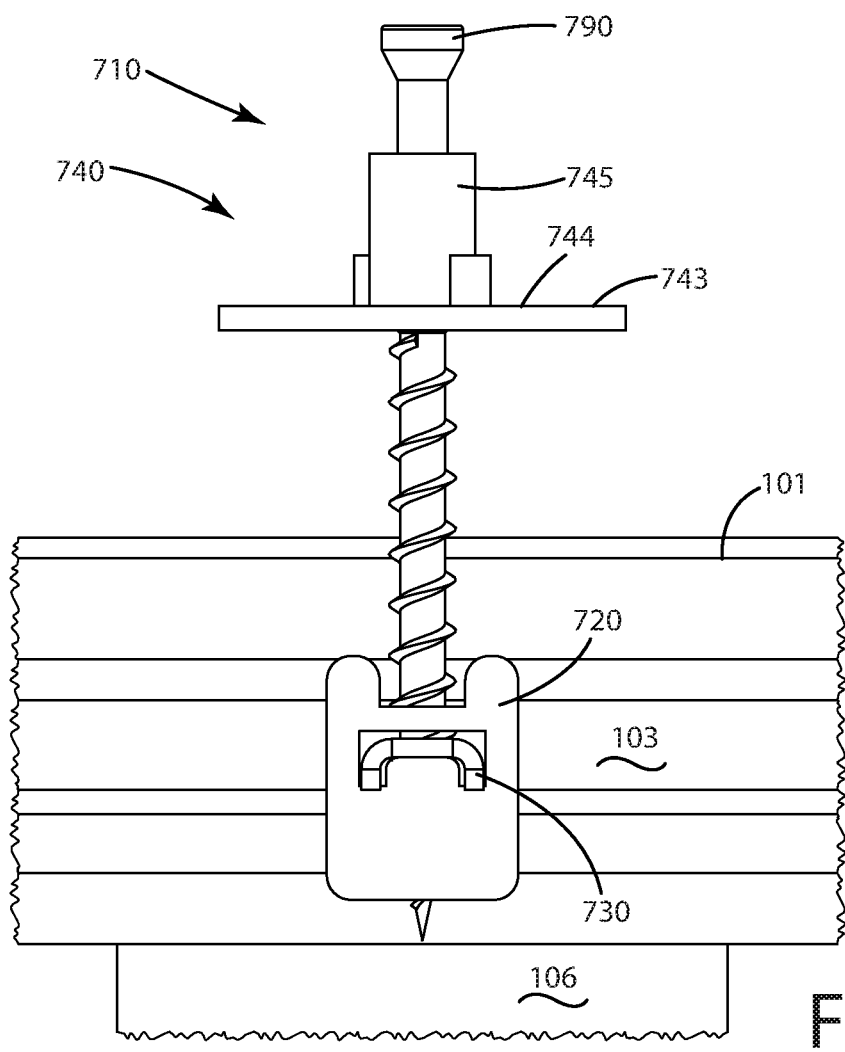
FIG. 39 is a front view of the seventh alternative embodiment of the fastener unit as it is about to transition from an expanded mode to a clamping mode.
Figure 40:
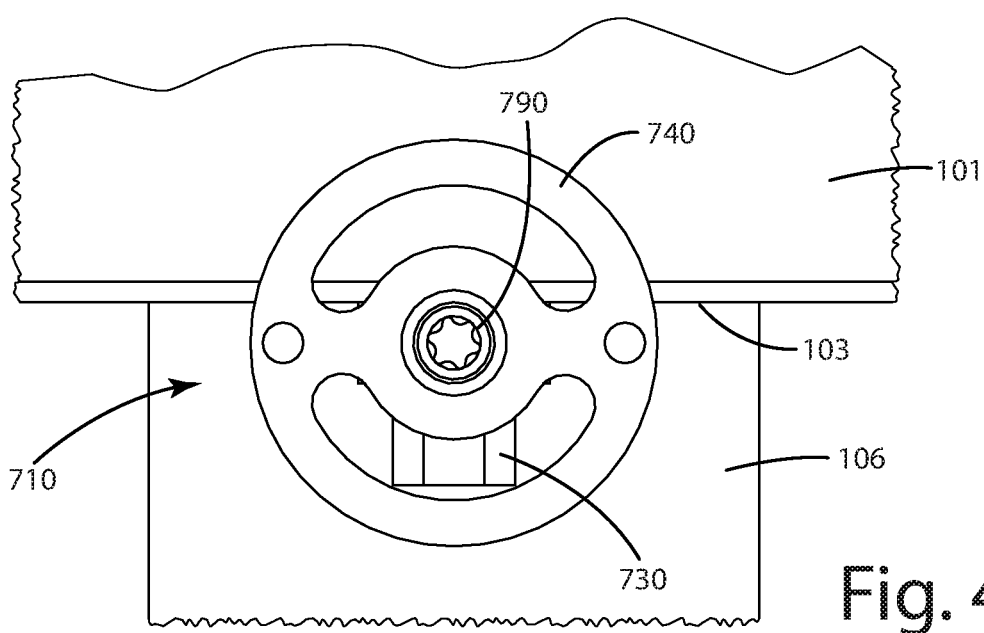
FIG. 40 is a top view thereof.

A method of using the seventh alternative embodiment of the fastener unit 710 is similar to the methods of using the other embodiments above. For example, the fastener unit 710 can be placed adjacent a side surface 101S of a board, with the spacer block 720 engaging that side surface 101S as shown in FIGS. 38-40. The grip element 730 can be placed in the groove 103 of the board 101. The board engagement element 740 can be disposed above the upper surface 105 of the board 101 and the fastener unit 710 can be placed above and aligned with the joist 106. A user can rotate the board engagement element 740 about the threads 790T of the fastener 790. As a result, the board engagement element moves downward in direction Q toward the upper surface 105 of the board 101. A second board 102 can be moved adjacent the first board 101, with the gap G8V between the side surfaces of those boards being set by a thickness T7 of the spacer body 720. The plate 743 can project over the upper surface of both of the adjacent boards as shown in FIG. 41. The grip element 730 can extend into the respective grooves of each of the boards.

Figure 42:
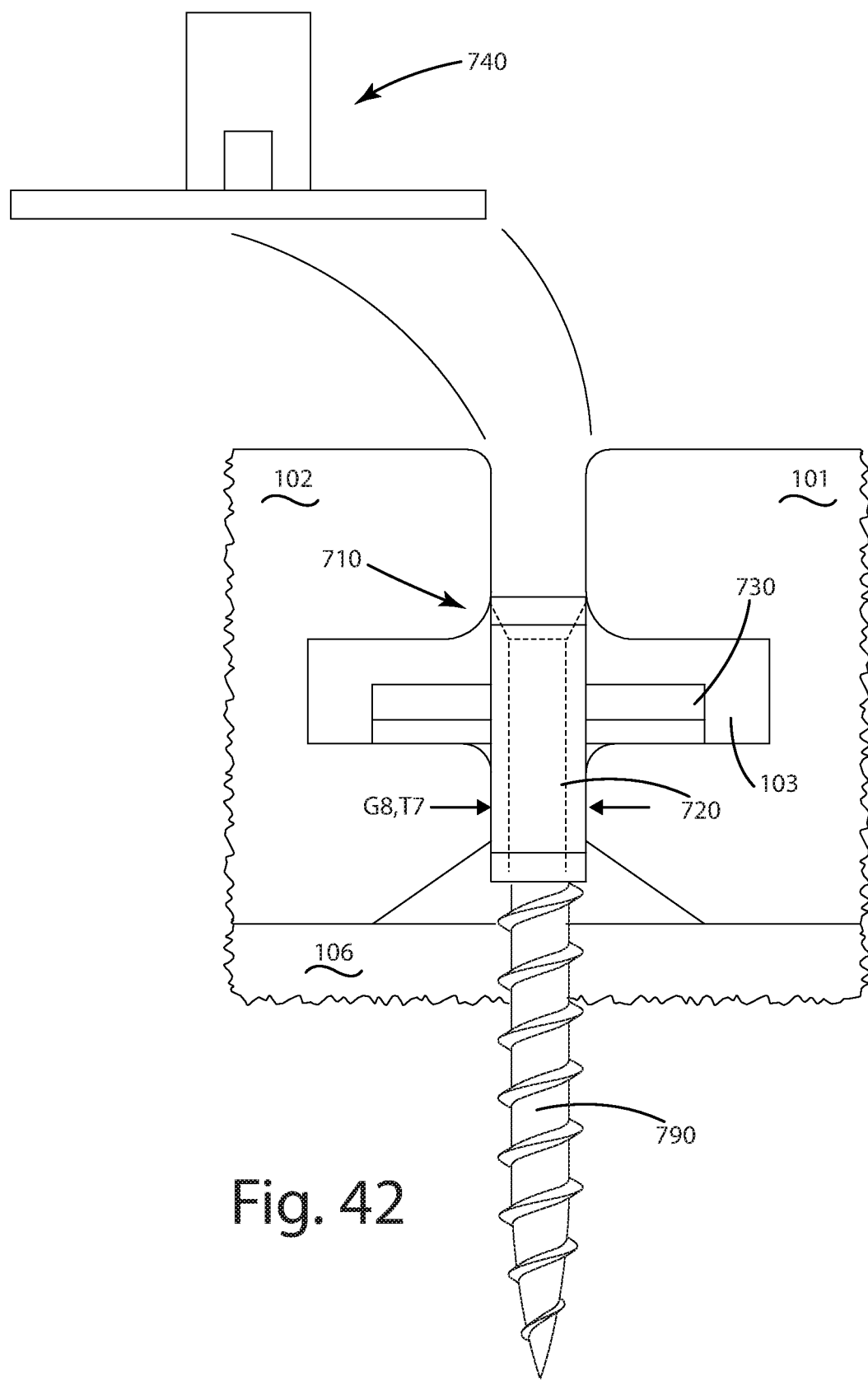
FIG. 42 is a side view of the seventh alternative embodiment of the fastener unit with a fastener installed in an underlying joist and the fastener unit holding down the adjacent boards relative to the joist, with the upper wheel clamp being disassociated from the fastener unit.

After the fastener unit is installed and the boards are adjacent one another with a gap properly set, the fastener 790 can be advanced into the underlying joist as shown in FIG. 42, where, in so doing, the board engagement element 740 becomes disassociated from the fastener and can come to rest and the environment surrounding the fastener unit. The process can be repeated for additional fastener units to secure the boards to one another and underlying joists.

An eighth alternative embodiment of the fastener unit is illustrated in FIGS. 43-49 and generally designated 810. The fastener unit of this embodiment is similar in structure, function and operation to the embodiments described above with several exceptions. For example, this unit 810 can include a fastener 890 similar to the fasteners 90, 190, 290, 390, 490, 590, 690 and 790 above. It also can include a grip element 830 that is disposed in a recess 828 defined by a spacer block 820, similar to the embodiments above. The grip element 830 optionally can extend from and beyond the forward 825 and rearward 826 surfaces of the spacer block 820. The spacer block can be sized with a thickness T9, which can correspond to a preselected gap G8 (FIG. 47) that is to be established between adjacently placed first board 101 and second board 102, similar to the thicknesses T1-T8 above. The board engagement element 840 can include a plate 844 joined with the spacer block 820 via spring legs, such as first 841 and second 842 spring legs extending downward from a first platform 843, below the grip element 830. The plate 844 can be configured to engage a lower surface 101L of the first board 101, while the grip element 830 engages the groove 103, to secure the spacer block 820 adjacent the first side surface 101S of the first board 101.

Figure 43:
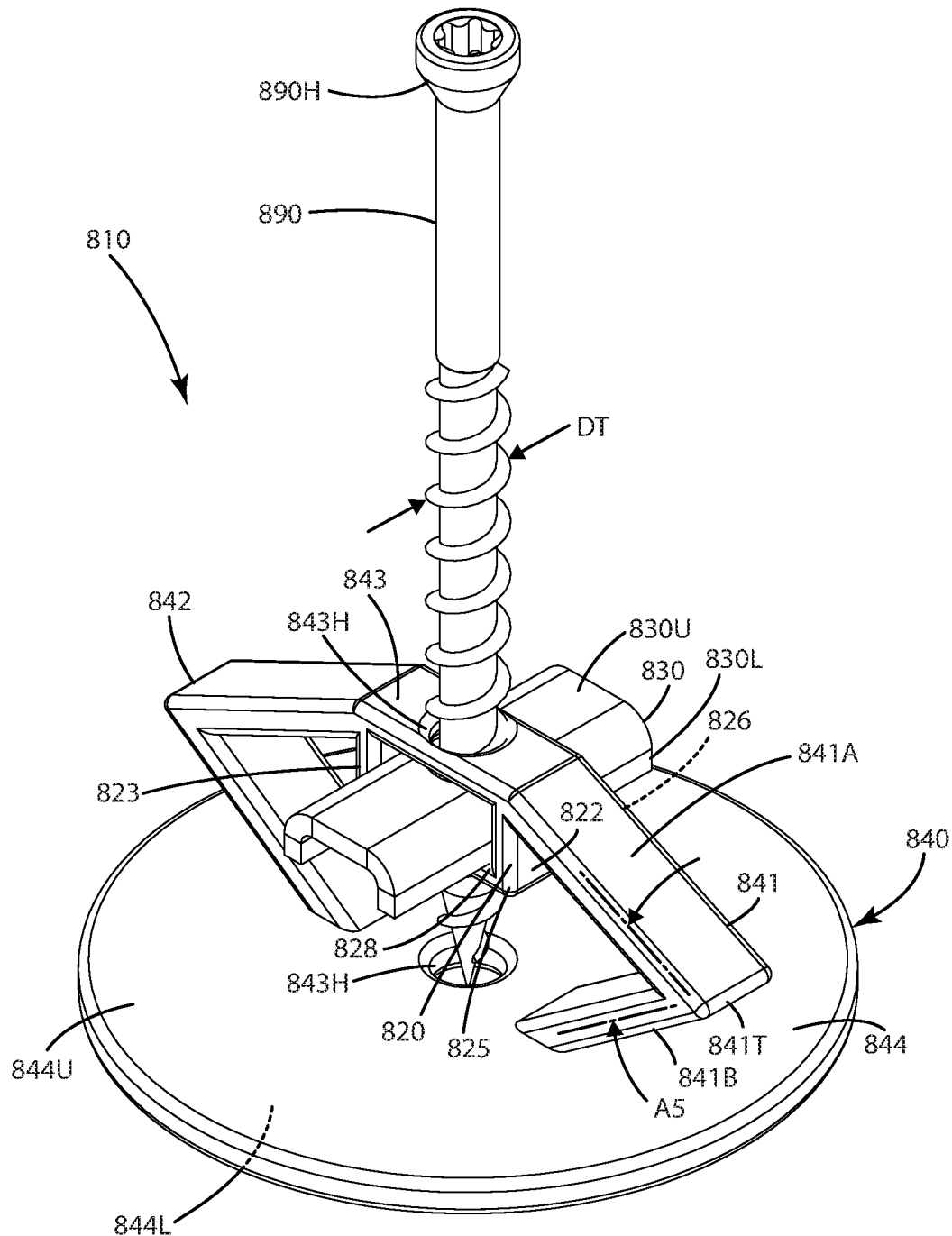
FIG. 43 is a perspective view of a eighth alternative embodiment of the fastener unit including opposing leaf springs and a lower engagement plate.

As shown in FIG. 43, the spacer body 820 is configured to support the grip element 830. The board engagement element 840 can include the plate 844, which is attached to a platform 843 via the first and second legs 841 and 842. The platform 843 can extend upward, above the grip element 830. The platform 843 can define a fastener hole 843H which is sized slightly larger than the diameter of the threads DT, such that the fastener 890 can rotate freely relative to the platform 843, as well as the grip element 830, below it which can include a fastener hole such as those described in connection with the other grip elements above. The platform 843 and legs can be the same width as the thickness T9 of the remainder of the spacer body 820, and can assist in some cases in setting the gap G8 between adjacent boards.

The first 841 and second 842 legs can project outward from the sides of the platform 843 and generally outward from the side surfaces 822 and 823 of the spacer block 820. The legs optionally can be in the form of spring legs, such that they compress and expand, based on forces exerted on the legs by pressing the plate 844 upward toward the grip element 830. The legs can be identical so only the first leg 841 will be described here. The first leg can include a first portion 841A and a second portion 841B, which are joined at a transition 841T. The second portion 841B can be joined at its lowermost portion with the plate 844. All these components optionally can be integral, along with the spacer block 820 and constructed from polymeric or other materials as described above. The first portion 841A and second portion 841B can be disposed at an angle A5 when the board engagement element 840 and the fastener unit 810 in general are in a neutral mode shown in FIG. 43. This angle A5 optionally can be between 0° and 90°, inclusive, between 0° and 60°, inclusive, between 30° and 90°, inclusive, between 30° and 60°, inclusive, between 25° and 45° inclusive, or about 45°. Of course, when the board engagement element 840 and the fastener unit 810 in general are converted from the neutral mode shown in FIG. 43 to the expanded mode shown in FIG. 45, the angle A5 can change to angle A6, which can be greater than the above angle A5.

The first and second leg portions 841A and 841B can flex toward and away from one another about the transition region 841T such that the platform 843, grip element 830 and spacer block 820 can move toward and away from the first plate 844, and vice versa, upon the application of a force as described below. Each of the legs 841 and 842 can be constructed so as to form spring or biasing leg. The biasing legs can urge the fastener unit and its components back to a neutral mode after the spacer block and grip element are pulled away from the plate 844 of the board engagement element 840. With the biasing legs 841 and 842, the fastener unit 810 can function to clamp a board between the grip element 830 and the plate 844, with the grip element in the groove 103 and the plate 844 engaging a lower surface of a board as described below.

Figure 44:
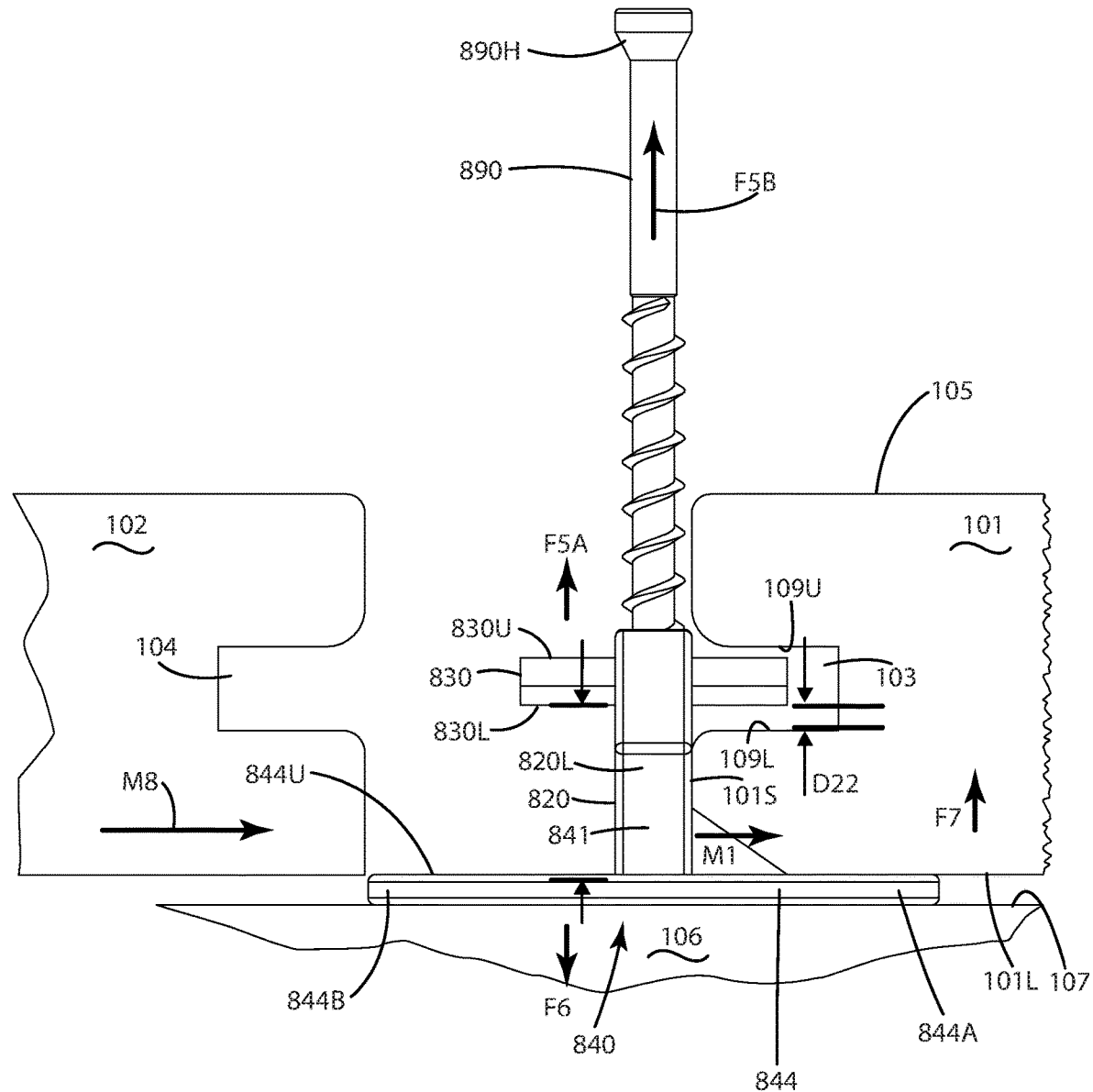
FIG. 44 is a side view of the eighth alternative embodiment of the fastener unit as it is slid for installation between a board and a joist in an expanded mode.
Figure 45:
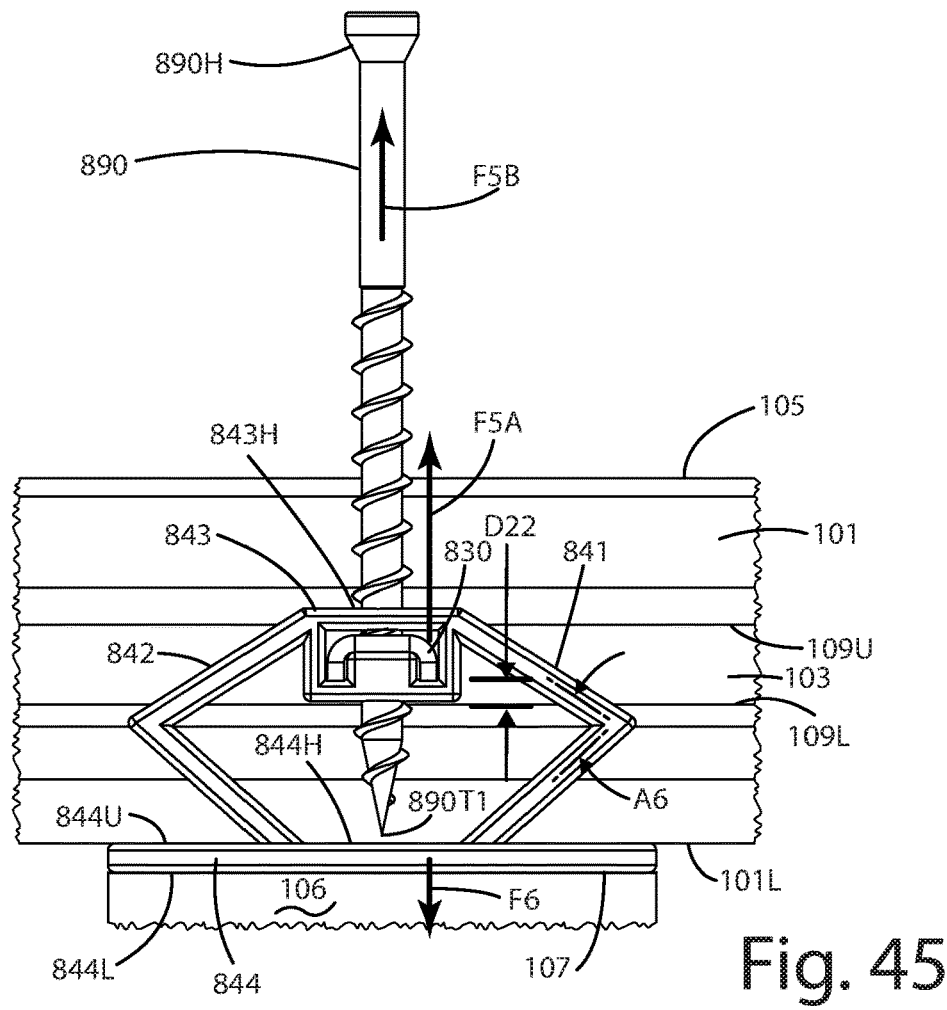
FIG. 45 is a front view of the eighth alternative embodiment of the fastener unit as it is about to transition from an expanded mode to a clamping mode.
Figure 46:
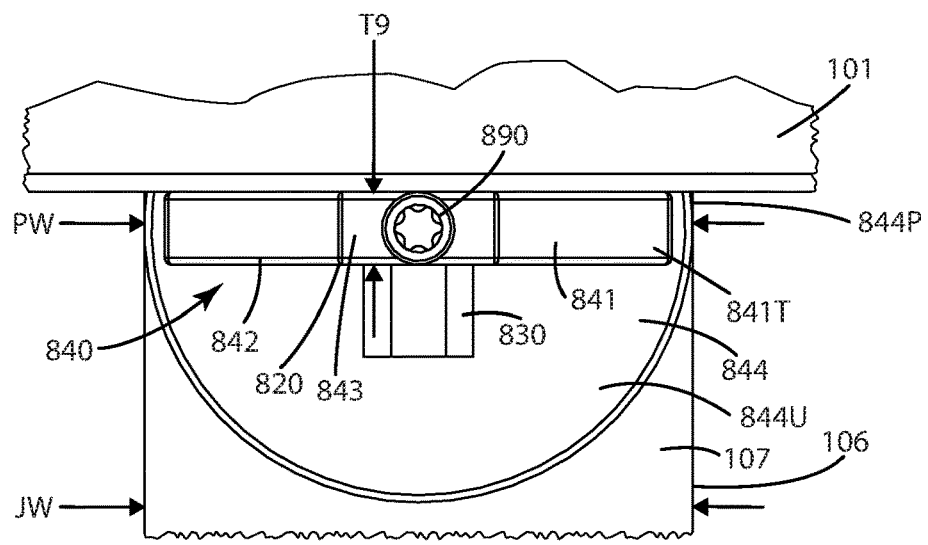
FIG. 46 is a top view thereof.

As shown in FIGS. 43-45, the plate 844 can include an upper surface 844U disposed opposite a lower surface 844L. The upper surface 844U and lower surface 844L can both be substantially planar, and can be configured to engage respective portions of the first board 101 and the joist 106. In particular, the upper surface 844U can be configured to engage the lower surface 101L of the first board 101 as well as a similar lower surface of the second board 102. The lower surface 844L can be configured to engage the upper surface 107 of the joist 106 underlying the board. The plate can include a plate width PW shown in FIG. 46, which extends from one side to the other. Where the plate 844 is of a circular shape shown again in FIG. 46, that plate width PW can correspond to a diameter of the plate. The plate width PW optionally can be the same width as the joist width JW. Thus, the plate 844 can underlie the respective boards fastened to the joist across the width JW of the joist to provide a more stable interface between the boards and the joist. Of course, in other cases, the plate width PW can be greater than or less than the joist width JW. Optionally, the transition portion 841T of the leg 841 can move relative to an outer perimeter 844P of the plate 844 when the board engagement element 840 is converted from a neutral mode (FIG. 43) to an expanded mode (FIG. 44) to a clamping mode (FIG. 47), or generally from one mode to the other. For example, that transition portion 841T can move toward or away from the perimeter 844P from the view shown in FIG. 46, such as when the plate 844 is pulled away from or moved toward the grip element 830.

A method of using the fastener unit 810 of the eighth alternative embodiment will now be described with reference to FIGS. 44-49. As shown in FIG. 44, a user can apply a force F5A to the grip element and/or a force F5B to the fastener 890, while applying an opposing force F6 to the board engagement element 840 or plate 844. This converts the fastener unit and board engagement element from a neutral mode to an expanded mode such that the distance D24 between the grip element 830 and the plate 844 is increased in transitioning from the neutral mode to the expanded mode. In the expanded mode, the legs 841 and 842 are converted such that the angle A5 between them in the neutral mode is increased to an angle A6 as shown in FIG. 45. The first and second leg portions 841A and 841B naturally tend to resist this conversion and the increase in the angle between those leg portions in the expanded mode while the opposing forces F6 and F5A or F5B are applied to the fastener unit.

While the fastener unit is in the expanded mode shown in FIGS. 44-45, the user can move the plate and fastener unit in direction M7 so that the plate 844 and its first portion 844A are inserted under the lower surface 101L of the board 101, and above the upper surface 107 of the joist 106. Board 101 also can be lifted with a force F7 such that it is distanced above the upper surface 107 of the joist 106 during the placement of the plate 844 between the lower surface 101L and the upper surface 107. Simultaneously, the grip element 830 can be inserted in the groove 103. The lower surface 830L of the grip element 830 can be above the groove lower wall 109L during the insertion of the grip element 830 in the groove 103. The fastener unit 810 can be installed until the spacer body 820 engages the side surface 101S of the board 101. Optionally, only the lower portion of the spacer body 820 engages that side surface 101S.

Figure 47:
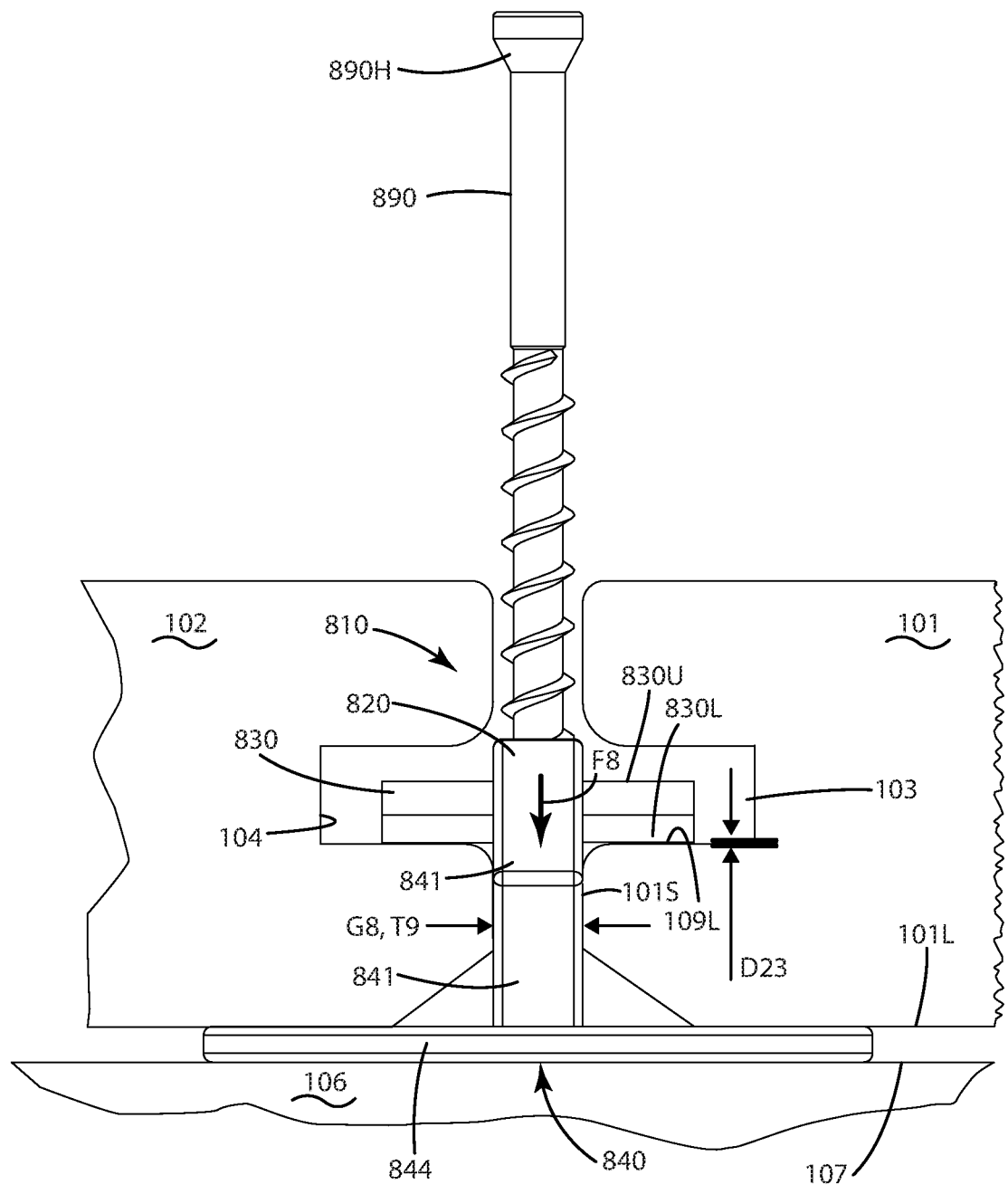
FIG. 47 is a side view thereof with the fastener unit transitioned to a clamping mode to clamp the board and hold the fastener unit between adjacent boards while setting a gap between those boards.
Figure 48:
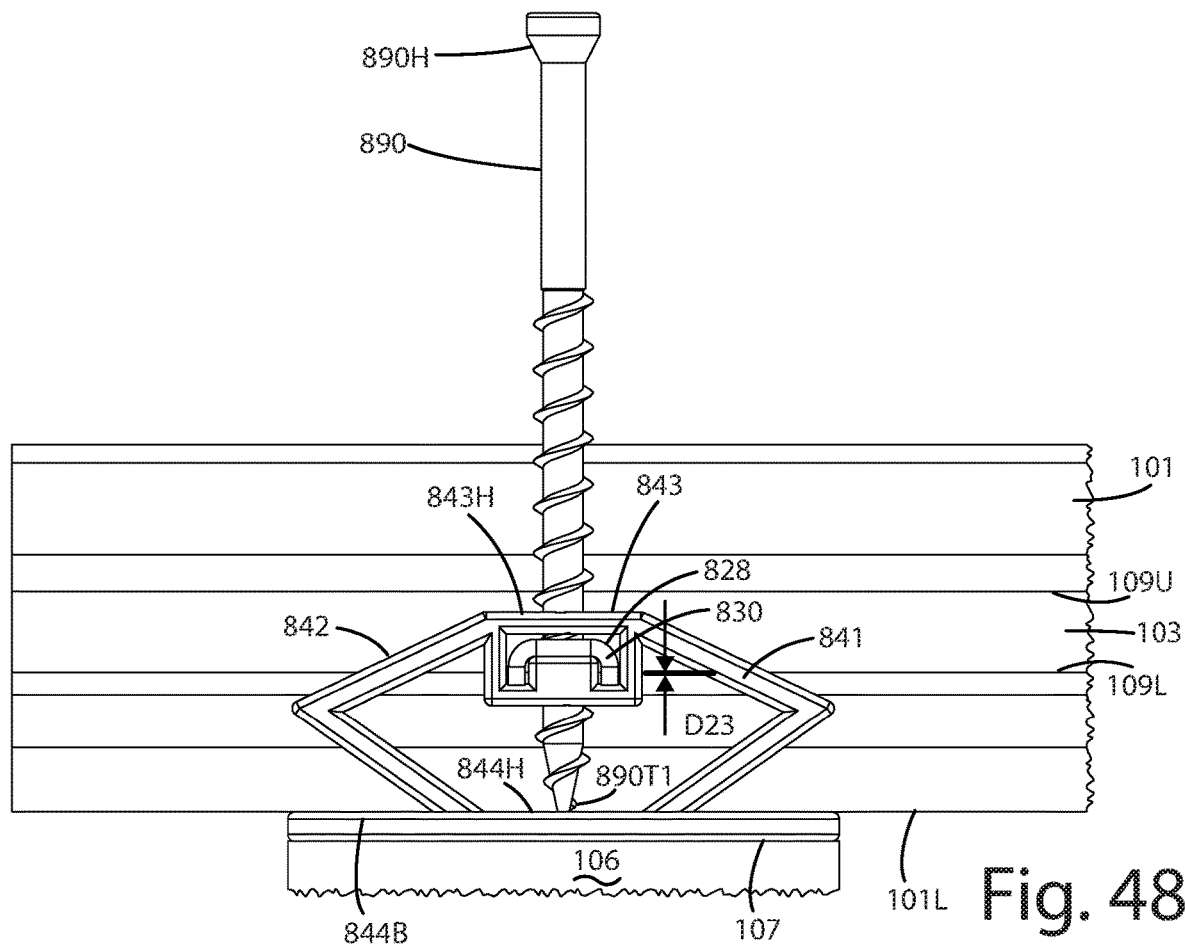
FIG. 48 is a front view thereof.
Figure 49:
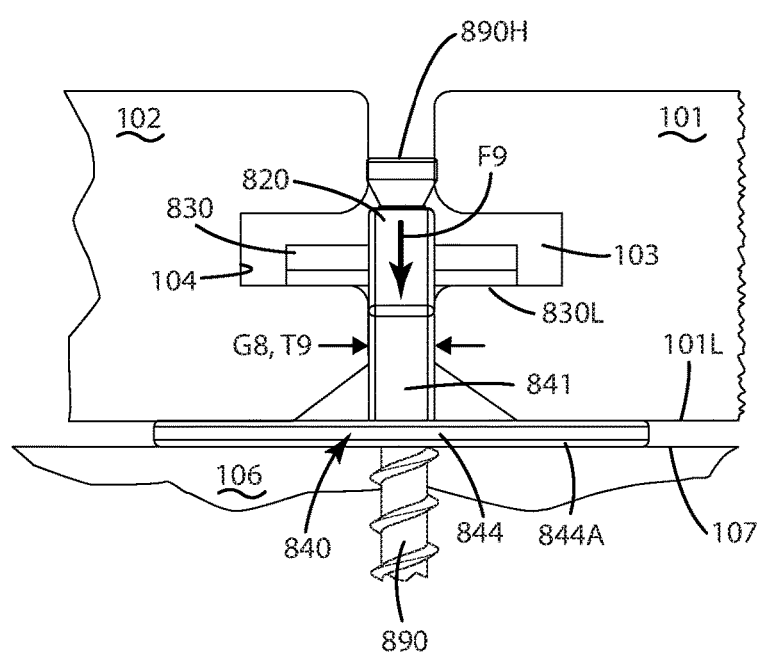
FIG. 49 is a side view thereof with a fastener installed in an underlying joist and the fastener unit holding down the adjacent boards relative to the joist.

After a user has installed a fastener relative to the first board 101, the user can move a second board 102 in direction M8 toward the fastener unit 810, so that the grip element 830 is inserted into the groove 104 and the board 102 slides on the upper surface 844U of the plate 844 until it engages the spacer block 820. With the fastener unit 810 installed relative to the first board 101 and/or second board 102 as shown in FIGS. 47-48, the user can cease supplying the forces F5A and/or F5B. As a result, the legs 841 and 842, with stored energy therein, will bias the grip element 830 downward toward the plate 844 via a force F8. As this occurs, the lower surface 830L of the grip element 830 transitions downward to engage the lower wall 109L of the groove 103. Likewise, where the grip element 830 is installed in the groove 104 of the second board 102, the lower surface 830L of the grip element 830 engages the lower wall of that groove.

Accordingly, the fastener unit 810 is converted from the expanded mode shown for example in FIG. 44, to the clamping mode, shown for example in FIGS. 47-48. In the clamping mode, the board engagement element and plate effectively clamp there between the portion of the board between the lower wall 109L of the groove and the lower surface 101L of the board. Equal and opposite forces can be exerted as a result of that force F8 in the legs, through the grip element and the plate. Accordingly, the fastener unit 810 is held in place between the first and second boards 101, 102, with the gap G8 between those boards set by the thickness T9 of the spacer body, which is held against the respective side surfaces of those boards. The distance D23 between the grip element 830 and the lower wall 109L of the groove 103 also is reduced to zero, as the grip lower surface 830L engages the bottom wall 109L of the groove. Of course, where the groove is not perfectly formed, there can be slight gaps or point contact between the grip element and that lower wall 109L.

With the fastener unit 810 installed in the clamping mode, a user can advance the fastener 890 so that it moves through the fastener hole 843H in the plate and optionally spins freely therein as it is advanced into the underlying joist 106. The fastener head 890H engages the spacer block 820 and the grip element 830, and the head pulls the grip element downward with a force F9 so that the grip element 830 clamps down the boards 101 and 102, pulling them, via the interfacing of the grip element in grooves thereof, downward. The plate 844 is thus further trapped between the lower surfaces of the boards and the upper surface of the joist. In some cases, the legs 841 and 842 can be compressed relative to the neutral mode shown in FIG. 43. With the fastener 890 fully installed, the first and second boards are clamped down to the joist 106. The above method and steps can be repeated for additional fastener units to further secure the boards to underlying joists.

A ninth alternative embodiment of the fastener unit is illustrated in FIGS. 50-55 and generally designated 910. The fastener unit of this embodiment is similar in structure, function and operation to the embodiments described above with several exceptions. For example, this unit 910 can include a fastener 990 similar to the fasteners 90, 190, 290, 390, 490, 590, 690, 790 and 890 above. It also can include a grip element 930 that is disposed in a recess 928 defined by a spacer block 920, similar to the embodiments described above. The grip element 930 optionally can extend from and beyond the forward 925 and rearward 926 surfaces of the spacer block 920. The spacer block can be configured to establish a gap between adjacent boards, and sized with a thickness T10, which can correspond to a preselected gap G8 (FIG. 55) that is to be established between adjacently placed first board 101 and second board 102, similar to the thicknesses T1-T9 above.

The board engagement element 940 can include first 941 and second 942 legs extending downward from the spacer block 920, below the grip element 930. The first and second legs can include feet 941F and 942F that can be configured to engage a lower surface 101L of the first board 101, while the grip element 930 engages the groove 103, to secure the spacer block 920 adjacent the first side surface 101S of the first board 101.

Figure 50:
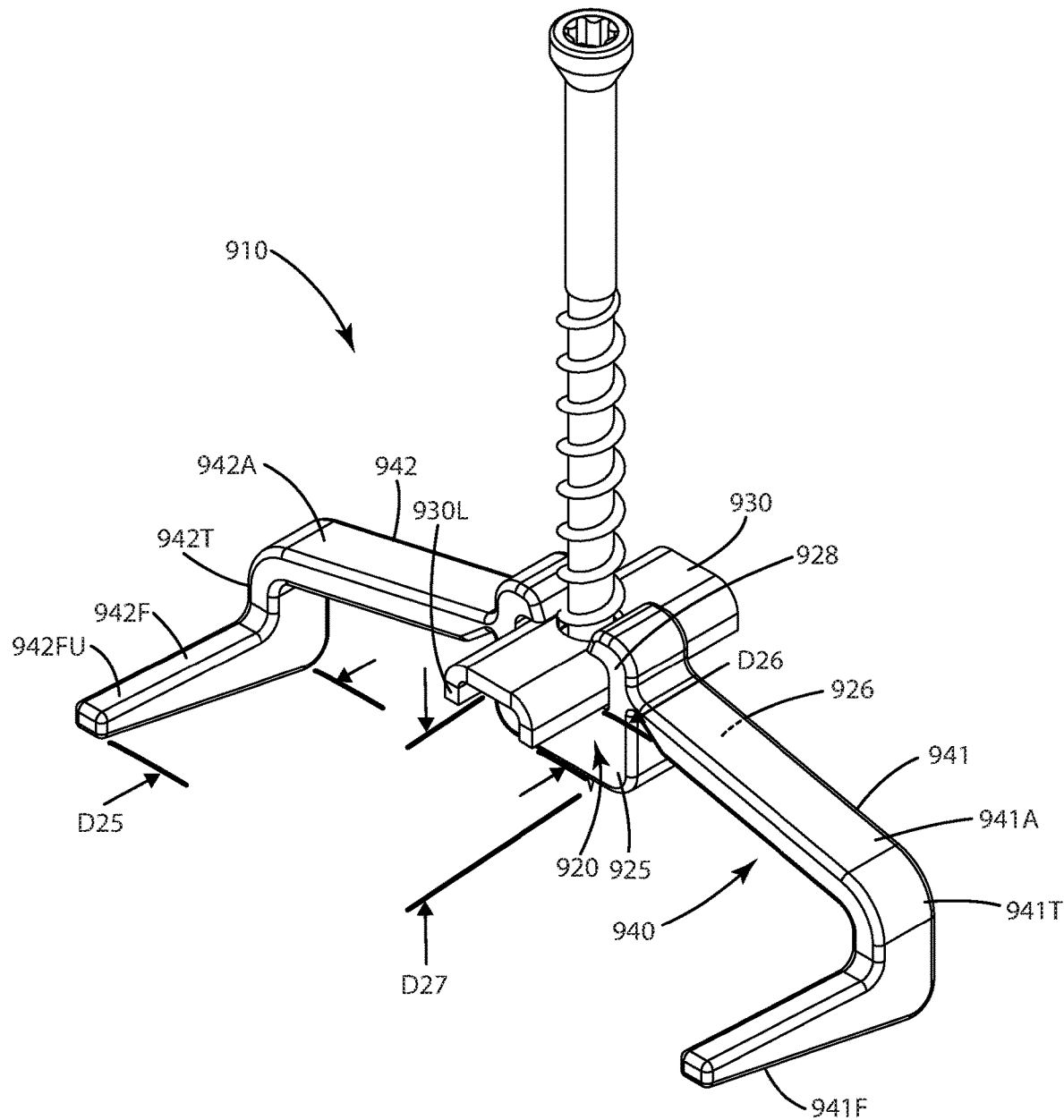
FIG. 50 is a perspective view of a ninth alternative embodiment of the fastener unit including lower engagement feet.

As shown in FIG. 50, the spacer block 920 can be configured to support the grip element 930. The spacer body and grip element can be identical to the others described in the other embodiment herein. The board engagement element 940 can include first 941 and second 942 legs. These legs can extend outward from the spacer body 920, optionally from the first and second sides, or some other surface of the spacer block on opposite sides of the grip element. The legs can be substantially identical so only one will be described here. For example, the leg 942 can include a first leg portion 942A that transitions at a transition 942T to a foot 942F. The foot extends forwardly from the leg portion 942A for a preselected distance D25. This distance D25 can be greater than the distance D26 by which the grip element 830 extends from the surface 925 of the spacer block 920. The upper surface 942FU of the foot 942F can be substantially planar. The upper surface 942FU of the foot can be spaced a distance D27 below the lower surface 930L of the grip element 930. This distance D27 optionally can be greater than a distance D28 (FIG. 51) between a lower wall 109L of a groove 103 and the lower surface 101L of a board 101. The foot 940 2F can be cantilevered away from the transition portion 942T of the leg 942.

Figure 51:
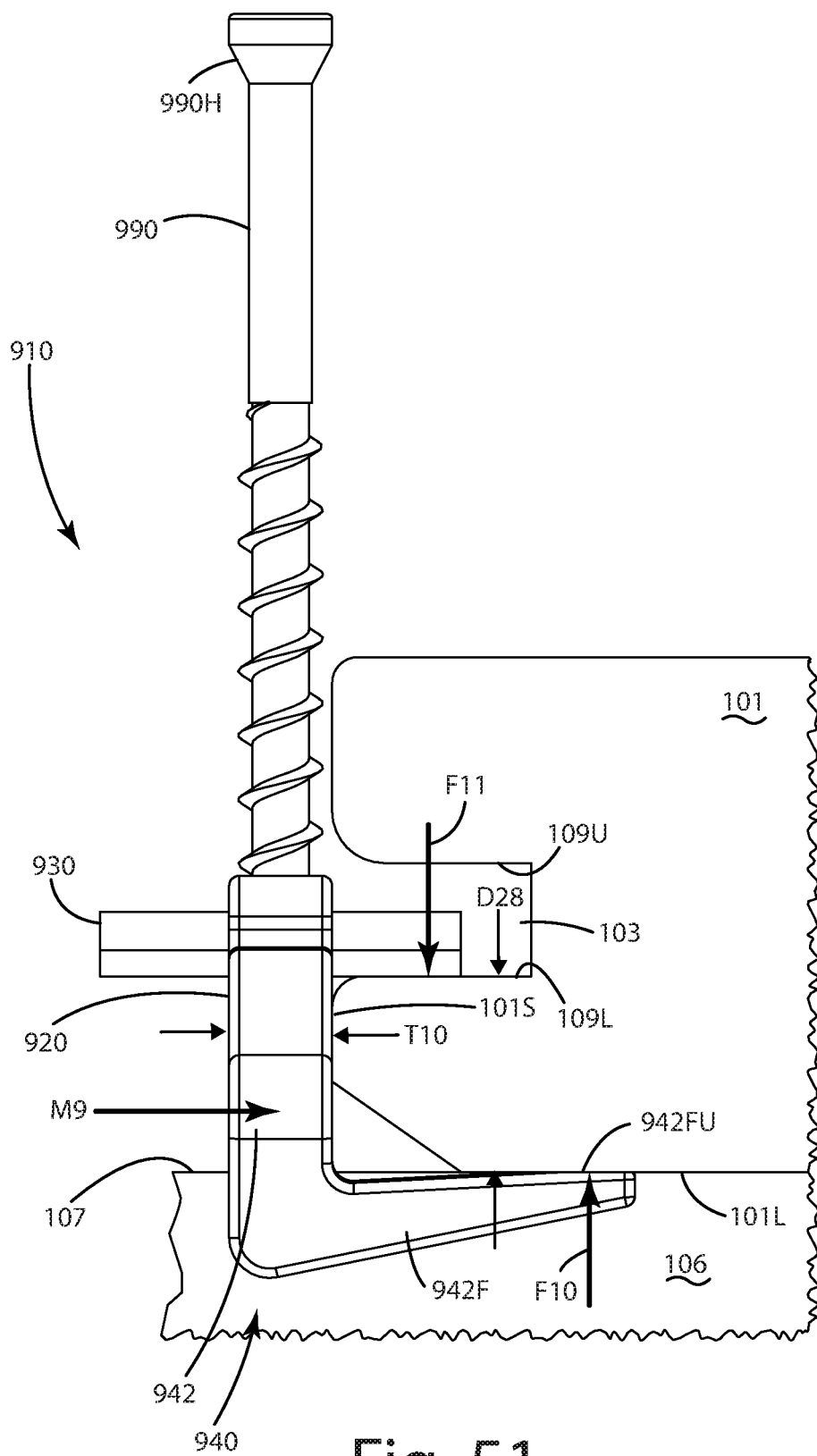
FIG. 51 is a side view of the ninth alternative embodiment of the fastener unit as it is slid for installation under a board adjacent a joist.
Figure 52:
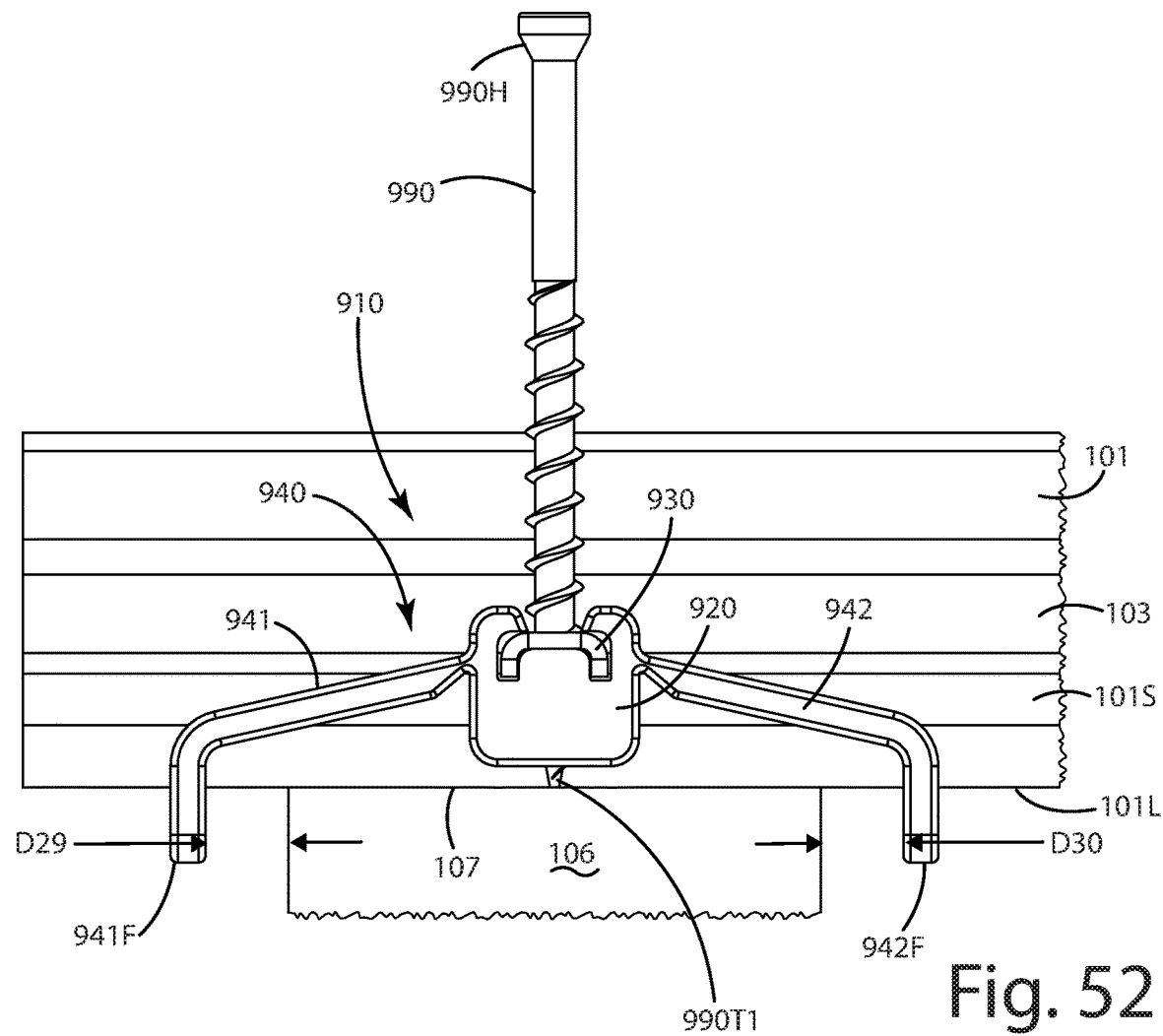
FIG. 52 is a front view of the ninth alternative embodiment of the fastener unit as installed under a board adjacent a joist, clamping the board between a gripping element and feet in a clamping mode.
Figure 53:
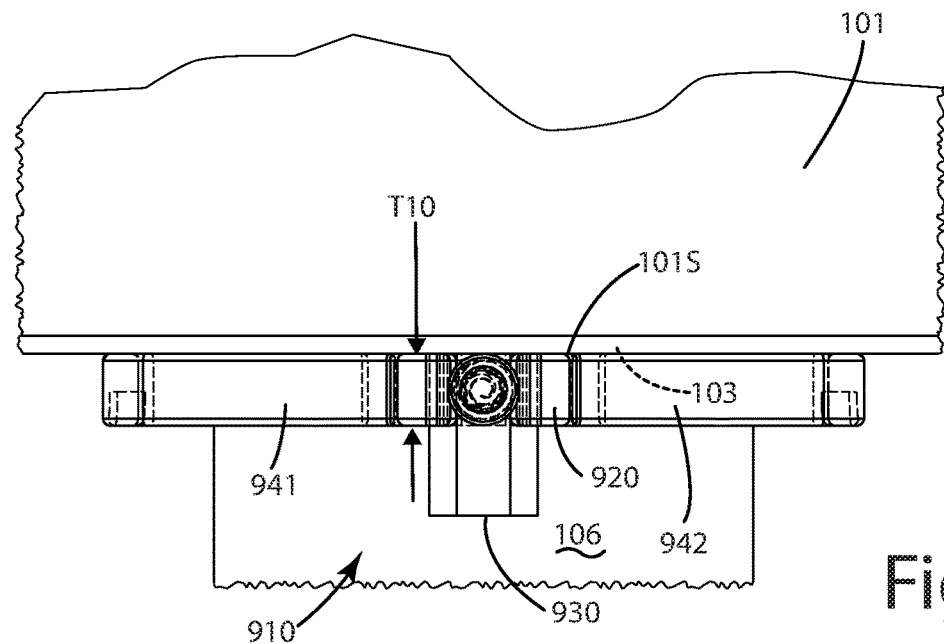
FIG. 53 is a top view thereof.
Figure 54:
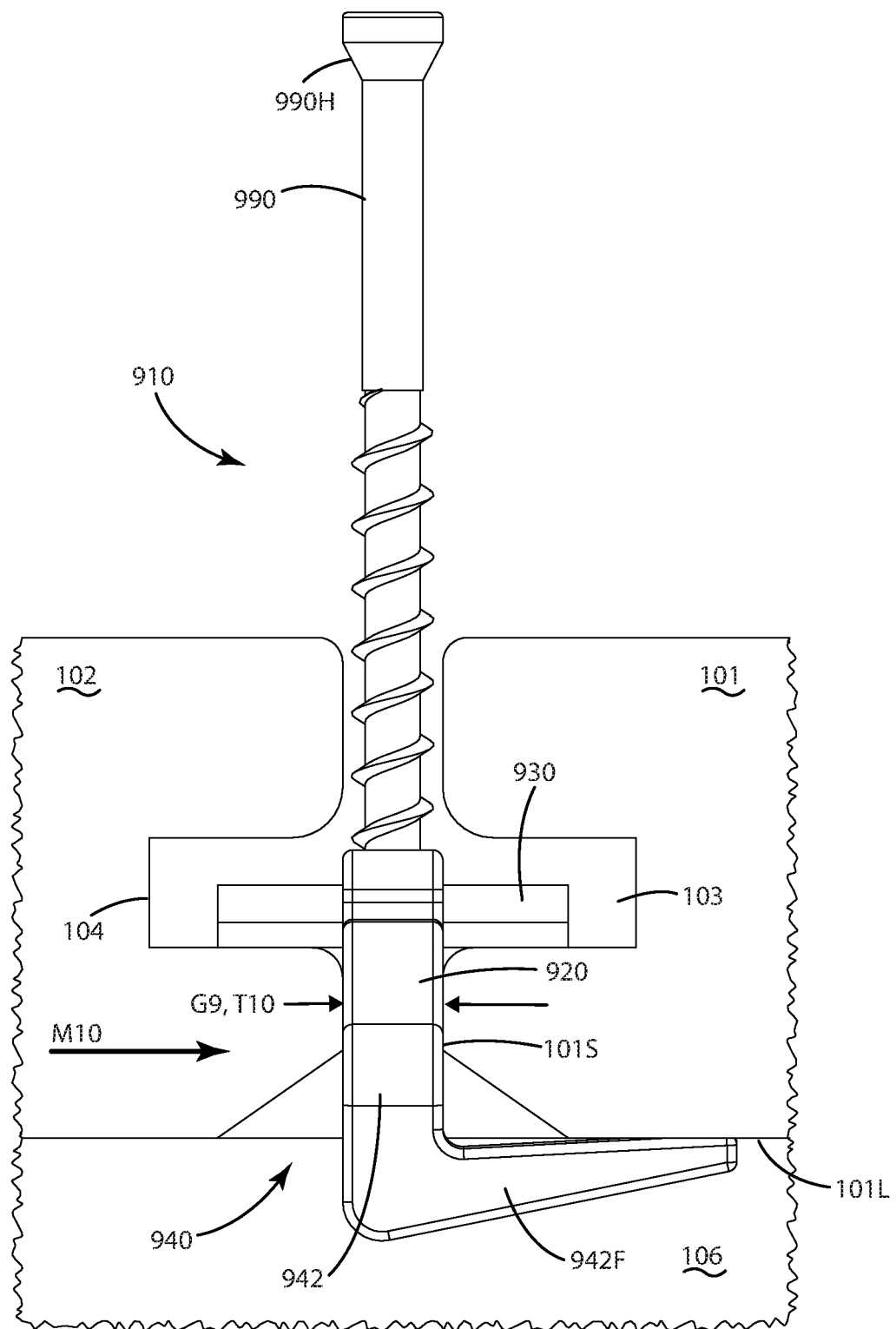
FIG. 54 is a side view of the ninth alternative embodiment of the fastener unit transitioned to a clamping mode to clamp the board and hold the fastener unit between adjacent boards while setting a gap between those boards.

A method of using the fastener unit 910 of the ninth alternative embodiment will now be described with reference to FIGS. 51-55. As shown in FIG. 51, a user can move the fastener unit 910 in direction M9 toward the side surface 101S of the first board 101. The spacer block 920 can engage the side surface 101S of the board. The grip element 930 can insert in the groove 103. The foot 942F can slide along the lower surface 101L of the board 101, with the upper surface 942FU exerting a force F10 against that lower surface 101L of the board. Simultaneously, the grip element 931 can exert a force F11 to the lower wall 109L of the groove 103. These opposing forces F10 and F11 can effectively clamp the portion of the board between the groove 103 and the lower surface 101L of the board there between, thereby securing the fastener unit 910 adjacent the side surface 101S of the board. As shown in FIG. 52, the feet 941F and 942F can be spaced a distance D29 and D30 away from the sides of joist 106 such that the legs 941 and 942, and their respective components, and other portions of the board engagement element 940, do not engage the joist 106 directly. Optionally, these legs and their components and the board engagement element do not engage the joist, but only the lower surface 101L of the board and optionally only the side surface 101S of the board 101.

Figure 55:
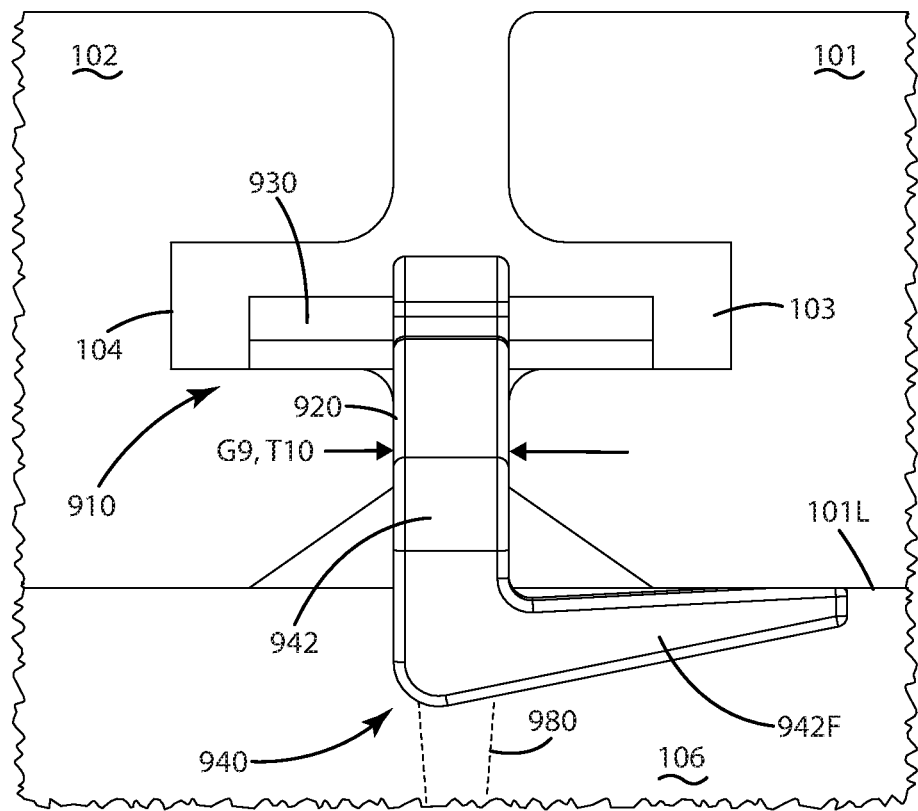
FIG. 55 is a side view of the ninth alternative embodiment of the fastener unit with a fastener installed in an underlying joist and the fastener unit holding down the adjacent boards relative to the joist.

With the fastener unit 910 in place adjacent the board, the user can move a second board 102 in direction M10 toward the first board 101 until the side surface of that board 102 engages the spacer block 920. The spacer block 920 sets the gap G9 between the first board 101 and the second board with its thickness T10. The grip element 930 is inserted into the groove 104 of the second board 102 during movement M10. With the second board placed adjacent the first board 101, the fastener 990 can be advanced, as shown in FIG. 55, into the underlying joist 106. As a result, the grip element 930 pulls downward with forces on the respective adjacent boards 101, 102 to thereby clamp those boards to the underlying joist 106. The above steps and method can be repeated with multiple fastener units 910 to install the boards relative to one or more joists.

The following additional statements are provided, the numbering of which is not to be construed as designating levels of importance.

Statement 1: A fastener unit adapted to secure at least one board to a support, the fastener unit comprising: a spacer block defining a first fastener hole having an upper portion having a first diameter and a lower portion, a threaded fastener disposed within the spacer block in the first fastener hole, the threaded fastener extending within the upper portion and the lower portion; a first joist leg and a second joist leg extending downward from the spacer block and configured to straddle and clamp a joist; and a grip element joined with the spacer block, the grip element defining a second fastener hole aligned with the first fastener hole, the grip element including a lower surface configured to engage a groove of a board.

Statement 2: The fastener unit of Statement 1, wherein the grip element includes a pressure foot separated a distance from the spacer block by a distance, wherein the distance is configured to inset the pressure foot inward from a side surface of the board, beyond a slanted wall disposed under the groove, whereby a predetermined force can be distributed through the pressure foot to a bottom surface of the board without tipping the board.

Statement 3: The fastener unit of Statement 1 or 2, wherein a first stabilizer bar extends from the first joist leg a predetermined distance, wherein a second stabilizer bar extends from the second joist leg the predetermined distance, wherein the first and second stabilizer bars are disposed at a common level, below the spacer block.

Statement 3: The fastener unit of any one of the preceding Statements, wherein each of the first and second joist legs each include outwardly extending portions that extend away from the spacer block, wherein the first and second stabilizer bars are joined with the respective outwardly extending portions.

Statement 4: The fastener unit of any one of the preceding statements, wherein the first stabilizer bar extends from a rear surface of the first joist leg, wherein the first stabilizer bar is generally parallel to the grip element extending from the rear surface of the spacer block, wherein the first stabilizer bar extends a distance that is equal to the distance by which the grip element extends away from the rear surface of the spacer block.

Statement 5: The fastener unit of any of the preceding Statements, wherein the spacer block extends downward below the grip element a preselected distance such that when a predetermined force is applied through the at least one pressure foot of the grip element, a lower surface of the spacer block is configured to engage an upper surface of a joist disposed below the spacer block.

Statement 6: The fastener unit of any of the preceding Statements, wherein the grip element includes a first end and a second end, wherein the first end projects forward of a front surface of the spacer block, wherein the second end projects rearward of a rear surface of the spacer block, wherein the grip element is a C-shaped channel, wherein the C-shaped channel includes first and second cleats at the first end, wherein the first and second cleats form downwardly extending first and second pressure feet at the first end, wherein the first and second pressure feet form a lower surface of the grip element, wherein the grip element includes a recessed surface that is disposed above the lower surface between the first and second pressure feet and the spacer block.

Statement 7: The fastener unit of any of the preceding Statements, wherein the first joist leg and the second joist leg each include a lower engagement portion disposed below and an outwardly extending portion, wherein the first stabilizer bar is joined with the first joist leg between the respective lower engagement portion and the outwardly extending portion, wherein the second stabilizer bar is joined with the second leg between the respective lower engagement portion and the outwardly extending portion.

Statement 8: A method of using a fastener unit comprising: providing a fastener unit including a fastener, a spacer block defining a first fastener hole therethrough, a longitudinal axis, a grip element joined with the spacer block and projecting outward from the spacer block, with the fastener projecting through at least a portion of the grip element, a first resilient joist leg extending laterally from the spacer block, and a second resilient leg extending laterally from the spacer block, placing the fastener unit over a joist so that the first and second resilient legs move away from one another and downward relative to a first and a second sidewall of the joist; inserting the grip element into a first groove of a first board; and advancing the fastener through the first fastener hole of the spacer block and through the at least a portion of the grip element, wherein a head of the fastener forces the grip element into engagement with the first groove, thereby moving the first board toward the joist.

Statement 9: The fastener unit of Statement 8, wherein the spacer block includes a lower surface, wherein the lower surface engages an upper surface of the joist during the advancing.

Statement 10: The fastener unit of any of the preceding Statements, wherein the board includes a side surface below the groove, wherein the side surface transitions to a slanted wall that extends toward a plane in which a rear wall of the groove is disposed, wherein the board includes a bottom surface having a pressure region, wherein the grip element includes at least one pressure foot at an outward end of the grip element, distal from the spacer block, wherein the at least one pressure foot exerts a downward force that is transferred to the pressure region to push the pressure region against an upper surface of the joist, but so as not to tilt the board by pushing downward directly toward the slanted wall.

Statement 11: The fastener unit of any of the preceding Statements, wherein the spacer block is a timing spacer block that engages an upper surface of the joist during the advancing step, wherein the spacer block is compressed between the grip element and the joist, wherein the spacer block is of a predetermined thickness to thereby limit the amount of force exerted by the grip element against the groove.

Statement 12: The fastener unit of any of the preceding Statements, wherein the first joist leg includes a rear surface including a first stabilizer bar disposed below the spacer block, wherein the second joist leg includes a rear surface including a second stabilizer bar disposed below the spacer block, wherein the first and second stabilizer bars are each placed below a bottom surface of the board before the advancing step to stabilize the fastener unit relative to the board.

Statement 13: A fastener unit adapted to secure at least one board to a support, the fastener unit comprising: a spacer block defining configured to at least partially receive a fastener, the spacer block having a thickness corresponding to a preselected gap between a first board and a second adjacent board, the spacer block defining a recess; a grip element disposed in the recess and projecting beyond the thickness of the spacer block, the grip element configured to at least partially receive the fastener, the grip element configured to engage a first groove defined by the first board, the grip element having at least one downwardly facing projection, the grip element having a grip upper surface; and a board engagement element configured to engage a portion of the first board, distal from the first groove, to secure the spacer block adjacent a first side surface of the first board before a fastener is advanced relative to the spacer block and the grip element.

Statement 14: The fastener unit of Statement 13 wherein the board engagement element includes a first platform and a downwardly extending resilient arm, wherein the first platform defines a third fastener hole aligned with a first fastener hole of the spacer block and a second fastener hole of the grip element, wherein a fastener extends through the first second and third fastener holes.

Statement 15: The fastener unit of any of the preceding Statements, wherein the first platform includes a front surface and a rear surface, wherein the resilient arm extends downwardly in a cantilevered manner from the front surface, wherein the grip element extends from a front surface of the spacer block and a rear surface of the spacer block.

Statement 16: The fastener unit of any of the preceding Statements, wherein the board engagement element includes a first leg and a second leg extending vertically downward from the first platform distal from the resilient arm, wherein a fastener extends through a portion of the first platform, the grip element and the spacer block, wherein the first leg and second leg are each closer to a respective first side surface and second side surface of the spacer block.

Statement 17: The fastener unit of any of the preceding Statements, wherein the grip element includes a grip element upper surface, wherein the resilient arm includes a lower edge, wherein the grip element upper surface is spaced from the lower edge by a distance that is less than a thickness of the first board between an upper surface of the first groove and an upper surface of the board.

Statement 18: The fastener unit of any of the preceding Statements, wherein the spacer block includes a lower portion defining a void, wherein a fastener extends through the board engagement element and the grip element, wherein the fastener includes a tip that is disposed in the void.

Statement 19: The fastener unit of any of the preceding Statements, wherein at least one of the first leg and the second leg is configured to break off from the spacer block when a head of a fastener is advanced against the first platform.

Statement 20: The fastener unit of any of the preceding Statements, wherein the board engagement element is configured to become dissociated from, snap, break or otherwise separate from the spacer block and fall away from the fastener when the fastener is advanced through the grip element.

Statement 21: The fastener unit of any of the preceding Statements, wherein the dissociated board engagement element is constructed from a biodegradable material so that it biodegrades in the environment.

Statement 22: A method of using the fastener unit of any of the preceding Statements, comprising bending the resilient arm away from the grip element upper surface and pushing the spacer block toward a first side surface of the first board so that a portion of the board between an upper surface or a lower surface, and the first groove is trapped between the resilient arm and the grip element.

Statement 23: A method of using the fastener unit of any of the preceding Statements, comprising rotating the fastener which is a screw so that a head of the screw engages the board engagement element and pushes the board engagement element toward the grip element until the board engagement element fails and at least partially dissociates from the spacer block, moving away from the grip element in one or more pieces.

Statement 24: A method of using the fastener unit of any of the preceding Statements comprising sliding a first leg and a second leg of the board engagement element downward, adjacent the spacer block such that the first and second leg each frictionally engage the spacer block and fix a distance between an arm of the board engagement element and the upper surface of the grip element, wherein a portion of the board between the groove and upper surface or lower surface of the board is clamped between the upper surface of the grip element and the arm in a clamped mode.

Statement 25: A method of using the fastener unit of any of the preceding Statements comprising rotating the board engagement element about threads of a fastener disposed through the first fastener hole and the second fastener hole to move the board engagement element toward the grip element, thereby clamping a portion of the board there between in a clamped mode.

Statement 26: A fastener unit of any of the preceding Statements, wherein the board engagement element includes a barrel and a first platform, wherein the barrel is configured to threadably engage threads of the fastener in advance toward the upper surface of the grip element when the platform is rotated about the fastener.

Statement 27: A fastener unit of any of the preceding Statements, wherein the board engagement element includes a plate configured to extend adjacent a lower surface of the first board, wherein the plate is joined with a first platform disposed above the grip element and joined with the spacer block via a first leg and a second leg.

Statement 28: A fastener unit of any of the preceding Statements, wherein the first leg and the second leg each include first and second leg portions joined at a transition region, wherein the first and second leg portions can flex toward and away from one another about the transition region such that the platform can move toward and away from the first plate.

Statement 29: A fastener unit of any of the preceding Statements, wherein the first leg portion is angled relative to the second leg portion at the transition region at an angle between 15° and 90°.

Statement 30: A fastener unit of any of the preceding Statements, wherein the spacer block defines a first fastener hole, the grip element defines a second fastener hole and the first platform defines a third fastener hole, wherein the first fastener hole is smaller than a shaft of a fastener such that the perimeter of the first fastener hole engages and holds the shaft of the first fastener, wherein the second and third fastener holes are larger than the shaft of the fastener such that the fastener can rotate freely through or in the second fastener hole and third fastener hole.

Statement 31: A method of using a fastener unit comprising: providing a fastener unit including a fastener, a spacer block defining a first fastener hole therethrough, a grip element joined with the spacer block and projecting outward from the spacer block, with the fastener projecting through at least a portion of the grip element, and a board engagement element spaced distal from the spacer block, the fastener unit operable in a clamping mode; engaging the board engagement element against at least one of an upper surface of a first board and a lower surface of the first board, the upper surface and the lower surface each being distal from a first groove of the first board; and engaging the fastener unit in the clamping mode so that the board engagement element engages the at least one of the upper surface of a first board and the lower surface of the first board while the grip element engages the first groove, wherein in the clamping mode, a portion of the board between first groove and at least one of the upper surface and the lower surface is clamped between the board engagement element and the grip element, thereby holding the spacer block adjacent a first side surface of the first board adjacent the first groove.

Statement 32: The method of Statement 31 comprising: pushing the a resilient arm of the board engagement element over the upper surface of the first board, wherein the resilient arm bends away from the grip element as the portion of the board enters a space between the grip element and the resilient arm.

Statement 33. A fastener unit adapted to secure at least one board to a support, the fastener unit comprising: a spacer block defining a first fastener hole configured to receive a fastener therein, the spacer block including a front surface, an opposing rear surface, a first side surface and a second side surface opposite the first side surface, the spacer block having a thickness extending from the front surface to the rear surface, the thickness corresponding to a preselected gap between a first board and a second adjacent board, the spacer block defining a recess from the front surface to the rear surface; a grip element joined with the spacer block, the grip element disposed in the recess, the grip element defining a second fastener hole aligned with the first fastener hole of the spacer block, the grip element configured to fit in and engage a first groove defined by the first board, the grip element having at least one downwardly facing projection, the grip element having a grip upper surface; and a board engagement element configured to engage a portion of the first board, distal from the first groove, to secure the spacer block adjacent a first side surface of the first board.

Statement 34: The fastener unit of Statement 33, wherein the board engagement element is operable in a clamping mode in which the board engagement element engages an upper surface of the first board, distal from the groove, while the grip upper surface engages a groove upper wall so as to secure the fastener unit adjacent the first side surface of the board.

Statement 34: The fastener unit of Statement 33, wherein the board engagement element is operable in a clamping mode in which the board engagement element engages a lower surface of the first board, distal from the groove, while the downwardly facing projection engages a groove lower wall so as to secure the fastener unit adjacent the first side surface of the board.

Statement 35: The fastener unit of Statement 33, wherein the board engagement element is joined with the spacer block such that the board engagement element can be selectively disassociated from the spacer block.

Statement 36: The fastener unit of Statement 33, wherein the second fastener hole is larger than the first fastener hole, wherein a fastener is disposed through the first fastener hole and the second fastener hole, wherein the fastener is configured to engage a first perimeter of the first fastener hole as the fastener rotates, wherein the fastener is configured to freely rotate in the second fastener hole without engaging a second perimeter of the second fastener hole.

Statement 37: The fastener unit of Statement 33, wherein the board engagement element is joined with the spacer block via a first leg extending downward from a first platform, the first platform spaced a first distance above the spacer block, the first platform at least partially surrounding a fastener that extends through the second fastener hole of the grip element.

Statement 38: The fastener unit of any preceding Statement, wherein the first leg extends below the grip element, wherein the first leg is joined with the board engagement element, wherein the board engagement element is a plate disposed below the spacer block, wherein the plate is configured to engage the portion of the board, which is a lower surface of the board, while the grip element engages the groove, to secure the spacer block adjacent the first side surface of the first board.

Statement 39: The fastener unit of Statement 38, wherein the first leg includes a first end joined with the first platform, and a second end joined with the plate, wherein the first leg is configured to bias the grip element toward the plate when the plate is pulled away from the first platform, wherein the board engagement element is operable in the clamped mode.

Statement 40: The fastener unit of Statement 33, wherein the board engagement element includes a first platform, wherein a first leg and a second leg extend downwardly from the first platform, wherein the first leg and the second leg each extend adjacent the spacer block and are each configured to hold the first platform at a preselected distance from the grip element.

Statement 41: The fastener unit of any preceding Statement, wherein the spacer block defines a first leg track adjacent the first side surface of the spacer block and a second leg track adjacent the second side surface of the spacer block, wherein the first leg frictionally engages the first leg track to hold the first platform at the preselected distance from the grip element, wherein the second leg frictionally engages the second leg track to hold the first platform at the preselected distance from the grip element, wherein the first and second legs are movable relative to the first and second track respectively to adjust the preselected distance, and thereby operate the board engagement element in a clamping mode in which the portion of the first board is clamped between the first platform and the grip element.

Statement 42: The fastener unit of any preceding Statement, wherein the first leg and the second leg are each joined with an upper portion of the spacer block at a fracturable joint, wherein the board engagement element includes a resilient arm projecting away from the first platform and downward, wherein the portion of the first board is an upper surface of the board, wherein the resilient arm is configured to engage the upper surface and exert a clamping force on the board in cooperation with the grip element.

Statement 43: The fastener unit of Statement 33, comprising: a fastener extending through the first fastener hole and the second fastener hole, the fastener including a plurality of threads on a shaft, wherein the board engagement element includes a first platform and is rotatably threaded on the plurality of threads, wherein the board engagement element is operable in a clamping mode in which the first platform is rotatable about the shaft toward the grip element to thereby clamp the portion of the first board between the first platform and the grip element.

Statement 44: The fastener unit of Statement 33, comprising: a second board engagement element, distal from the board engagement element; and a fastener extending through the first fastener hole and the second fastener hole, wherein the board engagement element includes a first leg that extends downward from the spacer block to a first leg end, wherein a first foot extends from the first leg end and generally parallel to the grip element, wherein the portion of the first board is a lower surface of the board distal from the groove, wherein the first foot is configured to engage the lower surface of the board while the grip element engages the groove so the first foot and grip element cooperation to urge the spacer block and the fastener toward the first side surface of the first board, thereby securing the spacer block adjacent the first side surface of the first board.

Statement 45: A method of using a fastener unit comprising: providing a fastener unit including a fastener, a spacer block defining a first fastener hole therethrough, a grip element joined with the spacer block and projecting outward from the spacer block, with the fastener projecting through at least a portion of the grip element, and a board engagement element spaced distal from the spacer block, the fastener unit operable in a clamping mode; engaging the board engagement element against at least one of an upper surface of a first board and a lower surface of the first board, the upper surface and the lower surface each being distal from a first groove of the first board; and engaging the fastener unit in the clamping mode so that the board engagement element engages the at least one of the upper surface of a first board and the lower surface of the first board while the grip element engages the first groove, wherein in the clamping mode, a portion of the board between first groove and at least one of the upper surface and the lower surface is clamped between the board engagement element and the grip element, thereby holding the spacer block adjacent a first side surface of the first board adjacent the first groove.

Statement 46: The method of Statement 45 comprising: pushing the a resilient arm of the board engagement element over the upper surface of the first board, wherein the resilient arm bends away from the grip element as the portion of the board enters a space between the grip element and the resilient arm.

Statement 47: The method of Statement 45 comprising: pulling the board engagement element away from the grip element so the board engagement element achieves an expanded mode, inserting the grip element into the first groove while the first board element is in the expanded mode; converting the board engagement element to the clamping mode so that the portion of the board between first groove and the lower surface is clamped between the board engagement element and the grip element, thereby holding the spacer block adjacent the first side surface of the first board adjacent the first groove.

Statement 48: The method of Statement 45 comprising: advancing the fastener until a head of the fastener engages the grip element to pull the grip element into engagement with the first groove, wherein during the advancing, the board engagement element disassociates from the spacer block in at least one piece that comes to rest in an environment adjacent the first board, distal from the spacer block.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientations.

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A fastener unit adapted to secure at least one board to a support, the fastener unit comprising:
   a spacer block defining a first fastener hole configured to receive a fastener therein, the spacer block including a front surface, an opposing rear surface, a first side surface and a second side surface opposite the first side surface, the spacer block having a thickness extending from the front surface to the rear surface, the thickness corresponding to a preselected gap between a first board and a second adjacent board, the spacer block defining a recess from the front surface to the rear surface;
   a grip element joined with the spacer block, the grip element disposed in the recess, the grip element defining a second fastener hole aligned with the first fastener hole of the spacer block and configured to receive the fastener, the grip element configured to fit in and engage a first groove defined by the first board, the grip element having at least one downwardly facing projection, the grip element having a grip upper surface; and
   a board engagement element including a first platform and an arm extending therefrom configured to engage a portion of the first board, distal from the first groove, the first platform being disposed a first distance above the spacer block and at least partially surrounding the fastener,
   wherein the fastener unit is operable in a clamping mode in which the arm resiliently engages an upper surface of the first board, distal from the first groove, while the grip upper surface engages a groove wall such that the first platform and the arm cooperate with the grip element to secure the fastener unit adjacent a first side surface of the board.

2. The fastener unit of claim 1,
   wherein the arm includes a lower edge that is configured to directly engage the upper surface of the first board,
   wherein the grip upper surface engages an upper groove wall in the clamping mode.

3. The fastener unit of claim 1,
   wherein the first platform is configured to directly engage the upper surface of the first board.

4. A fastener unit adapted to secure at least one board to a support, the fastener unit comprising:
   a spacer block defining a first fastener hole configured to receive a fastener therein, the spacer block including a front surface, an opposing rear surface, a first side surface and a second side surface opposite the first side surface, the spacer block having a thickness extending from the front surface to the rear surface, the thickness corresponding to a preselected gap between a first board and a second adjacent board, the spacer block defining a recess from the front surface to the rear surface;
   a grip element joined with the spacer block, the grip element disposed in the recess, the grip element defining a second fastener hole aligned with the first fastener hole of the spacer block and configured to receive the fastener, the grip element configured to fit in and engage a first groove defined by the first board, the grip element having at least one downwardly facing projection, the grip element having a grip upper surface; and
   a board engagement element including a first platform and an arm extending therefrom configured to engage an upper surface of the first board, distal from the first groove, the first platform being disposed a first distance above the spacer block and at least partially surrounding the fastener, such that the first platform and the arm cooperate with the grip element to secure the spacer block adjacent a first side surface of the first board before a second board is placed adjacent the first board,
   wherein the board engagement element is joined with the spacer block such that the board engagement element can be disassociated from the spacer block when a fastener head of the fastener engages the board engagement element.

5. A fastener unit adapted to secure at least one board to a support, the fastener unit comprising:
- a spacer block defining a first fastener hole configured to receive a fastener therein, the spacer block including a front surface, an opposing rear surface, a first side surface and a second side surface opposite the first side surface, the spacer block having a thickness extending from the front surface to the rear surface, the thickness corresponding to a preselected gap between a first board and a second adjacent board, the spacer block defining a recess from the front surface to the rear surface;
- a grip element joined with the spacer block, the grip element disposed in the recess, the grip element defining a second fastener hole aligned with and below the first fastener hole of the spacer block and configured to receive the fastener, the grip element configured to fit in and engage a first groove defined by the first board, the grip element having at least one downwardly facing projection, the grip element having a grip upper surface; and
- a board engagement element including a first platform and an arm extending therefrom configured to engage an upper surface of the first board, distal from the first groove, the first platform being disposed a first distance above the spacer block and at least partially surrounding the fastener, such that the first platform and the arm cooperate with the grip element to secure the spacer block adjacent a first side surface of the first board before a second board is placed adjacent the first board,
- wherein the second fastener hole is larger than the first fastener hole,
- wherein a fastener is disposed through the first fastener hole and the second fastener hole,
- wherein the fastener is configured to engage a first perimeter of the first fastener hole as the fastener rotates,
- wherein the fastener is configured to freely rotate in the second fastener hole without engaging a second perimeter of the second fastener hole.

6. A fastener unit adapted to secure at least one board to a support, the fastener unit comprising:
- a spacer block defining a first fastener hole configured to receive a fastener therein, the spacer block including a front surface, an opposing rear surface, a first side surface and a second side surface opposite the first side surface, the spacer block having a thickness extending from the front surface to the rear surface, the thickness corresponding to a preselected gap between a first board and a second adjacent board, the spacer block defining a recess from the front surface to the rear surface;
- a grip element joined with the spacer block, the grip element disposed in the recess, the grip element defining a second fastener hole aligned with the first fastener hole of the spacer block and configured to receive the fastener, the grip element configured to fit in and engage a first groove defined by the first board, the grip element having at least one downwardly facing projection, the grip element having a grip upper surface; and
- a board engagement element including a first platform and an arm extending therefrom configured to engage an upper surface of the first board, distal from the first groove, such that the first platform and the arm cooperate with the grip element to secure the spacer block adjacent a first side surface of the first board,
- wherein the board engagement element is joined with the spacer block via a first leg extending downward from the first platform, the first platform spaced a first distance above the spacer block, the first platform at least partially surrounding the fastener that extends through the second fastener hole of the grip element.

7. A fastener unit adapted to secure at least one board to a support, the fastener unit comprising:
- a spacer block defining a first fastener hole configured to receive a fastener therein, the spacer block including a front surface, an opposing rear surface, a first side surface and a second side surface opposite the first side surface, the spacer block having a thickness extending from the front surface to the rear surface, the thickness corresponding to a preselected gap between a first board and a second adjacent board, the spacer block defining a recess from the front surface to the rear surface;
- a grip element joined with the spacer block, the grip element disposed in the recess, the grip element defining a second fastener hole aligned with the first fastener hole of the spacer block and configured to receive the fastener, the grip element configured to fit in and engage a first groove defined by the first board, the grip element having at least one downwardly facing projection, the grip element having a grip upper surface; and
- a board engagement element including a first platform and an arm extending therefrom configured to engage an upper surface of the first board, distal from the first groove, the first platform being disposed a first distance above the spacer block and at least partially surrounding the fastener, such that the first platform and the arm cooperate with the grip element to secure the spacer block adjacent a first side surface of the first board,
- wherein a first leg and a second leg extend downwardly from the first platform,
- wherein the first leg and the second leg each extend adjacent the spacer block and are each configured to hold the first platform at a preselected distance from the grip element.

8. The fastener unit of claim 7,
- wherein the spacer block defines a first leg track adjacent the first side surface of the spacer block and a second leg track adjacent the second side surface of the spacer block,
- wherein the first leg frictionally engages the first leg track to hold the first platform at the preselected distance from the grip element,
- wherein the second leg frictionally engages the second leg track to hold the first platform at the preselected distance from the grip element,
- wherein the first and second legs are movable relative to the first and second track respectively to adjust the preselected distance, and thereby operate the board engagement element in a clamping mode in which the portion of the first board is clamped between the first platform and the grip element.

9. The fastener unit of claim 7,
- wherein the first leg and the second leg are each joined with an upper portion of the spacer block at a fracturable joint,
- wherein the board engagement element includes the arm projecting away from the first platform and downward,
- wherein the arm is configured to engage the upper surface and exert a clamping force on the board in cooperation with the grip element.

10. A fastener unit adapted to secure at least one board to a support, the fastener unit comprising:

a spacer block configured to at least partially receive a fastener, the spacer block having a thickness corresponding to a preselected gap between a first board and a second adjacent board, the spacer block defining a recess;

a grip element disposed in the recess and projecting beyond the thickness of the spacer block, the grip element configured to at least partially receive the fastener, the grip element configured to engage a first groove defined by the first board, the grip element having at least one downwardly facing projection, the grip element having a grip upper surface; and a board engagement element including a first platform and an arm extending therefrom configured to engage an upper surface of the first board, distal from the first groove, the first platform being disposed a first distance above the spacer block and at least partially surrounding the fastener, such that the first platform and the arm cooperate with the grip element to secure the spacer block adjacent a first side surface of the first board before the fastener is advanced relative to the spacer block and the grip element, wherein the arm is resilient, and the arm and the grip upper surface are configured to clamp the first board between the upper surface of the first board and the first groove in a clamped mode in which the spacer block is held in a static position adjacent the first side surface of the first board.

11. The fastener unit of claim 10, wherein the arm includes a lower edge that is configured to directly engage the upper surface of the first board, wherein the grip upper surface engages an upper groove wall in the clamping mode.

12. The fastener unit of claim 10, wherein the first platform is configured to directly engage the upper surface of the first board.

13. A fastener unit adapted to secure at least one board to a support, the fastener unit comprising:

a spacer block configured to at least partially receive a fastener, the spacer block having a thickness corresponding to a preselected gap between a first board and a second adjacent board, the spacer block defining a recess;

a grip element disposed in the recess and projecting beyond the thickness of the spacer block, the grip element configured to at least partially receive the fastener, the grip element configured to engage a first groove defined by the first board, the grip element having at least one downwardly facing projection, the grip element having a grip upper surface; and a board engagement element including a first platform and an arm extending therefrom configured to engage an upper surface of the first board, distal from the first groove, the first platform being disposed a first distance above the spacer block and at least partially surrounding the fastener, such that the first platform and the arm cooperate with the grip element to secure the spacer block adjacent a first side surface of the first board before the fastener is advanced relative to the spacer block and the grip element, wherein the board engagement element includes a first leg that projects downward from the first platform to the spacer block with which the first platform is joined, wherein the spacer block defines a first fastener hole, wherein the grip element defines a second fastener hole, wherein a fastener extends through the first fastener hole and the second fastener hole, the fastener extending adjacent the first leg.

14. The fastener unit of claim 13, wherein the first leg is joined with the spacer block at a fracturable joint such that the first platform and arm disassociate from the spacer block in a separation mode when the fastener is advanced through the second fastener hole.

\* \* \* \* \*